(12) United States Patent
Kanamori et al.

(10) Patent No.: US 7,319,490 B2
(45) Date of Patent: *Jan. 15, 2008

(54) INPUT SWITCH WITH DISPLAY AND IMAGE CAPTURING APPARATUS USING THE SAME

(75) Inventors: Shino Kanamori, Saitama-ken (JP);
Takeshi Misawa, Saitama-ken (JP);
Toshita Hara, Tokyo-to (JP)

(73) Assignee: FUJIFILM Corporation, Tokyo (JP)

( * ) Notice: Subject to any disclaimer, the term of this patent is extended or adjusted under 35 U.S.C. 154(b) by 893 days.

This patent is subject to a terminal disclaimer.

(21) Appl. No.: 09/765,369

(22) Filed: Jan. 22, 2001

(65) Prior Publication Data

US 2001/0026263 A1 Oct. 4, 2001

(30) Foreign Application Priority Data

| Jan. 21, 2000 | (JP) | ............................ 2000-017854 |
| Jan. 28, 2000 | (JP) | ............................ 2000-020517 |
| Mar. 9, 2000 | (JP) | ............................ 2000-065346 |

(51) Int. Cl.
*H04N 5/225* (2006.01)
*H04N 5/222* (2006.01)
*H01H 9/00* (2006.01)

(52) U.S. Cl. .................. 348/375; 348/333.01; 200/313

(58) Field of Classification Search ........... 348/333.01, 348/333.02, 333.04, 333.06, 333.13, 207.99, 348/373, 375, 376, 333.03, 333.05, 374; 345/156, 161; D16/200, 219; 396/535, 396/540; 200/5 R, 6 A, 6 R, 310, 313, 314, 200/315

See application file for complete search history.

(56) References Cited

U.S. PATENT DOCUMENTS

| 4,987,279 A | * | 1/1991 | Hirose et al. ............... 200/314 |
| 5,278,362 A | * | 1/1994 | Ohashi ........................ 200/5 A |
| 5,742,341 A | * | 4/1998 | Ohishi et al. ................ 348/373 |
| 5,822,690 A | * | 10/1998 | Rynk et al. .................. 455/351 |
| 5,867,149 A | * | 2/1999 | Jaeger ......................... 345/172 |
| 5,978,016 A | * | 11/1999 | Lourette et al. .............. 348/64 |
| 6,122,003 A | * | 9/2000 | Anderson .............. 348/207.99 |
| 6,154,210 A | * | 11/2000 | Anderson .................... 715/840 |
| 6,310,648 B1 | * | 10/2001 | Miller et al. ........... 348/333.05 |
| 6,348,772 B1 | * | 2/2002 | May ........................... 318/430 |
| 6,486,914 B1 | * | 11/2002 | Anderson .............. 348/333.02 |
| 6,519,003 B1 | * | 2/2003 | Swayze ....................... 348/375 |
| 6,633,336 B2 | * | 10/2003 | Toyoizumi et al. ..... 348/333.02 |

(Continued)

FOREIGN PATENT DOCUMENTS

JP 10148751 A * 6/1998

(Continued)

*Primary Examiner*—Lin Ye
*Assistant Examiner*—Justin P Misleh
(74) *Attorney, Agent, or Firm*—Sughrue Mion, Pllc.

(57) ABSTRACT

An input unit of the present invention includes: an instruction input unit including a display part, a posture of the instruction input unit capable of being displaced by a pressure applied to a first face thereof including a display screen of the display part; a switch pressing unit provided in the vicinity of an outer periphery of a face other than the first face of the instruction input unit, the switch pressing unit being capable of being displaced in accordance with the displacement of the instruction input unit; and a switch part arranged to work by being pressed by the switch pressing unit.

30 Claims, 36 Drawing Sheets

U.S. PATENT DOCUMENTS 6,636,264 B1 * 10/2003 Nakao et al. ............... 348/375
6,683,653 B1 * 1/2004 Miyake et al. .............. 348/373
6,734,909 B1 * 5/2004 Terane et al. ........... 348/333.05
7,061,535 B2 * 6/2006 Misawa et al. ............. 348/375

FOREIGN PATENT DOCUMENTS

JP        11317890 A  * 11/1999

* cited by examiner

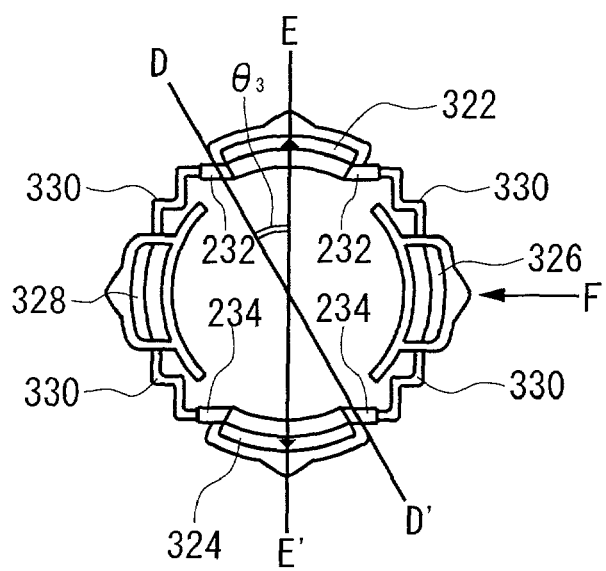
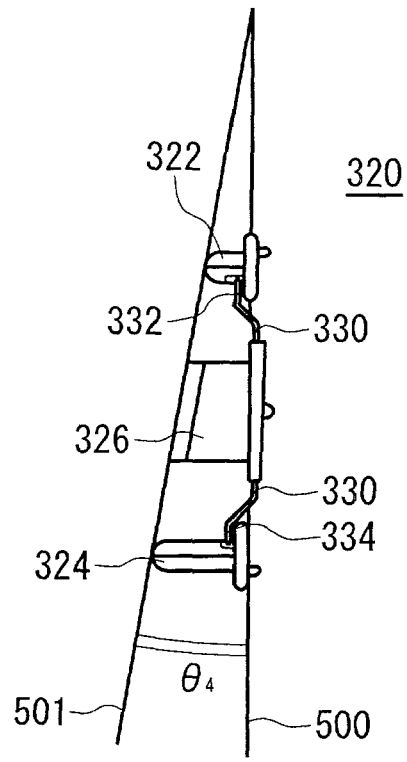
FIG. 14A  FIG. 14B
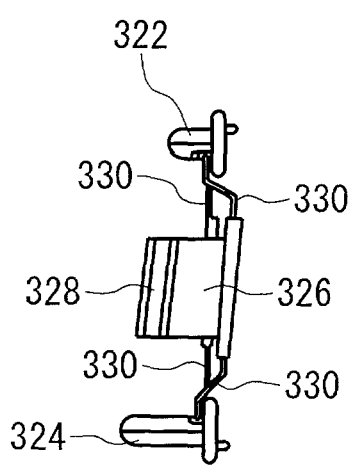
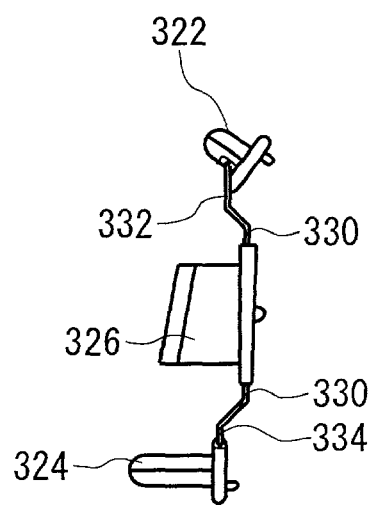
FIG. 14C  FIG. 14D

INPUT SWITCH WITH DISPLAY AND IMAGE CAPTURING APPARATUS USING THE SAME

This patent application claims priority based on a Japanese patent applications, 2000-17854, 2000-20517 and 2000-65346 respectively filed on Jan. 21 and 28, 2000 and Mar. 9, 2000, the contents of which are incorporated herein by reference.

BACKGROUND OF THE INVENTION

1. Field of the Invention

The present invention relates to an input unit and a capturing apparatus. More particularly, the present invention relates to an input unit for inputting a user's instruction to equipments, and a capturing apparatus that can use such an input unit.

2. Description of the Related Art

Recently, a digital camera has been greatly developed, and therefore the number of the functions that can be set by the user has also increased, thereby making operations of the digital camera by buttons complicated. Thus, there are demands for developments of a new type of input unit that enables a user-friendly input.

SUMMARY OF THE INVENTION

Therefore, it is an object of the present invention to provide an input unit and a capturing apparatus that overcome the above issues in the related art. This object is achieved by combinations described in the independent claims. The dependent claims define further advantageous and exemplary combinations of the present invention.

According to the first aspect of the present invention, an input unit includes: an instruction input unit including a display part, a posture of the instruction input unit capable of being displaced by a pressure applied to a first face thereof including a display screen of the display part; a switch pressing unit provided in the vicinity of an outer periphery of a face other than the first face of the instruction input unit, the switch pressing unit being capable of being displaced in accordance with the displacement of the instruction input unit; and a switch part arranged to work by being pressed by the switch pressing unit.

In one embodiment of the present invention, the instruction input unit presses the switch part via the switch pressing unit by being displaced around a position in the vicinity of a center of gravity thereof as a displacement center in a direction perpendicular to a face on which the switch part is provided.

In another embodiment of the present invention, the switch part includes switches arranged to form at least one pair, the switches of each pair being substantially opposed to each other with the displacement center sandwiched therebetween.

In still another embodiment of the present invention, the switch part includes switches arranged at an upper position, a lower position, a right position and a left position with respect to the displacement support.

In still another embodiment of the present invention, the display part is arranged to display information related to functions assigned to switches included in the switch part in the vicinity of the respective switches.

In still another embodiment of the present invention, the display part is arranged to display information related to an operation state of an apparatus used together with the input unit.

In still another embodiment of the present invention, the display part is arranged to display one of a plurality of background colors that is determined in accordance with an operation state of an apparatus used together with the input unit.

According to the second aspect of the present invention, a capturing apparatus for capturing an image including an input unit. The input unit includes: an instruction input unit including a display part, a posture of the instruction input unit capable of being displaced by a pressure applied to a first face thereof including a display screen of the display part; a switch pressing unit provided in the vicinity of an outer periphery of a face other than the first face of the instruction input unit, the switch pressing unit being capable of being displaced in accordance with the displacement of the instruction input unit; and a switch part arranged to work by being pressed by the switch pressing unit.

According to the third aspect of the present invention, an input unit for inputting an instruction to an apparatus, includes a switch pressing unit formed by a loop of a plurality of buttons and connection parts operable to connect the buttons to each other.

In an embodiment of the present invention, the input unit further includes a display part arranged inside of a periphery of the switch pressing unit.

In another embodiment of the present invention, the input unit further includes a switch unit including a plurality of switches that are arranged to work by being pressed by the buttons of the switch pressing unit.

In still another embodiment of the present invention, the display part displays information related to functions assigned to the switches in the vicinity of the buttons respectively corresponding to the switches.

In still another embodiment of the present invention, the buttons are arranged to form at least one pair. The buttons of each pair are substantially opposed to each other with a portion approximately at a center of the switch pressing unit sandwiched therebetween. It is preferable that the buttons are arranged substantially at an upper position, a lower position, a right position and a left position with respect to a center of the switch pressing unit. In addition, it is further preferable the upper and lower buttons are larger the right and left buttons.

In still another embodiment of the present invention, the buttons are arranged to press the switches by rotating around a predetermined part of the connection parts towards outside of the switch pressing unit.

In still another embodiment of the present invention, the first face that is in contact with upper faces of the buttons is inclined with respect to a reference face on which the switch pressing unit is in contact with a body of the apparatus. It is preferable that an angle between the first face and the reference face is larger than 0 degree but does not exceed 10 degrees. Moreover, it is preferable that the maximum inclination direction of the first face is inclined with respect to a vertical direction of the apparatus within a plane of the reference face. Furthermore, an angle between the maximum inclination direction of the first face the vertical direction exceeds 0 degree but does not exceed 45 degrees.

In still another embodiment of the present invention, a level of one of the buttons at the upper position with respect to the center of the switch pressing unit is different from a level of one of the buttons at the lower position with respect to the center of the switch pressing unit, when the input unit is used while being provided to the apparatus.

In still another embodiment of the present invention, the second face including a display screen of the display part is inclined with respect to a reference face that is in contact with a body face of the apparatus on which the input unit is provided. It is preferable that an angle between the second face and the reference face is larger than 0 degree and equal to or less than 10 degrees. Moreover, a maximum inclination direction of the second face is inclined with respect to a vertical direction of the apparatus within a plane of the reference face, preferably. Furthermore, an angle of the maximum inclination direction of the second face with respect to the vertical direction may exceed 0 degree but does not exceed 45 degrees.

In still another embodiment of the present invention, the third face that is in contact with the plurality of switches is inclined with respect to a reference face that is in contact with a body face of the apparatus on which the input unit is provided. It is preferable that an angle between the third face and the reference face is larger than 0 degree but does not exceed 10 degrees. Moreover, a maximum inclination direction of the third face is inclined with respect to a vertical direction of the apparatus within a plane of the reference face, preferably. Furthermore, an angle of the maximum inclination direction of the third face with respect to the vertical direction may exceed 0 degree but does not exceed 45 degrees.

In still another embodiment of the present invention, the input unit further includes a cover operable to fix the switch pressing unit to a body of the apparatus, wherein a fourth face that is in contact with an upper face of the cover is inclined to a reference face that is in contact with a body face of the apparatus on which the input unit is provided. It is preferable that an angle between the fourth face and the reference face is larger than 0 degree and equal to or less than 10 degrees. It is also preferable that a maximum inclination direction of the fourth face is inclined with respect to a vertical direction of the apparatus within a plane of the reference face. Furthermore, it is also preferable an angle of the maximum inclination direction of the fourth face with respect to the vertical direction exceeds 0 degree but does not exceed 45 degrees.

In still another embodiment of the present invention, the input unit further includes a protection glass part arranged to cover the display part, wherein a fifth face including a surface of the protection glass part is inclined with respect to a reference face that is in contact with a body face of the apparatus on which the input unit is provided. It is preferable that an angle between the fifth face and the reference face is larger than 0 degree but does not exceed 10 degrees. A maximum inclination direction of the fifth face may be inclined with respect to a vertical direction of the apparatus within a plane of the reference face. It is also preferable that an angle of the maximum inclination direction of the fifth face with respect to the vertical direction exceeds 0 degree but does not exceed 45 degrees.

In still another embodiment of the present invention, a direction connecting ones of the buttons arranged at upper and lower positions with respect to a center region of the switch pressing unit is inclined with respect to a vertical direction of the apparatus within a plane of a reference face that is in contact with a body face of the apparatus on which the input unit is provided.

In still another embodiment of the present invention, the switch unit is arranged in the vicinity of the display part and the switch pressing unit.

According to the fourth aspect of the present invention, an input unit for inputting an instruction to a capturing apparatus for capturing an image, includes: a plurality of switches; a mode switch for setting an operation mode of the capturing apparatus; a release switch for instructing capturing the image to the apparatus; a connector operable to transmit signals from the switches, the mode switch, and the release switch; and a flexible wiring substrate operable to electrically connect the switches, the mode switch and the release switch to the connector.

According to the fifth aspect of the present invention, a capturing apparatus for capturing an image, includes: a display part arranged to have a display screen inclined with respect to a body face of the capturing apparatus; and a switch unit including a plurality of switches arranged in surroundings of the display part.

In one embodiment of the present invention, the capturing apparatus further includes a second input unit including a first button and a plurality of second buttons arranged in surroundings of the first button, wherein shapes of the plurality of second buttons are different from each other.

In another embodiment of the present invention, the capturing apparatus further includes a display unit operable to display the image, wherein the first button includes a power switch operable to turn on/off a power of the capturing apparatus. The buttons include: a cancel button having a cancel function assigned thereto and being provided in the vicinity of the input unit; an execution button having an execution function assigned thereto and being provided in the vicinity of the input unit; a display button, provided in the vicinity of the display unit, operable to turn on/off a display by the display unit; and a shift button operable to change functions assigned to the buttons of the input unit. The cancel button, the execution button, the display button and the shift button have shapes different from each other. It is preferable that areas of surfaces of the cancel button and the execution button are larger than areas of surfaces of the display button and the shift button. It is preferable that the shift button has one of a convex shape and a concave shape, while the display button has the other shape.

In still another embodiment of the present invention, the input unit, and the display unit or the second input unit are arranged on the same body face of the capturing apparatus.

In still another embodiment of the present invention, the input unit is arranged on an upper-right side of a center of a face of the capturing apparatus that faces a user when being used.

In still another embodiment of the present invention, the input unit is arranged on an upper-left side of a center of a face of the capturing apparatus that faces a user when being used.

In still another embodiment of the present invention, the display part have at least one of a function of displaying information related to functions assigned to the switches in the vicinity of the buttons respectively corresponding to the switches and a function of displaying information related to an operation state of the capturing apparatus.

In still another embodiment of the present invention, the display part is arranged to display one selected from a plurality of background color, and the selected one background color when the capturing apparatus is in a recording state is different from that when the capturing apparatus is in a playback state.

According to the sixth embodiment of the present invention, a capturing apparatus for capturing an image, includes: an input unit including a first display unit operable to display a first displayed information and a plurality of switches arranged to form at least one pair, the switches of each pair being opposed to each other with the first display unit sandwiched therebetween; and a second display unit, wherein the first displayed information includes information indicating functions assigned to the switches, and a means is provided for incorporating at least a part of the first displayed information into the second displayed information.

In one embodiment of the present invention, the input unit is arranged on an upper-right side of a center of a face of the capturing apparatus that faces a user when the capturing apparatus is used, and the second display unit is arranged to display the first display information when one of the switches arranged at an upper position or a left position with respect to the first display unit is operated.

In another embodiment of the present invention, the capturing apparatus further includes a sensor part operable to sense that at least a part of the first display unit is hidden, wherein the second display unit is arranged to display the first displayed information when the sensor part senses that the first display unit is hidden.

In another embodiment of the present invention, the switches area arranged approximately at an upper position, a lower position, a right position and a left position with respect to the first display unit.

In still another embodiment of the present invention, the input unit and the second display unit are arranged on the same plane of the body face of the capturing apparatus.

In still another embodiment of the present invention, the first displayed information further includes information obtained by magnifying a specified part of the second displayed information.

In still another embodiment of the present invention, the capturing apparatus further includes a means for assigning a function of moving the specified part to the switches.

In still another embodiment of the present invention, the second displayed information includes map information, and the first displayed information further includes detailed information of a specified part of the map information.

In still another embodiment of the present invention, the capturing apparatus further includes a means for assigning a function of moving the specified part in the map information to the switches.

In still another embodiment of the present invention, the capturing apparatus further includes a recording unit operable to store the image, wherein the second displayed information includes one of the image stored in the recording unit and a thumbnail image of the image, and the first displayed information includes the other of the image and the thumbnail image. In still another embodiment of the present invention, the capturing apparatus further includes a means for assigning a function of displaying the image corresponding to the thumbnail image to the switches.

In still another aspect of the present invention, a capturing apparatus for capturing an image, includes: a display part having a display screen; and a switch unit including at least one switch arranged in surroundings of the display part and inclined with respect to a body face of the capturing apparatus.

This summary of the invention does not necessarily describe all necessary features of the present invention. The present invention may also be a sub-combination of the above described features. The above and other features and advantages of the present invention will become more apparent from the following description of embodiments taken in conjunction with the accompanying drawings.

BRIEF DESCRIPTION OF THE DRAWINGS

FIGS. 14A, 14B, 14C and 14D show a structure of a switch pressing unit of the input unit in the second embodiment of the present invention.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Embodiment 1

Figure 1:
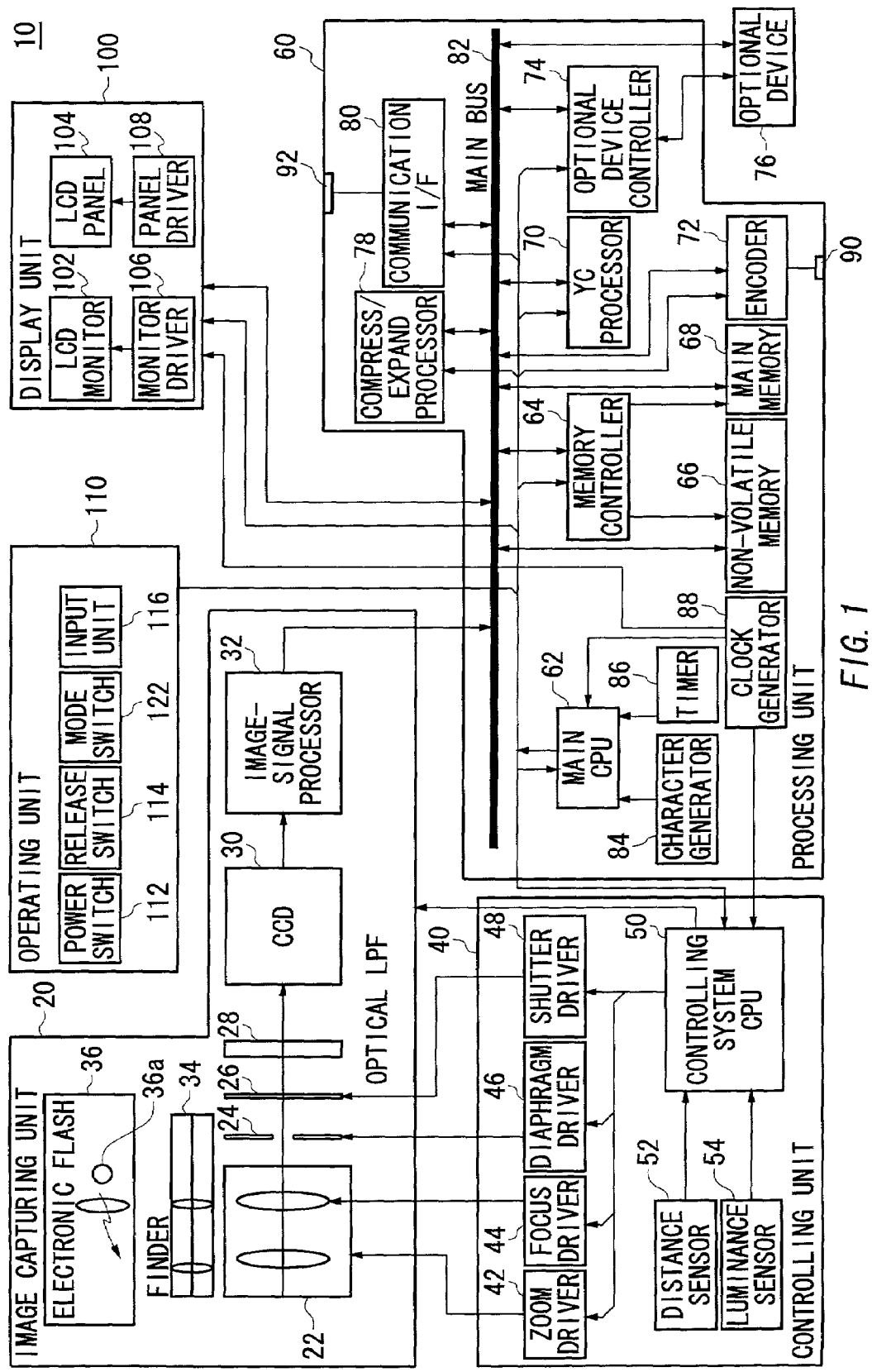
FIG. 1 shows an entire structure of a digital camera according to the first embodiment of the present invention.

FIG. 1 shows an entire structure of a digital camera 10 as an example of a capturing apparatus according to an embodiment of the present invention. A characteristic input unit in the present embodiment will be described in detail with reference to FIGS. 3A-9B. The digital camera 10 mainly includes an image capturing unit 20, a controlling unit 40, a processing unit 60, a display unit 100 and an operating unit 110.

The image capturing unit 20 includes mechanical members and electric members related to an image capturing and an image formation. The image capturing unit 20 includes a lens section 22, a diaphragm 24, a shutter 26 an optical LPF (Low-pass filter) 28, a CCD 30 and an image-signal processor 32 that capture an image and process the captured image. The lens section 22 includes a focus lens, a zoom lens and the like. This structure allows an image of a subject to be formed on a light receiving surface of the CCD 30. In accordance with the light amount of the formed image of the subject, respective sensor elements (not shown) of the CCD 30 are electrically charged. (Hereinafter, the electric charges stored in the sensor element are referred to as stored electric charges.) The stored electric charges are read by a read-gate pulse into a shift register (not shown), and are then read out as a voltage signal by register transfer pulses successively.

The digital camera 10 generally has an electronic shutter function. Therefore, it is not essential for the digital camera 10 to include a mechanical shutter such as the shutter 26. In order to realize the electronic shutter function, the CCD 30 is provided with a shutter drain via a shutter gate. When the shutter gate is driven, the stored electric charges are drained out into the shutter drain. By controlling the shutter gate, a time period in which the respective sensor elements are electrically charged, that is, a shutter speed can be controlled.

The voltage signal output from the CCD 30, that is an analog signal, is subjected to color separation for separating the signal into R, G and B components in the image-signal processor 32, thereby white balance is appropriately adjusted. Next, the image-signal processor 32 performs gamma correction. Then, the R, G and B signals are successively subjected to A/D conversion at necessary times. Digital image data obtained by the above operations (hereinafter, simply referred to as "digital image data") is output to the processing unit 60.

The image capturing unit 20 further includes a finder 34 and an electronic flash 36. The finder 34 may includes an LCD (not shown) therein. In this case, various types of information from a main CPU 62 and the like can be displayed within the finder 34. The electronic flash 36 works by emission of light by a discharge tube 36a when an energy stored in a condenser (not shown) is supplied to the discharge tube 36a.

The controlling unit 40 includes a zoom driver 42, a focus driver 44, a diaphragm driver 46, a shutter driver 48, a controlling system CPU 50 for controlling these drivers, a distance sensor 52 and a luminance sensor 54. Each of the drivers 42, 44, 46 and 48 has a driving means such as a stepping motor. When a release switch 114 described later is pressed down, the distance sensor 52 measures a distance to the subject while the luminance sensor 54 measures a luminance of the subject. The measured data of the distance (hereinafter, simply referred to as "distance data") and the measured data of the luminance (hereinafter, simply referred to as "luminance data") are sent to the controlling system CPU 50. The controlling system CPU 50 performs adjustments of a magnifying power and a focus of the lens section 22 by controlling the zoom driver 42 and the focus driver 44 based on capturing information such as magnification specified by the user.

The controlling system CPU 50 determines the F-number and the shutter speed based on an added value of the R, G and B digital signals of one image frame, that is, AE information. In accordance with the determined F number and the shutter speed, the diaphragm driver 46 adjusts the size of an aperture and the shutter driver 48 performs opening/closing the shutter 26.

Moreover, the controlling system CPU 50 controls the light emission by the electronic flash 36 based on the luminance data and also adjusts the aperture size of the diaphragm 26. When the user instructs the digital camera 10 to capture an image, the CCD 30 starts to be electrically charged. After the shutter period calculated from the luminance data has passed, the stored electric charges are output to the image-signal processor 32.

The processing unit 60 includes a main CPU 62 for controlling the whole digital camera 10, especially the processing unit 60 itself, and a memory controller 64, a YC processor 70, an optional device controller 74, a compress/expand processor 78, and a communication interface (I/F) 80 that are controlled by the main CPU 62. The main CPU 62 communicates with the controlling system CPU 50 by serial communication. An operation clock of the main CPU 62 is supplied from a clock generator 88 that also supplies clocks having different frequencies to the controlling system CPU 50 and the display unit 100, respectively.

In addition to the main CPU 62, a character generator 84 and a timer 86 are provided in the processing unit 60. The timer 86 has the backing of a battery cell so that the timer 86 always counts the time and date. Based on the counted values, information regarding the capturing date and time and other information related to the time are sent to the main CPU 62. The character generator 84 generates character information such as the capturing date, a title of the captured image or the like. The thus generated character information is appropriately combined with the captured image.

The memory controller 64 controls a non-volatile memory 66 and a main memory 68. The non-volatile memory 66 includes an EEPROM (electrically erasable and programmable ROM) or a flash memory or the like, and stores various data to be held even when the power of the digital camera 10 turns off, such as information set by the user, parameters set when the digital camera 10 was shipped, or the like. The non-volatile memory 66 can store a boot program for the main CPU 62 or a system program, if necessary. On the other hand, the main memory 68 is composed of a relatively inexpensive memory having a larger capacity, such as a DRAM, in general. The main memory 68 has a function of a frame memory for storing data output from the image capturing unit 20, a function of a system memory for loading necessary programs, and a function of a working area. The non-volatile memory 66 and the main memory 68 communicate with the parts in the processing unit 60 and other parts outside the processing unit 60 via a main bus 82.

The YC processor 70 subjects the digital image data to YC conversion so as to generate a luminance signal Y and color-difference signals B-Y and R-Y. The luminance signal and the color difference signals are temporarily stored in the main memory 68 by the memory controller 64. The compress/expand controller 78 successively reads the luminance signal and the color-difference signals from the main memory 68 and compresses the read signals. The resultant data (hereinafter, simply referred to as "compressed data") is written into a memory card, that is a kind of the optional device 76, via the optional device controller 74.

The processing unit 60 further includes an encoder 72. The encoder 72 inputs the luminance signal and the color-difference signals, converts these input signals into a video signal (NTSC or PAL signal) and then outputs the video signal from a video output terminal 90. In a case where the video signal is generated from the data stored in the optional device 76, the data is first supplied to the compress/expand processor 78 via the optional device controller 74, and is then subjected to a necessary expansion operation in the compress/expand processor 78. Finally, the expanded data is converted into the video signal by the encoder 72.

The optional device controller 74 performs generation of a signal or signals required by the main bus 82 and the optional device 76, logical transform, or voltage conversion in accordance with the specification of signals accepted by the optional device 76 and the bus-specification of the main bus 82. The digital camera 10 may support a device other than the aforementioned memory card, for example, a standard I/O card conforming to PCMCIA. In this case, the optional device controller 74 may be composed of an LSI for controlling a bus for PCMCIA. In a case where a storage medium such as a memory card as the optional device 76, the optional device 76 may serve as the recording unit for storing the image.

The communication I/F 80 controls protocol conversion according to the communication specification supported by the digital camera 10, such as USB, RS-232C or Ethernet. The communication I/F 80 includes a driver IC, if necessary, and communicates with external equipments including a network via a connector 92. In addition, the digital camera 10 may be configured to allow data communication with external equipments such as a printer or a game player by means of a special I/F, other than the above-mentioned standard specification.

The display unit 100 includes an LCD monitor 102 and an LCD panel 104 respectively controlled by a monitor driver 106 and a panel driver 108 that are implemented by LCD drivers. The LCD monitor 102, that is a 2-inch LCD panel, for example, is provided on the back face of the digital camera 10, and displays a current mode such as a capturing mode or a playback mode, magnification of the image capturing or the playback image, the residual amount of the battery cell, the date and time, a screen for setting modes, an image of the subject, or the like. On the other hand, the LCD panel 104 is a small monochrome LCD, for example, and is provided on the upper face of the digital camera 10. The LCD panel 104 simply displays information such as the image quality, for example, FINE, NORMAL, BASIC or the like, ON/OFF of the electronic flash, the number of images normally capturable, the number of pixels, and the battery capacity or the like.

The operating unit 110 includes mechanisms and electric members required for the user to set or instruct the operation and the mode of the digital camera 10 to the digital camera 10. A power switch 112 determines whether or not the power of the digital camera 10 turns on/off. The release switch 114 has a two-step structure allowing half-pressing and complete-pressing of it. For example, in the still-image capturing mode, when the release switch 114 is half-pressed, AF and AE are locked. Then, the release switch 114 is completely pressed, a shot image is taken into the digital camera 10 and is recorded in the main memory 68 and/or the optional device 76 after necessary signal processing and data compression are performed. On the other hand, in the video recording mode, AF and AE are locked when the release switch 114 is half-pressed. Then, when the release switch 114 is completely pressed, the video recording is started. The video recording may continue during a period in which the release switch 114 is pressed, and stops when the release switch 114 is released. Alternatively, the video recording continues even after the release switch 114 is released once, but stops when the release switch 114 is pressed again. An input unit 116 is used for inputting the use's instruction. The input unit 116 also has a function of a zooming switch used for setting the zooming magnification. A mode switch 122 is used for setting an operation mode of the digital camera 10. The operations or functions that can be set by the operating unit 110 include "file format", "special effect", "print", "determine/store", and "change display", for example. Signals output from the respective switches of the operating unit 110 are sent to the processing unit 60 and are subjected to necessary signal processing therein.

Figure 2:
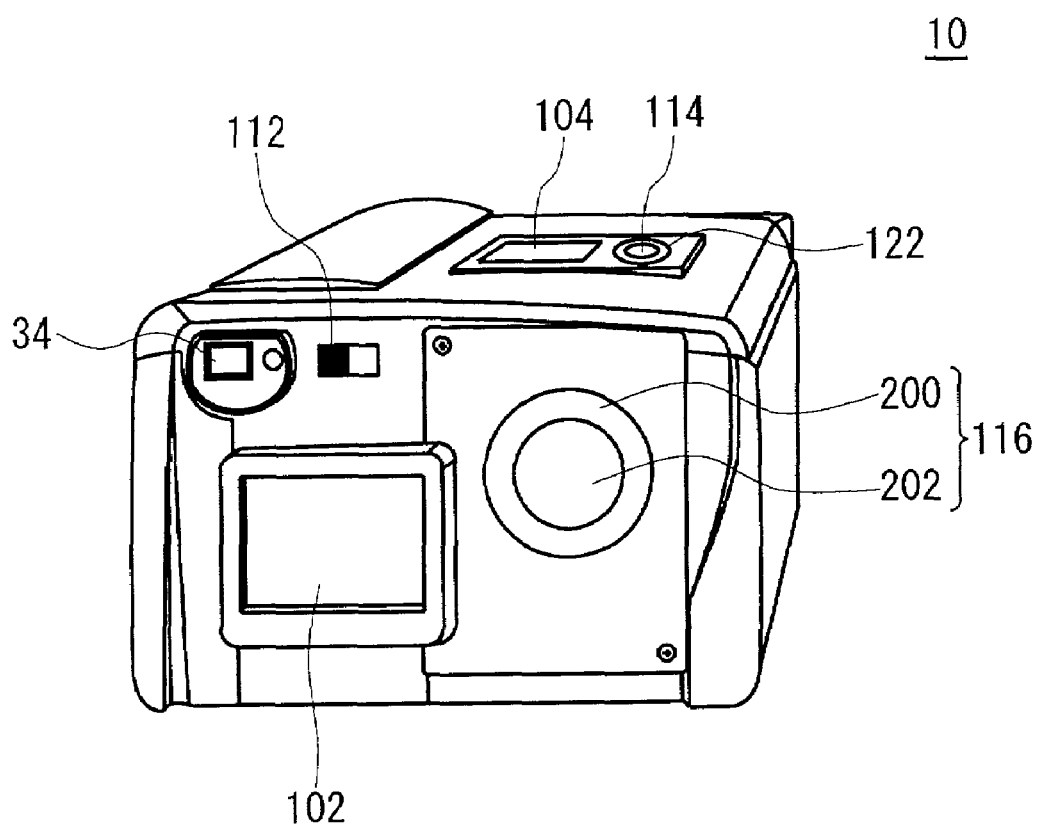
FIG. 2 schematically shows an appearance of the digital camera in the first embodiment of the present invention.

FIG. 2 shows an appearance of the digital camera 10 in the present embodiment. FIG. 2 is a perspective view schematically showing the digital camera 10 from the upper direction of the face that faces the user when the user uses the digital camera 10. FIG. 2 shows an instruction input unit 200 including a liquid crystal display (LCD) part 202. Various functions are freely assigned to portions of the input unit 116 that serve as switches, depending on the operation modes of the digital camera 10. For example, when the digital camera 10 is in a capturing-standby state, the function of the zooming switch is assigned to a pair of portions that respectively correspond to upper and lower part of the input unit 116. When the digital camera 10 is playing a movie, functions of "playback", "stop", "fast-forward" and the like are assigned to the portions of the input unit 116 serving as the switches. The LCD part 202 displays information relevant to the functions of the switch portions in the vicinity of the associated switch portions. In addition, approximately at the center of the LCD part 202, information related to the operation state of the digital camera 10 is displayed. The contents displayed by the LCD part 202 are determined by the main CPU 62 or the like and is transmitted to the LCD part 202 via a driver (not shown).

On the face of the digital camera 10 facing the user, the LCD monitor 102 that is an example of the display unit is provided. In this arrangement, since the LCD monitor 102 and the input unit 116 are arranged on the same face, the user can operate the digital camera 10 while confirming both the contents displayed on the LCD 102 and those displayed on the LCD part 202 of the input unit 116. For example, the LCD monitor 102 may display a menu indicating the functions. In this case, the user can set a desired function by operating the switch portions of the input unit 116 while confirming the contents of the LCD monitor 102 and those of the LCD part 202 of the input unit 116. In addition, even if the contents displayed on the LCD part 202 cannot be viewed because of the user's finger placed thereon in order to operate the LCD part 202, the LCD monitor 102 can display necessary information instead of the LCD part 202. Moreover, the LCD monitor 102 and the LCD part 202 may be respectively arranged on two faces of the body of the digital camera 10 that are adjacent to each other. For example, the LCD monitor 102 and the LCD part 202 may be arranged on the back and the upper face of the digital camera 10, respectively. Also in this case, the user can confirm both the contents displayed on the LCD monitor 102 and the contents displayed on the LCD part 202.

The screens of the LCD monitor 102 and the LCD part 202 may be arranged to be at an angle with respect to a face of the body of the digital camera 10. In most cases where the user uses the digital camera 10, the user operates the digital camera 10 at a position that is lower than the user's eyes. In these cases, when the display screens of the LCD monitor 102 and the LCD part 202 are arranged to be inclined in such a manner that the lower side of each display screen comes ahead of the upper side thereof, the angle between the user's eyes and the display screen is close to a right angle, thereby allowing the user to easily view the contents of the LCD monitor 102 and the LCD part 202.

The input unit 116 is arranged at a portion that is closer to the upper face of the digital camera 10 than the center of the face of the digital camera 10 facing the user and is on the right side of the center. Therefore, when the user holds the digital camera 10 by the right hand, the thumb can be placed on the input unit 116. Thus, the user can operate the digital camera by a single hand easily.

In addition, the finder 34, the power switch 112 and the like are provided on the face of the digital camera 10 facing the user. It should be noted that these components may be arranged on another face of the digital camera 10.

On the upper face of the digital camera 10, the LCD panel 104, the release switch 114, the mode switch 122 and the like are arranged. The LCD panel 104 is arranged on the upper face of the digital camera 10 in order for the user to view the LCD panel 104 easily when the user uses the digital camera 10. The release switch 114 and the mode switch 122 are arranged at positions where an index finger is placed when the user holds the digital camera 10 by the right hand. Accordingly, the digital camera 10 in the present embodiment can be operated by a single hand easily.

Figure 3A:
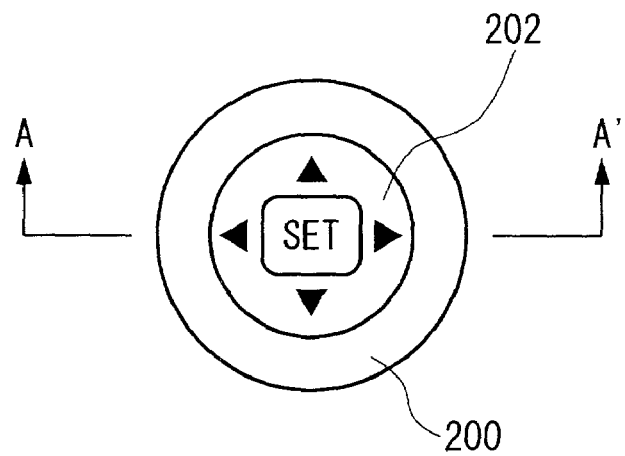
FIG. 3A is a plan view showing an example of an input unit.
Figure 3B:
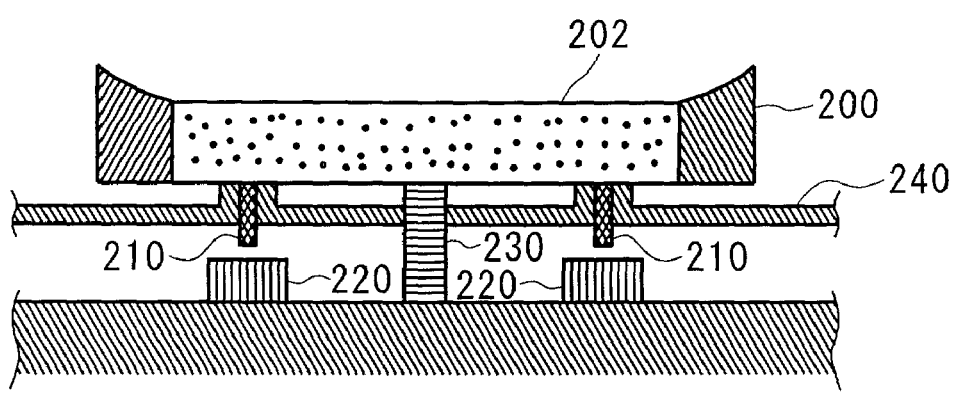
FIG. 3B is a cross-sectional view of the input unit taken along Line A-A' in FIG. 3A.

FIGS. 3A and 3B illustrate an exemplary structure of the input unit 116 in the present embodiment. FIG. 3A shows the first face including a display screen of the LCD part 202 of the input unit 116. The LCD part 202 is integrated with the instruction input unit 200. FIG. 3B schematically shows a cross section of the input unit 116 along Line A-A'. The input unit 116 includes the instruction input unit 200 having the LCD part 202 therein; switch pressing portions 210, switches 220 and a support 230. When the face including the display screen of the LCD part 202 is pressed, the instruction input unit 200 is displaced in a direction substantially perpendicular to the face on which the switches are positioned around the support 230 positioned in the vicinity of the center of gravity as a displacement center. Thus, the posture of the instruction input unit 200 is displaced in accordance with the pressing force and direction. The switch pressing portions 210 are provided in the vicinity of an outer periphery of the second face positioned on the back side of the first face including the display screen of the LCD part 202. The switch pressing portions 210 are displaced together with the instruction input unit 200 when the instruction input unit 200 is displaced, so that one of the switch pressing portion 210 presses the corresponding switch 220. The switch 220 works by being pressed by the switch pressing portion 210. The switch 220 may be implemented by a metal dome switch, for example. The switches 220 are arranged to form at least one pair in such a manner that the switches 220 of each pair are opposed to each other with the support 230 sandwiched therebetween. Since FIG. 3A is a cross-sectional view, only two switches 220 (one pair) are shown. However, two or more switches 220 may be provided as shown in FIGS. 5A, 5B, 5C and 5D. The support 230 is provided approximately at the center of gravity of the instruction input unit 200, serving as the displacement center of the instruction input unit 200. The support 230 includes a signal path (not shown) for transmitting signals for LCD part 202 therein. The instruction input unit 200 is supported by the body of the digital camera 10 via supporting face 240.

Figure 4A:
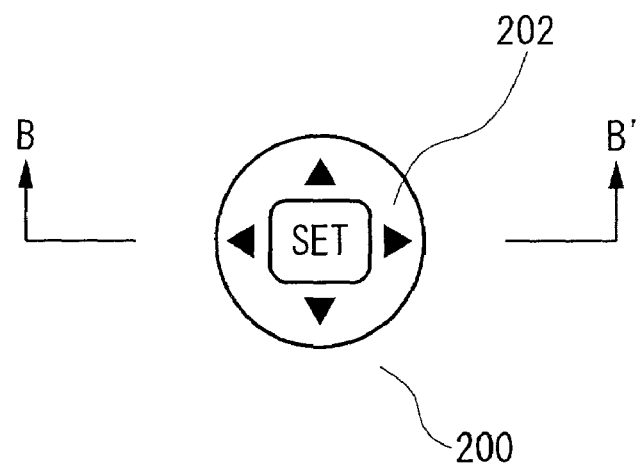
FIG. 4A is a plan view showing another example of an input unit.
Figure 4B:
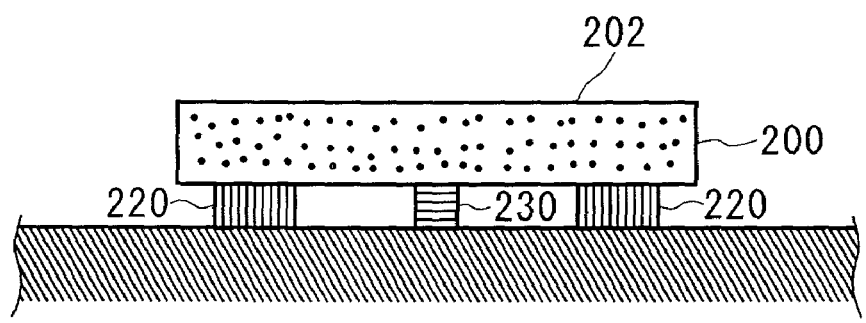
FIG. 4B is a cross-sectional view of the input unit taken along Line B-B' in FIG. 4A.

FIGS. 4A and 4B show another example of the input unit 116. FIG. 4A shows the first face including the display screen of the LCD part 202 of the input unit 116. In this example, the LCD part 202 also serves as the instruction input unit 200. FIG. 4B schematically shows a cross section of the input unit 116 along Line B-B' in FIG. 4A. In this example, since the LCD part 202 is provided to come into contact with the switches 220, the supporting face 240 is not provided. Thus, the LCD part 202 itself has the function of the switch pressing portion 210. Accordingly, the input unit 116 can be realized by a simple structure.

Figure 5A:
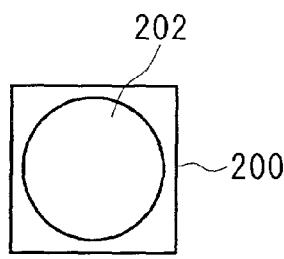
FIGS. 5A, 5B, 5C, 5D and 5E show various arrangements of an instruction input unit, an LCD part and switches.
Figure 5A:
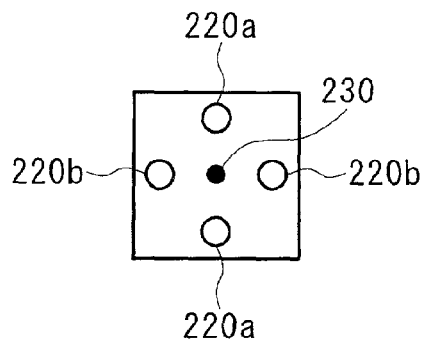

FIGS. 5A, 5B, 5C, 5D and 5E are other examples of the input unit 116 of the present embodiment. FIG. 5A shows the pressing face of the square instruction input unit 200 including the circular LCD part 202 on the left side and an arrangement of the switches 220a and 220b to be pressed by the instruction input unit 200 on the right side. The switches 220a and 220b are arranged at four positions, i.e., upper, lower, right and left positions with respect to the support 230. Thus, input unit 116 can serve as the cross key.

Figure 5B:
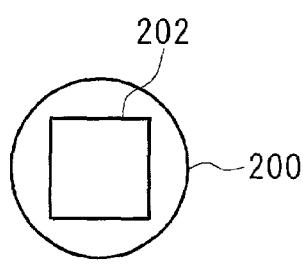
Figure 5B:
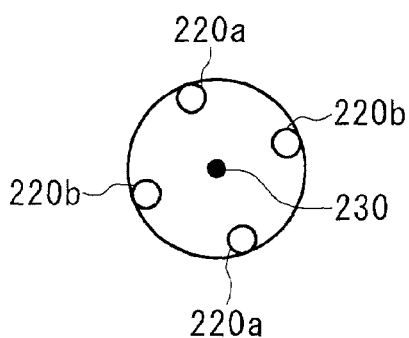

FIG. 5B shows a pressing face of the circular instruction input unit 200 including the square LCD part 202 on the left side and an arrangement of the switches 220a and 220b to be pressed by the instruction input unit 200. The switches 220a and 220b are arranged at four positions shifted from the upper, lower, right and left positions with respect to the support 230 by a predetermined angle in a counterclockwise direction. Also in this case, since the switches of each of the pairs 220a and 220b are arranged to be opposed to each other with the support 230 sandwiched therebetween, the input unit 116 can serve as the cross key. According to the arrangement shown in FIG. 5B, a tip and a middle part of the thumb are positioned over the switches 220a when the user holds the digital camera 10 by a right hand with the thumb naturally placed on the input unit 116. Thus, this arrangement is excellent from the angle of ergonomics.

Figure 5C:
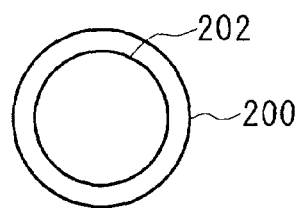
Figure 5C:
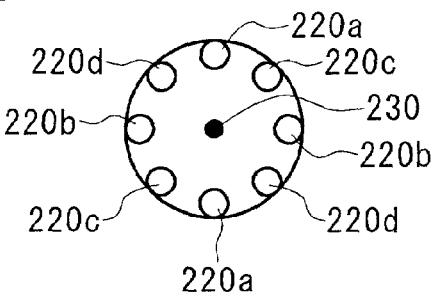

FIG. 5C shows the pressing face of the circular instruction input unit 200 including the circular LCD part 202 on the left side and an arrangement of the switches 220a, 220b, 220c and 220d to be pressed by the instruction input unit 200. The switches 220a to 220d are arranged at four positions, i.e., the upper, lower, right and left positions with respect to the support 230 and other four positions, i.e., the positions shifted from the upper, lower, right and left positions by 45 degrees. Also in this arrangement, the switches of each of the pairs 220a, 220b, 220c and 220d are arranged to be opposed to each other with the support 230 sandwiched therebetween. This arrangement is advantageous because the arrangement allows eight direction to be input, for example, when a frame is moved in order to determine the frame of the image to be captured or map information is moved in order to search for position information.

Figure 5D:
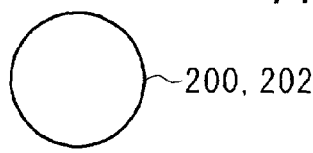
Figure 5D:
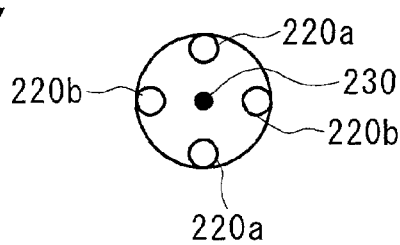
Figure 5E:
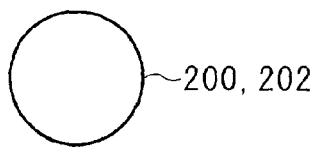
Figure 5E:
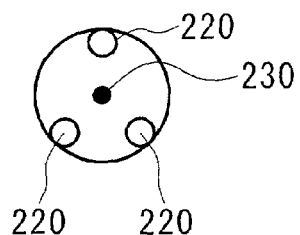

FIG. 5D shows the pressing face of the circular instruction input unit 200 including the circular LCD part 202 on the left side and an arrangement of the switches 220a and 220b to be pressed by the instruction input unit 200. As shown in FIG. 5D, the LCD part 202 may have both the function of the LCD part 202 itself and the function of the instruction input unit 200. FIG. 5E shows the pressing face of the circular instruction input unit 200 including the circular LCD part 202 on the left side and an arrangement of the switches 220 to be pressed by the instruction input unit 200. As shown in FIG. 5E, the number of the switches 220 is not limited to an even number. Also, the switches 220 are not necessarily arranged to form a pair in which the switches 220 of the pair are opposed to each other with the support 230 sandwiched therebetween. The switches 220 can be arranged at any positions as long as the pressing face of the instruction input unit 200 can press the switches 220.

The shape of the LCD part 202 is not limited to the square or circle described above. The LCD part 202 may be formed in a rectangular shape, an elliptical shape or any desired shape. Also, the shape of the switch 220 may be any desired shape. Moreover, the switch 220 can be implemented by a switch that works by being pressed, such as a metal dome switch. The number of the switches 220 is not limited four or eight, but is any desired number.

The functions assigned to the respective switch portions 220 are associated with a relative direction with respect to the LCD part 202. For example, the upper switch portion 220 positioned above the LCD part 202 has the functions related to "the upward direction". The functions related to "the upward direction" include, for example, a function of moving the current selected position upwardly in the menu screen displayed on the LCD monitor 102. As described above, the functions corresponding to the relative direction of the respective switch portions 220 with respect to the LCD part 202 are assigned to the respective switch portions 220. Thus, in a case where upward, downward, right or left direction needs to be input, the user can understand how to operate the digital camera 10 by intuition.

As described above, the combination of the instruction input unit 200 and the switch portions 220 serving as a cross key having high operability and the LCD part 202 having high freedom of display can provide the following advantageous effects. First, since various functions are assigned to the switch portions 220 freely, the number of the operation buttons can be reduced. Moreover, since functions necessary for the current operation mode can be assigned to the switch portions 220, it is not necessary for the user to look for the button. Thus, the operation of the digital camera 10 can be simplified. In addition, since the LCD part 202 displays the information indicating the functions of the switch portions 220 in the vicinity of the corresponding switch portions 220, the user can operate the digital camera 10 while confirming the functions currently assigned to the switch portions 220 even if the functions assigned to the switch portions 220 are changed. Also, the functions assigned to the operation buttons are displayed by the LCD part 202, it is not necessary to print the functions of the operation buttons on an exterior member of the digital camera 10, thus reducing the cost. Moreover, since the LCD part 202 is positioned immediately above the switch portions 220, the information can be displayed in the vicinity of the respective switch portions 220. Thus, the user can understand how to operate the digital camera by intuition, thereby operating the digital camera without moving the eyes. Furthermore, the arrangement of the switch portions 220 and the LCD part 202 described above can realize a smaller and simpler structure as compared to the case of arranging the switch portions 220 and the LCD part 202 separately. Furthermore, when the LCD part 202 further displays the operation mode of the digital camera 10, the user can operate the digital camera 10 while confirming the current operation mode without checking the current position of the mode switch 122.

Figure 6A:
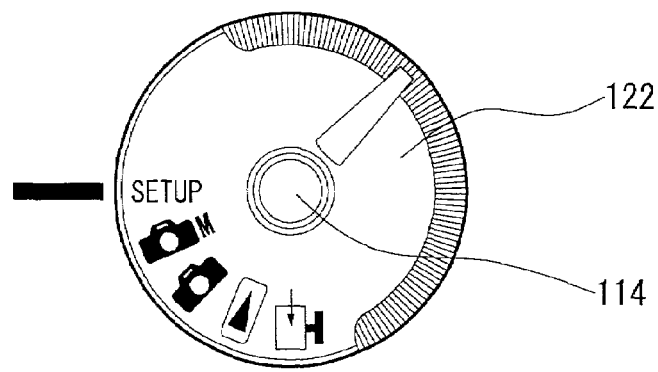
FIGS. 6A, 6B and 6C show exemplary screens of the LCD part and an LCD monitor in a function setting mode.
Figure 6B:
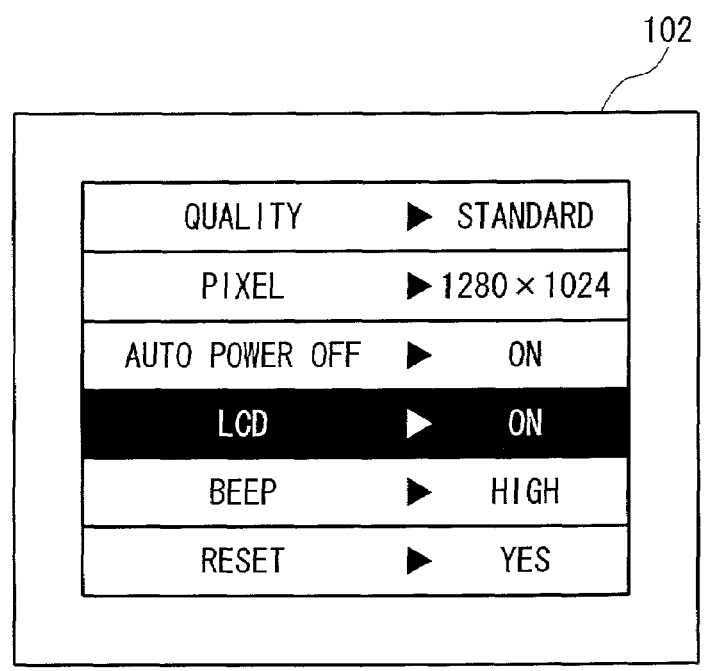
Figure 6C:
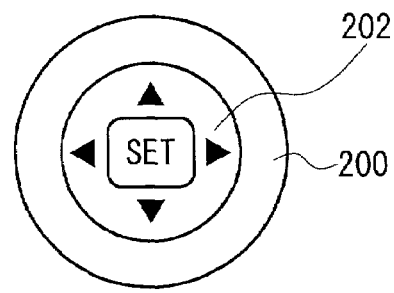

FIGS. 6A, 6B and 6C show exemplary screens displayed on the LCD monitor 102 and the LCD part 202 when the digital camera 10 of the present embodiment is in the function setting mode. FIG. 6A shows a state where the mode switch 122 is set to the function setting mode. FIG. 6B shows the exemplary screen of the LCD monitor 102. The LCD monitor 102 displays a function setting menu. The function currently selected is displayed while being reversed in color. A triangle located on the right side of the name of each function indicates that the setting of the corresponding function can be changed by pressing down the right and left switch portions 220. FIG. 6C shows the exemplary screen of the LCD part 202. The LCD part 202 displays a symbol indicating that the digital camera 10 is now in the function setting mode approximately at the center of the screen and also displays symbols indicating that the switch portions 220 have function of arrow keys in the vicinity of the switch portions 220. For example, the function of moving the currently selected position upwardly in the function setting menu is assigned to the upper switch portion, while the function of changing the current setting of the selected menu is assigned to the right switch portion.

Figure 7A:
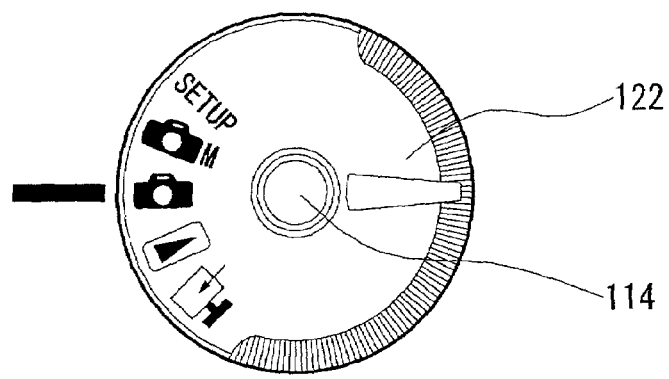
FIGS. 7A, 7B and 7C show exemplary screens of the LCD part and the LCD monitor in a still-image capture mode.
Figure 7B:
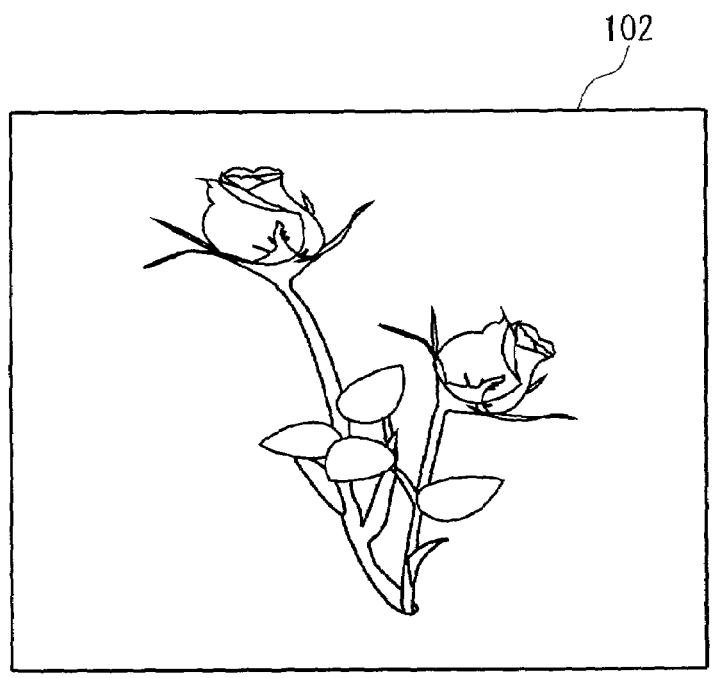
Figure 7C:
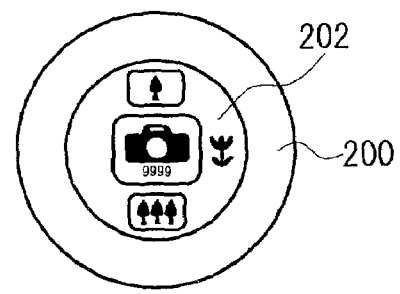

FIGS. 7A, 7B and 7C show the exemplary screens of the LCD monitor 102 and the LCD part 202 when the digital camera 10 of the present embodiment is in a still-image capture mode. FIG. 7A shows a state where the mode switch is set to the still-image capture mode. FIG. 7B shows the exemplary screen displayed on the LCD monitor 102. The LCD monitor 102 displays an image shot by the image-capturing unit 20. FIG. 7C shows the exemplary screen displayed on the LCD part 202. The LCD part 202 displays a symbol indicating that the digital camera 10 is now in the still-image capturing mode approximately at the center of the screen, and also displays symbols indicating the functions assigned to the switch portions 220 in the vicinity of the switch portions 220. For example, a zooming (magnifying) function is assigned to the upper switch portion, and a close-up capturing function is assigned to the right switch. As a background color of the LCD part 202, orange is selected for indicating that the digital camera 10 is in the capturing mode in the present embodiment. In the case where the magnifying function and a reducing function are respectively assigned to the upper and lower switch portions as described above, the relative positions of the switch portions with respect to the LCD part 202 correspond to the functions of the switch portions. Thus, the user can perform a correct operation even if the user does not know the functions assigned to the respective switch portions or the meaning of the symbols.

Figure 8A:
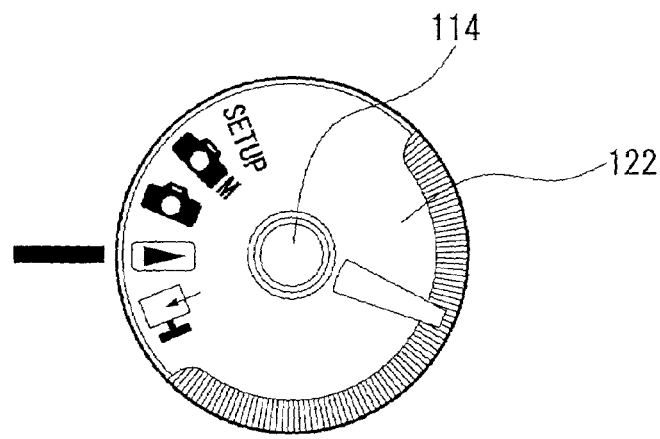
FIGS. 8A, 8B and 8C show exemplary screens of the LCD part and the LCD monitor in a movie playback mode.
Figure 8B:
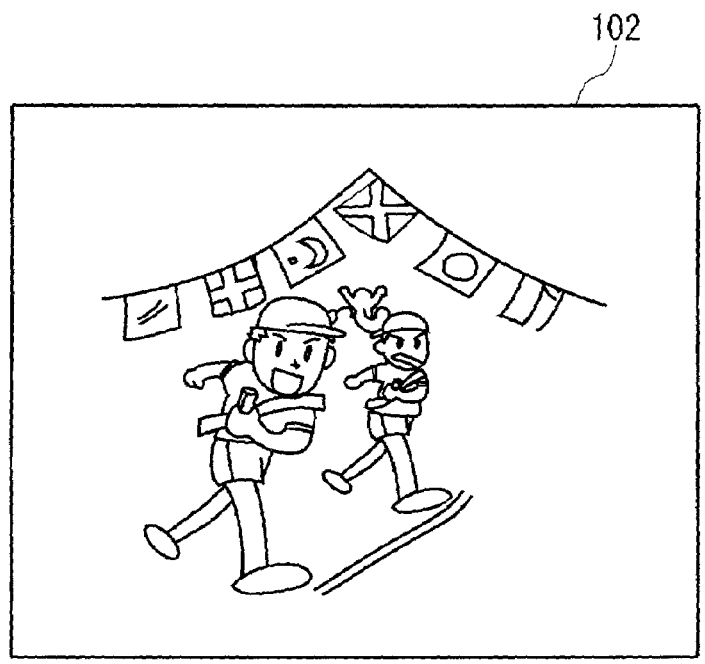
Figure 8C:
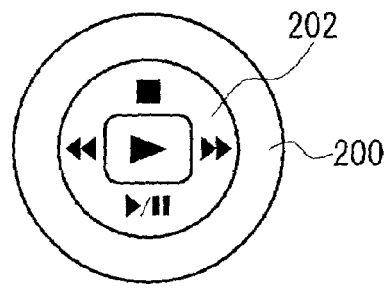

FIGS. 8A, 8B and 8C show exemplary screens displayed on the LCD monitor 102 and the LCD part 202, respectively, when the digital camera 10 of the present embodiment is in a movie-playback mode. FIG. 8A shows a state where the mode switch 122 is set to the movie-playback mode. FIG. 8B shows the exemplary screen displayed on the LCD monitor 102. The LCD monitor 102 displays the movie being played. FIG. 8C shows the exemplary screen displayed on the LCD part 202. The LCD part 202 displays a symbol indicating that the digital camera 10 is now playing the movie approximately at the center of the screen, and also displays symbols indicating the functions assigned to the switch portions in the vicinity of the switch portions. For example, a function of stopping the playback of the movie is assigned to the upper switch portion, while a function of fast-forwarding the movie is assigned to the right switch portion. As the background color of the LCD part 202, green is selected for indicating that the digital camera 10 is in a playback mode. By the arrangement described above, the user can understand how to operate the digital camera 10 by intuition, so as to easily operate the digital camera 10 quickly.

The background color of the LCD part 202 is determined mainly by the main CPU 62 or the like, in accordance with the operation state of the digital camera 10. The background color of the LCD part 202 may be realized by a backlight color. The backlight of the LCD part 202 may be turned on only in a predetermined period after the operation mode is changed, and thereafter be turned off. In this case, the power consumption can be reduced. As the backlight of the LCD part 202, red and green LEDs may be used, for example. In this case, three colors, i.e., red, green and orange can be realized. Orange is realized by turning both the red and green LEDs on simultaneously. For example, the background color may be orange when the digital camera 10 is in the capturing mode; green when the digital camera 10 is in the playback mode; and red when the digital camera 10 displays a warning to the user. In this case, the user can find the operation state of the digital camera 10 by intuition. In a case where the LCD part 202 is implemented by a color LCD, the background color may be realized by displaying areas other than information such as the symbols in the same color.

The background color of the LCD part 202 may be changed depending on recording folders into which information is recorded. For example, green may be selected as the background color when a folder for a private use is selected, or orange may be selected when a folder for jobs is selected. In this case, the user can find the usage of the recording folder by the background color when the user selects the recording folder, thereby preventing a wrong operation.

Figure 9A:
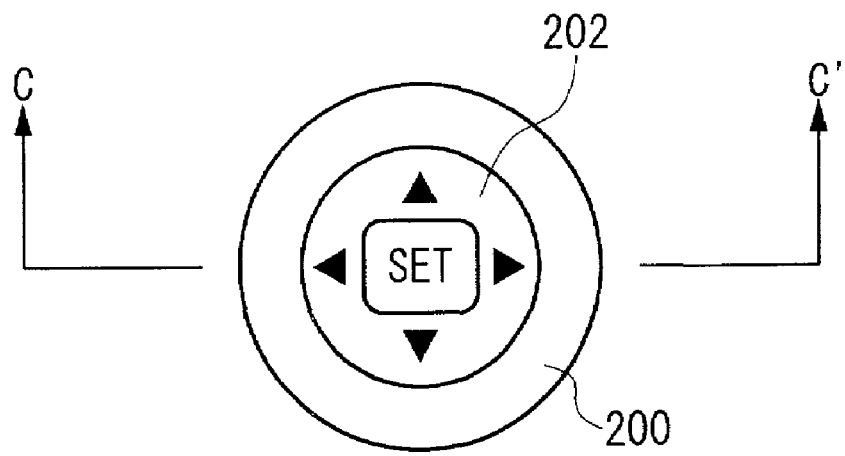
FIG. 9A is a plan view showing a modified input unit.
Figure 9B:
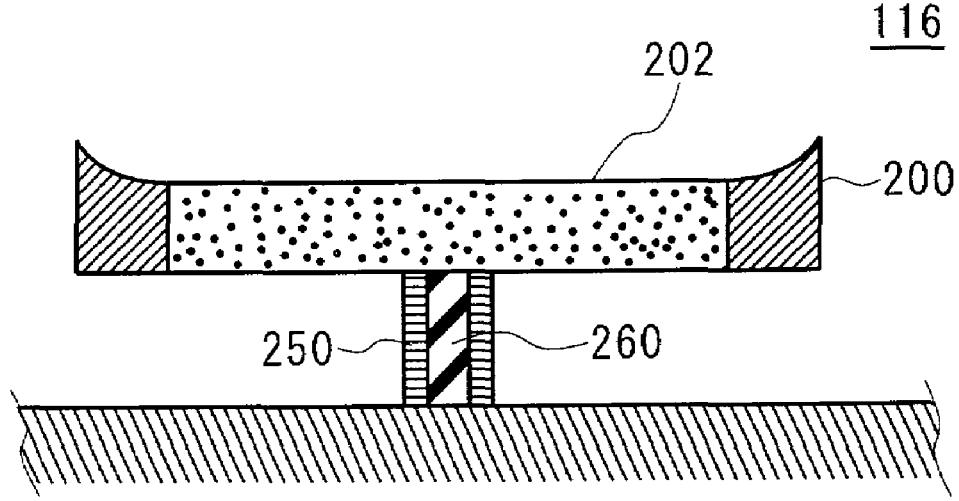
FIG. 9B is a cross-sectional view of the modified input unit taken along Line C-C' in FIG. 9A.

Next, an example of a modification of the input unit 116 is described referring to FIGS. 9A and 9B. FIGS. 9A and 9B shows the input unit 116 of this modified example. The digital camera 10 has a similar structure to that described with reference to FIGS. 1 to 8C and operates similarly. Thus, the detailed description of the digital camera 10 of this modified example is omitted, and only the input unit 116 is described below.

FIG. 9A shows the first face of the input unit 116 including the display screen of the LCD part 202. The LCD part 202 is integrated with the instruction input unit 200. FIG. 9B schematically shows a cross section of the input unit 116 along Line C-C' in FIG. 9A. The input unit 116 includes the instruction input unit 200 including the LCD part 202 and a support 250 provided approximately under the center of gravity of the instruction input unit 200 for supporting the instruction input unit 200. When the first face including the display screen of the LCD part 202 is pressed, the instruction input unit 200 is displaced in a direction substantially perpendicular to the face of the camera body with the support 250 as the displacement center. Thus, the posture of the instruction input unit 200 is displaced in accordance with the pressing direction and force. The support 250 includes a signal path (not shown) for transmitting signals for the LCD part 202 therein. Also, the support 250 includes a sensor portion 260 for sensing the displacement of the instruction input unit 200, as shown in FIG. 9B. The sensor portion 260 may be a sensor capable of sensing a pressure, a distortion or the like. Information of the displacement sensed by the sensor portion 260 is sent to the processing unit 60 that analyzes the received displacement information and appropriately processes it in accordance with the result of analysis. For example, in a case of the displacement in a direction within a predetermined range that exceeds a predetermined threshold value, it can be determined that the switch positioned in said direction is pressed, so that the function assigned to the switch in said direction is executed. As described above, the input unit 116 of the present embodiment can includes the desired number of switches arranged in desired directions. Moreover, the directions in which the switches are arranged and the number of the switches can be dynamically changed. In addition, a multi-step switch that works in accordance with the degree of the displacement may be realized. In this case, information relevant to the function of the switch may be displayed at a position in the same direction as the switch with respect to the center of the LCD part 202. Moreover, the LCD part 202 may display information relevant to the operation mode of the digital camera 10. The background color of the LCD part 202 may be determined in accordance with the operation mode of the digital camera 10. The LCD part 202 may display in a similar manner to any of examples associated with FIGS. 6A to 8C. Furthermore, the range of direction of the deviation may be below the input unit 116. In this case, when a switch (not shown) that works by being pressed by the entire input unit 116 is arranged under the input unit 116, the input unit 116 can serve as the cross key while the switch under the input unit 116 can serve as an execution button. Thus, the operability can be improved.

Embodiment 2

Figure 10:
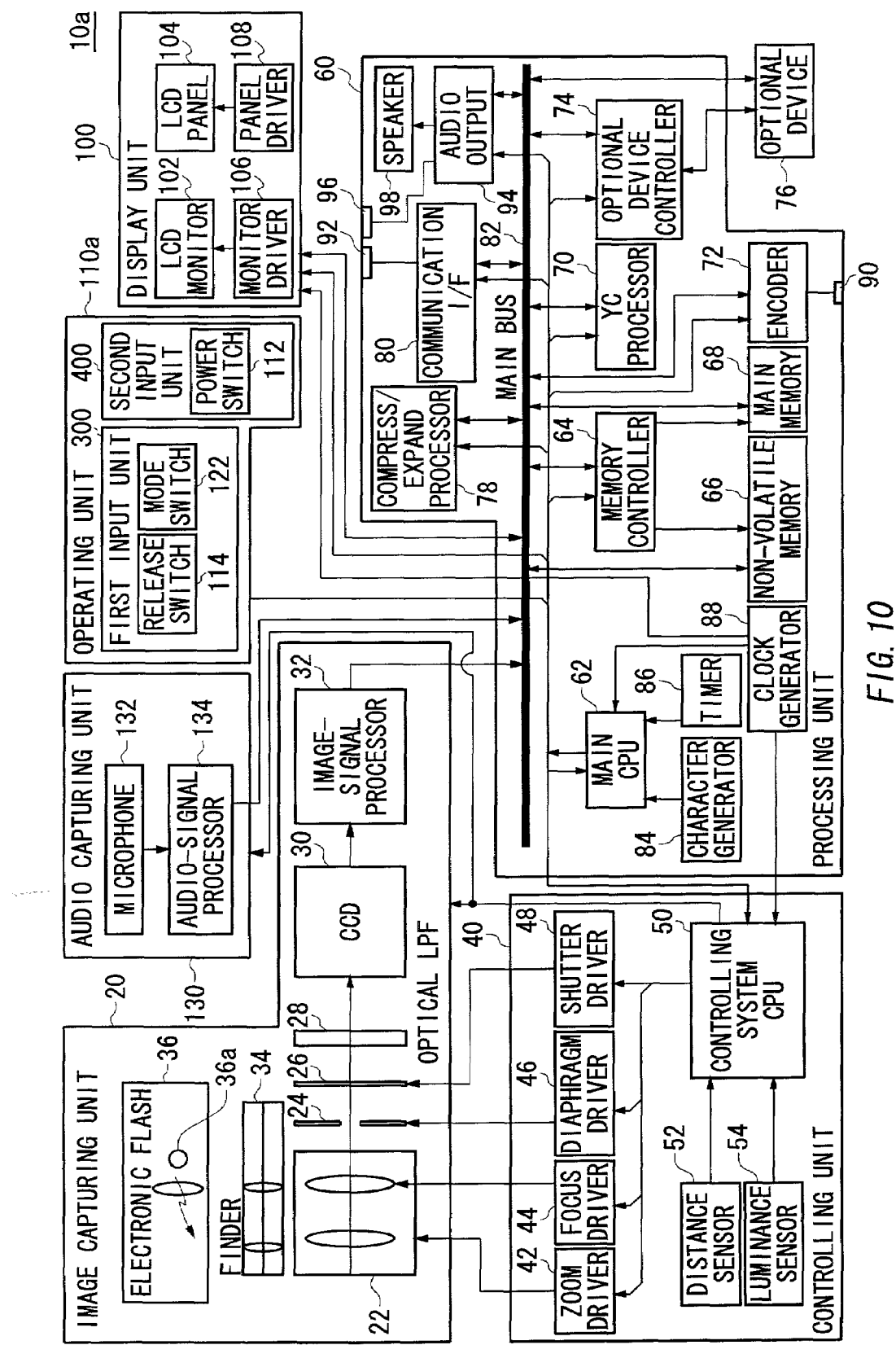
FIG. 10 shows an entire structure of a digital camera according to the second embodiment of the present invention.

FIG. 10 shows an entire structure of a digital camera 10a as an example of a capturing apparatus according to the second embodiment of the present invention. A characteristic input unit in the present embodiment will be described in detail later. The digital camera 10a of the present embodiment can record/reproduce a video in addition to a still image. The digital camera 10a mainly includes the image capturing unit 20, the controlling unit 40, the processing unit 60, the display unit 100 and an operating unit 110a like the digital camera 10 shown in FIG. 1 and an audio capturing unit 130. The components in FIG. 10 that have the same functions or operate in the same manner as those in Embodiment 1 are shown with the same reference numerals and therefore the detailed description is omitted.

Here, the audio capturing unit 130 is described. The audio capturing unit 130 includes mechanical and electric members for capturing external sounds. More specifically, the audio capturing unit 130 includes a microphone 132 that captures the external sounds and processes the captured sounds and an audio-signal processor 134. The audio-signal processor 134 successively performs A/D conversion for the audio signal captured by the microphone 132 at necessary times and outputs audio data obtained by the A/D conversion (hereinafter, referred to as "digital audio data") to the processing unit 60. The audio-signal processor 134 may process the audio signal so as to reduce a noise and/or adjust a sound level.

The processing unit 60 of the present embodiment includes the same components as those in Embodiment 1, that is, the main CPU 62, the memory controller 64, the YC processor 70, the optional device controller 74, the compress/expand processor 78, and the a communication interface (I/F) 80, and also includes an audio output 94 and a speaker 98. The main CPU 62 communicates with the controlling system CPU 50 by serial communication. The operation clock of the main CPU 62 is supplied from the clock generator 88 as in Embodiment 1. Moreover, the processing unit 60 further includes the character generator 84 and the timer 86.

As described in Embodiment 1, the memory controller 64 controls the non-volatile memory 66 that may be implemented by EEPROM (electrically erasable and programmable ROM) or a flash memory or the like, and the main memory 68 that may be implemented by a relatively inexpensive memory having a larger capacity, such as a DRAM. The main memory 68 can store not only data output from the image capturing unit 20 but also data output from the audio capturing unit 130.

The audio output 94 performs an operation for outputting the audio data read from the main memory 68 or the optional device 76 to an external device such as a headphone via the speaker 98 or a headphone jack 96. More specifically, the audio output 94 performs D/A conversion, data expansion, amplification or the like. A part or the whole of these operations may be performed by the main CPU 62.

The other components of the processing unit 60, i.e., the YC processor 70, the encoder 72, the optional device controller 74 and the communication I/F 80 operate in the same or similar manner as/to that described in Embodiment 1. Thus, the detailed description thereof is omitted.

The operating unit 110a of the present embodiment includes mechanisms and electric members required for the user to set or instruct the operation and the mode of the digital camera 10a to the digital camera 10a, as in Embodiment 2. The release switch 114 has a two-step structure allowing half-pressing and complete-pressing of it. For example, in the still-image capturing mode, when the release switch 114 is half-pressed, AF and AE are locked. Then, the release switch 114 is completely pressed, a shot image is taken into the digital camera 10a and is recorded in the main memory 68 and/or the optional device 76 after necessary signal processing and data compression are performed. On the other hand, in the video recording mode, AF and AE are locked when the release switch 114 is half-pressed. Then, when the release switch 114 is completely pressed, the video recording is started. The video recording may continue during a period in which the release switch 114 is pressed, and stops when the release switch 114 is released. Alternatively, the video recording may continue even after the release switch 114 is released once, but stops when the release switch 114 is pressed again. The mode switch 122 is used for setting the operation mode of the digital camera 10a. A first input unit 300 includes a cross key and a liquid crystal display (LCD) part arranged to be wedged in the crossing of the cross key. The input unit 300 also has a function of a zooming switch. The zooming magnification can be set by pressing either of the upper and lower button portions of the cross key. A second input unit 400 includes a power switch 112 as an example of the first button and second buttons arranged in surroundings of the power switch 112. The power switch 112 turns on/off the digital camera 10a. The second buttons include a cancel button, an execution button, a display button or the like. The operations or the functions that can be set by the operating unit 110a include "file format", "special effect", "print", "determine/store", and "change display", for example.

Next, main operations of the digital camera 10a having the above-mentioned structure are described.

First, the power switch 112 of the digital camera 10a turns on, so that the power is supplied to the respective units of the digital camera 10a. The main CPU 62 determines which of a still-image capture mode, a still-image playback mode, a video capture mode, a video playback mode, a function setting mode and a data transfer mode is currently selected by checking the position of the mode switch 122.

In the still-image capture mode, the main CPU 62 monitors the state of the release switch 114. When the release switch 114 is detected to be half-pressed, the main CPU 62 obtains the luminance data and the distance data from the luminance sensor 54 and the distance sensor 52, respectively. Based on the obtained data, the controlling unit 40 works to adjust a focus of the lens section 22 and the size of the aperture of the diaphragm. When the adjustment has been finished, the user is notified the finish of the adjustment, for example, by characters displayed on the LCD monitor 102, such as "stand-by ". Then, the main CPU 62 monitors the state of the release switch 114 whether or not it is completely pressed. When the release switch 114 is completely pressed, the shutter 26 is closed after a predetermined shutter period and the stored electric charges of the CCD 30 are then drained out to the image-signal processor 32. The digital image data generated by the processing by the image-signal processor 32 is output to the main bus 82. The output digital image data is stored temporarily in the main memory 68 and thereafter is subjected to the necessary processing in the YC processor 70 and the compress/expand processor 78. Then, the processed image data is sent to be recorded in the optional device 76 as an example of the recording unit via the optional device controller 74. There corded image is displayed by the LCD monitor 102 at a predetermined period while being freezing, thereby the user can confirm the shot image. As described above, a sequence of still-image capturing operation is finished.

In the still-image playback mode, the main CPU 62 reads the last still image from the main memory 68 via the memory controller 64. The LCD monitor 102 displays the read still image. Moreover, the still image stored in the optional device 76 may be read via the optional device controller 74 to be displayed on the LCD monitor 102. In this operation mode, when the user instructs the digital camera 10*a* via the input unit 300 to perform "NEXT" or "BACK" operation, the next image or the image just before the currently played image is read out to be displayed by the LCD monitor 102.

In the movie capture mode, the main CPU 62 monitors the state of the release switch 114 whether or not it is partly pressed. When it is determined that the release switch 114 is partly pressed, the main CPU 62 adjusts the recording image quality appropriately as in the still-image capture mode. At this time, the audio recording level is also adjusted. Then, the main CPU 62 monitors the state of the release switch 114 whether or not it is completely pressed. When the release switch 114 is detected to be completely pressed, the electric charges stored in the CCD 30 are drained out to the image-signal processor 32 based on predetermined synchronization signals. Then, the digital movie data is successively recorded in the optional device 76 after the similar processing to that in the still-image capture mode. Simultaneously, the audio data captured by the audio-capturing unit 130 is also recorded in the optional device 76. During a period in which the movie is recorded, the main CPU 62 monitors the state of the release switch 114 whether or not it is partly pressed. When it is detected that the release switch 114 is partly pressed, the main CPU 62 stops the movie and audio recoding.

In the movie playback mode, the main CPU 62 reads the movie data from the optional device 76 via the optional device controller 74 based on the user's instruction transmitted from the operating unit 110*a*. The movie data is subjected to the necessary processing in the compress/expand processor 78, the YC processor 70 and the audio output 94 in accordance with the data format. Then, the movie is presented on the LCD monitor 102 while the sound is output to the headphone jack 96 or the speaker 98. The user can transmits the user's instruction of "playback", "stop", "fast-forward", "rewind", "reverse" or "pause" via the operating unit 110*a* so as to playback desired information.

In the function setting mode, the user can operate the input unit 300 in accordance with the guidance displayed by the LCD monitor 102 to set the functions of the digital camera 10*a*. In the data transfer mode, the digital camera 10*a* can transfer the data to the external device via the connector 92.

Figure 11A:
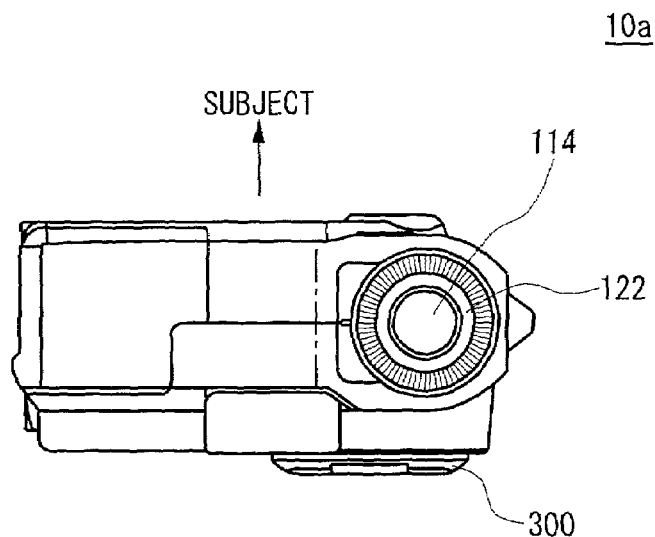
FIG. 11A schematically shows an upper face of the digital camera.
Figure 11B:
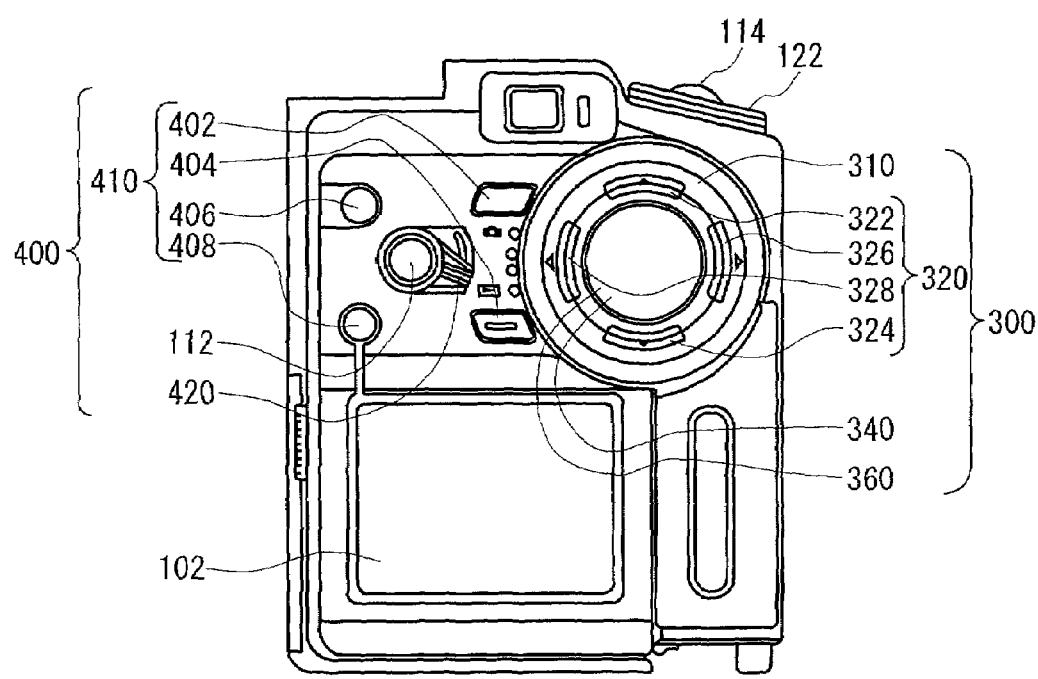
FIG. 11B is a lateral view of the digital camera show in FIG. 11A.

FIGS. 11A and 11B show the appearance of the digital camera 10*a* of the present embodiment. FIG. 11A shows the upper face of the digital camera 10*a* On the upper face of the digital camera 10*a*, the release switch 114 and the mode switch 122 are arranged on the right side when the subject is seen from a direction indicated by an arrow. In this arrangement, when the user holds the digital camera 10*a*, the index finger of the right hand can be placed on the release switch 114 and the mode switch 122. Thus, this arrangement has an excellent operability. FIG. 11B shows a face of the digital camera 10*a* that faces the user when being used (hereinafter, simply referred to as "back face"). The first input unit 300 is arranged on the upper-right side of the center in the back face while the second input unit 400 is arranged on the upper-left side of the center in the back face. In other words, the first input unit 300 is arranged so as to be covered by the index finger of the right hand while the second input unit 400 is arranged at a position to be covered by the thumb of the left hand, when the user holds the digital camera 10*a*. Therefore, this arrangement has an excellent operability.

The input unit 300 includes a switch pressing unit 320 including buttons arranged circularly and a liquid crystal display (LCD) part 360 arranged inside of a periphery of the circle formed by the buttons, a protection glass part 340 arranged to cover the LCD part 360, and a cover 310 for fixing the switch pressing unit 320 to the camera body. The buttons of the switch pressing unit 320 include buttons 322 and 324 arranged at upper and lower positions with respect to the center of the circle formed by the buttons so as to form a pair and buttons 326 and 328 arranged at right and left positions with respect to the center of the circle of buttons so as to form a pair. These buttons serve as a cross key. Various functions are freely assigned to the buttons 322, 324, 326 and 328 of the switch pressing unit 320 depending on the operation modes of the digital camera 10*a*. For example, when the digital camera 10*a* is in the still-image capture mode, the function of the zooming switch is assigned to the upper and lower buttons 322 and 324. When the digital camera 10*a* is in the movie playback mode, functions of "playback", "stop", "fast-forward", "rewind" and the like are assigned to the buttons 322, 324, 326 and 328. The LCD part 360 displays information relevant to the functions of the buttons in the vicinity of the associated buttons. In addition, approximately at the center of the LCD part 360, information related to the operation state of the digital camera 10*a* is displayed. The contents displayed by the LCD part 360 are determined by the main CPU 62 or the like and is transmitted to the LCD part 360 via a driver (not shown).

As described above, the combination of the switch pressing unit 320 serving as the cross key having high operability and the LCD part 360 having high freedom of display can provide the following advantageous effects. First, since various functions are assigned to the buttons freely, the number of the operation buttons can be reduced. Moreover, since functions necessary for the current operation mode can be assigned to the buttons, it is not necessary for the user to look for the button. Thus, the operation of the digital camera 10 can be simplified. In addition, since the LCD part 360 displays the information indicating the functions of the buttons in the vicinity of the corresponding buttons, the user can operate the digital camera 10*a* while confirming the functions currently assigned to the buttons even if the functions assigned to the buttons are changed. Also, the functions assigned to the operation buttons are displayed by the LCD part 360, it is not necessary to print the functions of the operation buttons on an exterior member of the digital camera 10*a*, thus reducing the cost. Moreover, since the LCD part 360 is arranged inside the circle formed by the buttons, the information can be displayed in the vicinity of the respective buttons. Thus, the user can understand how to operate the digital camera by intuition, thereby operating the digital camera without moving the eyes. Furthermore, the arrangement of the buttons and the LCD part 360 described above can realize a smaller and simpler structure as compared to the case of arranging the buttons and the LCD part 360 separately. Furthermore, when the LCD part 360 further displays the operation mode of the digital camera 10a, the user can operate the digital camera 10a while confirming the current operation mode without checking the current position of the mode switch 122.

On the back face of the digital camera 10a, the LCD monitor 102 that is an example of the display unit is provided. In this arrangement, since the LCD monitor 102, the first input unit 300 and the second input unit 400 are arranged on the same face of the camera body, the user can operate the digital camera 10a while confirming both the contents displayed on the LCD monitor 102 and those displayed on the LCD part 360. For example, the LCD monitor 102 may display a menu indicating the functions. In this case, the user can set a desired function by operating the first input unit 300 while confirming the contents of the LCD monitor 102. Moreover, the LCD monitor 102 and the LCD part 360 maybe respectively arranged on two faces of the body of the digital camera 10a that are adjacent to each other. For example, the LCD monitor 102 and the LCD part 360 may be arranged on the back face and the upper face of the digital camera 10, respectively. Also in this case, the user can confirm both the contents displayed on the LCD monitor 102 and the contents displayed on the LCD part 360.

The second input unit 400 includes the power switch 112 as an example of the first button, the second buttons 410 arranged in the surroundings of the power switch 112 and a record/playback state setting switch 420. The second buttons 410 include a cancel button 402 to which a cancel function is assigned, an execution button 404 having an execution function, a shift button 406 for changing the functions assigned to the buttons of the input unit 300 and a display button 408 for turning on/off the display of the LCD monitor 102. The cancel button 402 has a function of canceling the setting, a function of going back the previous menu or the like in the function setting mode, for example. The execution button 404 has a function of executing the setting, a function of making the menu be displayed or the like in the function setting mode. The shift button 406 has a function of changing the functions assigned to other buttons. Thus, this shift button 406 allows a single button to have a plurality of functions. The display button 408 has a function of turning on/off the display the LCD monitor 102. The record/playback state setting switch 420 is used for setting either one of the recording state and the playback state. Therefore, in the present embodiment, the operation mode of the digital camera 10a is set by the mode switch 122 and the record/playback state setting switch 420. The cancel button 402 and the execution button 404 are arranged in the vicinity of the first input unit 300 to constitute a pair, while the display button 408 is arranged in the vicinity of the LCD monitor 102. Therefore, it is easy for the user to understand how to operate the digital camera 10a by intuition, preventing the wrong operation when the user operates the digital camera 10a. Moreover, the respective buttons of the second input unit 300 have shapes different from each other. Thus, the user can discriminate one button from other buttons only by touching the button, without confirming the positions of the buttons. Also, the respective buttons can be discriminated even in a dark place. The shapes of the respective buttons are described later.

Figure 12:
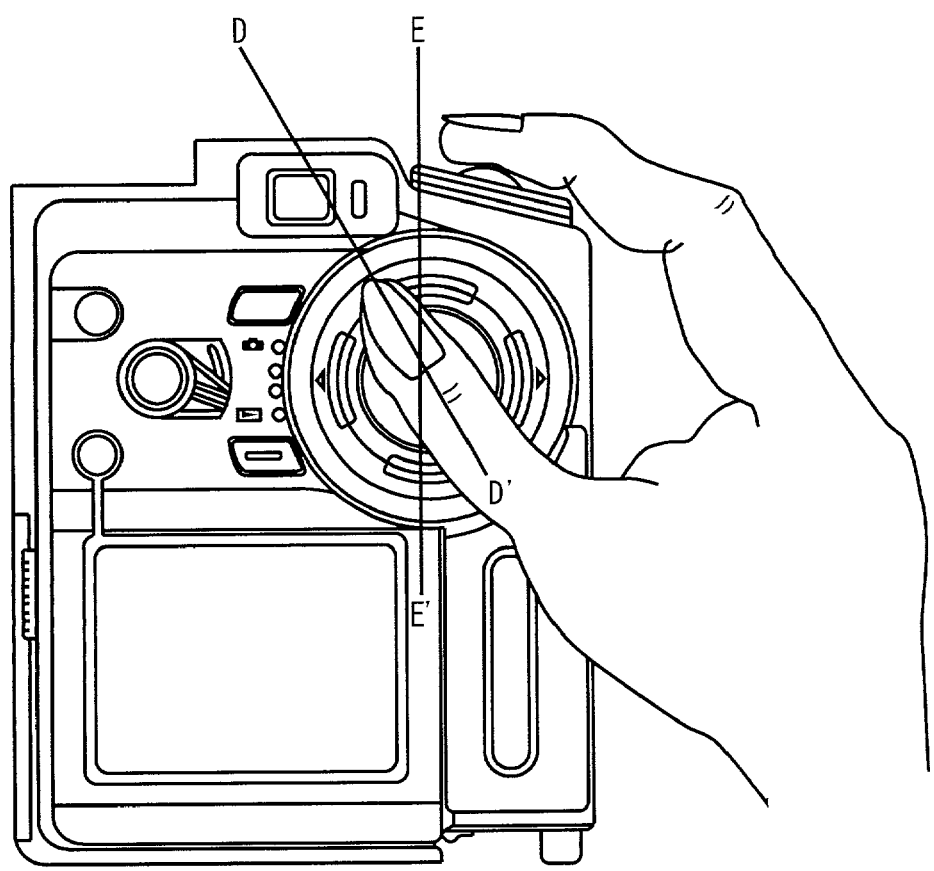
FIG. 12 illustrates the digital camera shown in FIGS. 11A and 11B held by a right hand.

FIG. 12 shows a state where the digital camera 10a of the present embodiment is grasped by a right hand. When the user holds the digital camera 10a by the right hand, the first input unit 300 and the release switch 114 can be covered by the thumb and index finger, respectively. Thus, the user can operate the digital camera 10a easily by a single hand. Line D-D' shown in FIG. 12 indicates a direction connecting the tip and the middle part of the thumb when the user naturally places the thumb on the first input unit 300. Line E-E' indicates a vertical direction of the digital camera 10a. Line D-D' is inclined with respect to Line E-E' to form an angle of about 30 degrees in the counterclockwise direction in a plane of the face of the camera body. The angle of inclination θ is varied depending on the manner in which the user holds the digital camera 10a, but is larger than 0 degree and smaller than 45 degrees in many cases. When the user holds the digital camera 10a as shown in FIG. 12 and brings the tip of the thumb into contact with the camera body while the thumb is placed on the input unit 300, the middle part of the thumb is slightly away from the camera body. Therefore, when the input unit 300 is arranged in such a manner that a level on which the tip of the thumb is to be placed is higher than a level on which the middle part of the thumb is to be placed, the operability is improved from a viewpoint of ergonomics and it is easy to be held.

Figure 13A:
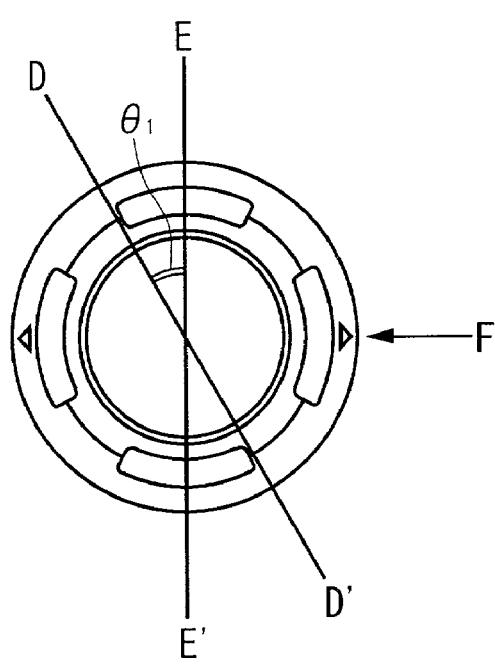
FIGS. 13A and 13B show a structure of a cover of an input unit in the second embodiment of the present invention.
Figure 13B:
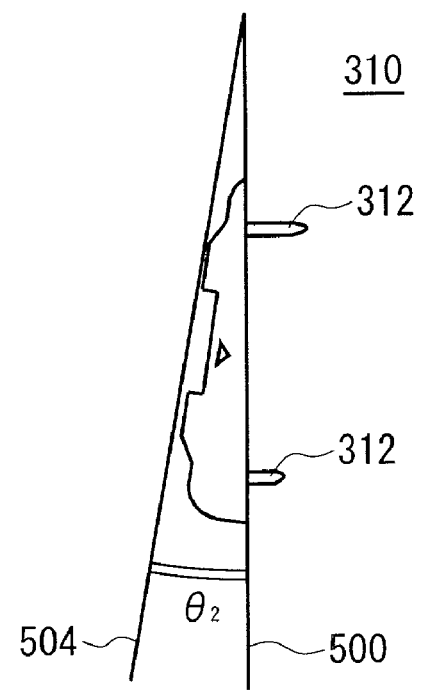

FIGS. 13A and 13B show the cover 310 of the first input unit 300 in the present embodiment. FIG. 13A shows the upper face of the cover 310. The cover 310 has a donut-like shape and has holes at four positions, i.e., upper, lower, right and left positions with respect to the center of the donut. In the holes, the buttons are to be arranged. FIG. 13B is a lateral view of the cover 310 seen from a direction indicated by an arrow F in FIG. 13A. The cover 310 is fixed to the body of the digital camera 10a by a fixing part 312. The fourth face 504 being in contact with the upper face of the cover 310 is inclined with respect to a reference face 500 that is in contact with the face of the camera body on which the first input unit 300 is arranged. Although FIG. 13B shows the angle of inclination while being magnified in order to make it easy to understand the inclination, it is preferable that the inclination angle $\theta_2$ is larger than 0 degree and equal to or less than 10 degrees. When the inclination of the fourth face 504 reaches the maximum inclination, the fourth face 504 is substantially parallel to the direction D-D' in FIG. 13A. In FIG. 13A, the maximum inclination direction D-D' of the fourth face 504 is inclined with respect to the vertical direction E-E' of the digital camera 10a in the plane of the reference face 500. It is preferable that the inclination angle $\theta_1$ is greater than 0 degree and equal to or less than 45 degrees. According to the structure mentioned above, the position on which the tip of the thumb of the user is placed when the user naturally places the thumb on the input unit 300 is the lowest, while the position on which the middle part of the thumb of the user is the highest. Therefore, it is easy to hold the digital camera 10a and the operability is improved.

FIGS. 14A, 14B, 14C and 14D show the switch pressing unit 320 of the first input unit 300 of the present embodiment. FIG. 14A shows the upper face of the switch pressing unit 320. The switch pressing unit 320 includes a plurality of buttons 322, 324, 326 and 328 and connecting parts 330 for connecting the respective buttons, that are arranged to constitute a loop entirely. It should be noted that the loop in the context of the present application does not necessarily have a circular shape. The loop may be angular as long as all of the buttons 322, 324, 326 and 328 and the connecting parts 330 are linked. The buttons include the upper button 322 arranged upper than the center of the loop, the lower button 324 arranged lower than the center, the right button 326 arranged on the right side of the center and the left button 328 arranged on the left side of the center. The connecting part 330 includes an axis 332 serving as a rotation axis of the upper button 322 and an axis 324 serving as a rotation axis of the lower button 324. Since the buttons are arranged at positions to form pairs in such a manner that the buttons are opposed to each other with the center of the loop sandwiched therebetween, it is easy for the user to understand how to operate the digital camera 10a by intuition, for example, when the user performs the operations of "magnify" and "reduce" in the zooming operation, moves the selecting portion upwardly and downwardly or right and left directions in the function setting menu or performs the operations of "fast-forward", "rewind" or the like while the movie is being played. The upper and lower buttons 322 and 324 are larger than the right and left buttons 326 and 328. In many cases, the zoom switch is practically implemented by upper and lower switches arranged to form a pair, and therefore in the present embodiment the magnifying function and the size-reducing function are assigned to the upper and lower buttons 322 and 324, respectively. Since the zoom switches are used more frequently than other switches, larger switches are used as the zoom switches, thereby making the user press the buttons easily.

FIG. 14B is a lateral view of the switch pressing unit 320 seen from the direction indicated by the arrow F in FIG. 14A. The first face 501 that is in contact with the upper face of the button of the switch pressing unit 320 is inclined with respect to the reference face 500 on which the switch pressing unit 320 is brought into contact with the face of the camera body. That is, the level of the upper button 322 is different from that of the lower button 324. In the present embodiment, the level of the upper button 322 is lower than that of the lower button 324. Although the inclination angle is shown while being magnified in order to make the understanding of the inclination easier in FIG. 14B, it is preferable that the inclination angle $\theta_4$ is larger than 0 degree and equal to or less than 10 degrees. When the inclination of the first face 501 reaches the maximum inclination, the first face 501 becomes parallel to the direction D-D'. In FIG. 14A, the maximum inclination direction D-D' of the first face 501 is inclined with respect to the vertical direction E-E' of the digital camera 10a on the plane of the reference face 500. It is preferable that the inclination angle $\theta_3$ is larger than 0 degree and equal to or less than 45 degrees. According to the above structure, the level on which the tip of the thumb of the user is positioned is the lowest while the level on which the middle part of the thumb is positioned is the highest, when the user naturally places the thumb on the first input unit 300. Thus, it is easy for the user to hold the digital camera 10a and the operability is improved.

FIG. 14C shows a state where the right button 326 is pressed. Since the connecting part 330 is formed from material easy to be distorted, like resin, the connecting part 330 is distorted when the right button 326 is pressed, so that the button 326 goes down. As a result, the switch arranged under the right button 326 is pressed. In a case of pressing the left button 328, the left button 328 goes down in a similar manner to the right button 326, thereby pressing the switch arranged under the left button 328. A part of the connecting part 330, that includes the axes 332 and 334, is fixed between the camera body and the cover 310. Therefore, when a certain button is pressed down, it is possible to prevent the displacement of other buttons.

FIG. 14D shows a state where the upper button 322 is pressed down. When the upper button 322 is pressed down, the upper button 322 rotates around the axis 334 towards the outside of the switch pressing unit 320. Thus, the switch arranged under the upper button 322 is pressed. Therefore, it is easy to operate the switch because the switch can be pressed without pressing the button down vertically from right above. In addition, as compared to the case where the button is pressed vertically, the switch can be arranged at the outer position.

In the switch pressing unit 320 of the present embodiment, the four buttons have the shapes different from each other. However, since the differences between the respective buttons are small, there is a possibility that the buttons are arranged at wrong positions or in a wrong direction in an assembly process of the digital camera 10a. In order to prevent this, it is preferable to provide a means with the button indicating the correct direction. For example, a minute protrusion may be provided on the back of the upper button 322. In this case, a person working in the assembly process can find which button is the upper button 322. Therefore, the person can arrange the switch pressing unit 320 in the correct direction.

Figure 15A:
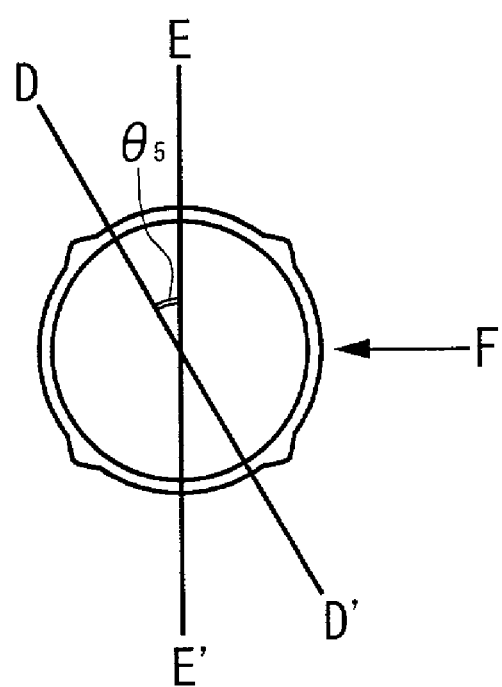
FIGS. 15A and 15B show a structure of a protection glass part of the input unit in the second embodiment of the present invention.
Figure 15B:
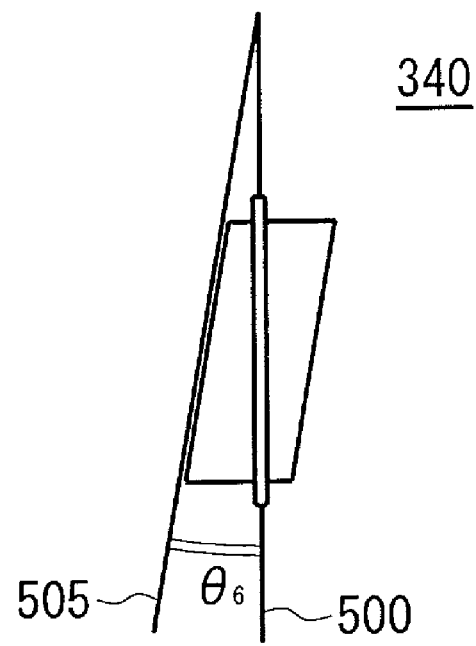

FIGS. 15A and 15B show the protection glass part 310 of the input unit 300 in the present embodiment. FIG. 15A shows the upper face of the protection glass part 340. The protection glass part 340 is formed from a transparent member such as glass or resin, and has a circular shape. The protection glass part 340 is arranged to cover the LCD part 360 so as to protect the display screen of the LCD part 360. FIG. 15B is a lateral view of the protection glass part 340 seen from the direction indicated by the arrow F in FIG. 15A. The fifth face 505 including the surface of the protection glass part 340 is inclined with respect to a reference face 500. Although FIG. 15B shows the angle of inclination while being magnified in order to make it easy to understand the inclination, it is preferable that the inclination angle $\theta_6$ is larger than 0 degree and equal to or less than 10 degrees. When the inclination of the fifth face 505 reaches the maximum inclination, the fifth face 505 is parallel to the direction D-D' in FIG. 15A. In FIG. 15A, the maximum inclination direction D-D' of the fifth face 505 is inclined with respect to the vertical direction E-E' of the digital camera 10a in the plane of the reference face 500. It is preferable that the inclination angle $\theta_5$ is larger than 0 degree but does not exceed 45 degrees. According to the structure mentioned above, the level on which the tip of the thumb of the user is placed when the user naturally places the thumb on the input unit 300 is the lowest, while the level on which the middle part of the thumb of the user is the highest. Therefore, it is easy to hold the digital camera 10a and the operability is improved.

Figures 16A, 16B:
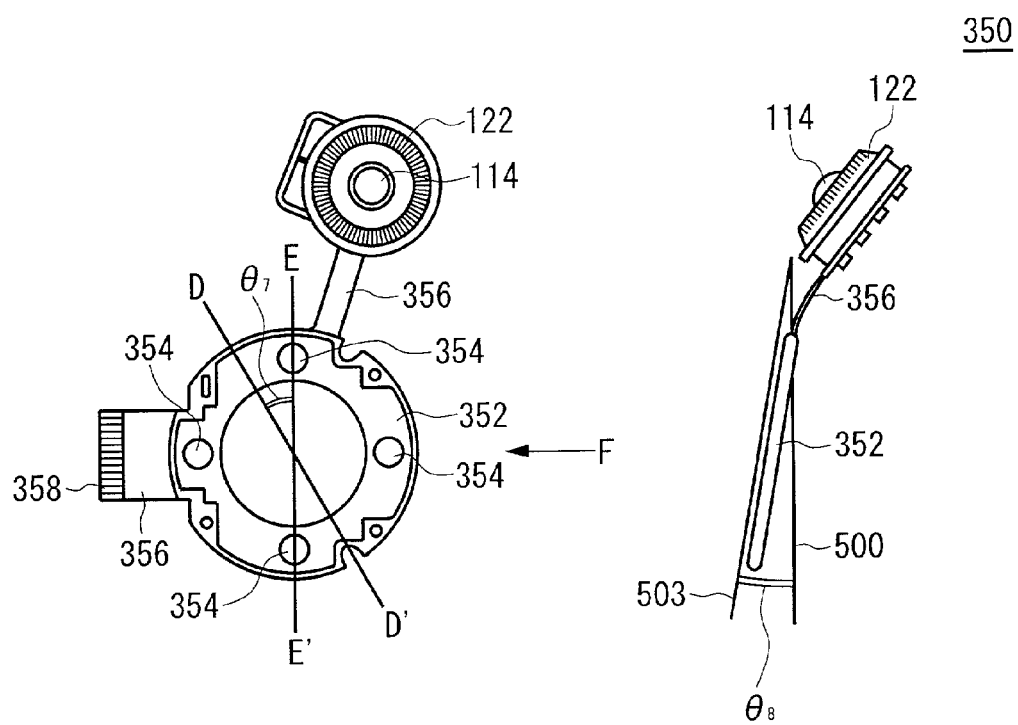
FIGS. 16A and 16B show a structure of a switch unit of the input unit in the second embodiment of the present invention.

FIGS. 16A and 16B show a switch unit 350 of the input unit 300 in the present embodiment. FIG. 16A shows the upper face of the switch unit 350. The switch unit 350 includes a ring-like substrate 352 on which switches are to be positioned, a plurality of switches 354 arranged in a ring-like shape, the mode switch 122 for setting the operation mode of the digital camera 10a, the release switch 114 for instructing the capturing the image to the digital camera 10a, a connector 358 for transmitting signals from a switch 352, the mode switch 122 and the release switch 354, and a flexible wiring substrate 356 for electrically connecting the switches 354, the mode switch 122 and the release switch 114 to the connector 368 entirely. The switches 354 work by being pressed by the buttons of the switch pressing unit 320. The switches 354 may be implemented by a metal dome switch, for example. The release switch 114 and the mode switch 122 are arranged on the upper face of the digital camera 10a while the ring-like substrate 352 is arranged on the back of the digital camera 10a. As the size of the digital camera 10a is reduced, the distance between the switches is also reduced. As a result, the switches can be arranged integratedly. Accordingly, the assembly process can be simplified.

FIG. 16B is a lateral view of the switch unit 350 seen from the direction indicated by the arrow F in FIG. 16A. The switches 354 work by being pressed by the buttons of the switch pressing unit 320 as described above. Since the buttons of the switch pressing unit 320 are arranged in such a manner that the first face 501 being in contact with the upper face of the switch pressing unit 320 is inclined with respect to the reference face 500, it is preferable to arrange the ring-like substrate 352 to be inclined so as to correspond to the buttons of the switch pressing unit 320. Therefore, when the switch unit 350 is arranged in the digital camera 10a, the third face 503 that is in contact with the switches 354 of the switch unit 350 is inclined with respect to the reference face 500. Although FIG. 16B shows the angle of inclination while being magnified in order to make it easy to understand the inclination, it is preferable that the inclination angle $\theta_8$ is larger than 0 degree but does not exceed 10 degrees. The switch unit 350 may be arranged to make the third face 503 substantially parallel to the reference face 500. In this case, the shapes of the buttons of the switch pressing unit 320 are adjusted to allow the buttons to press the switches 354.

Figure 17A:
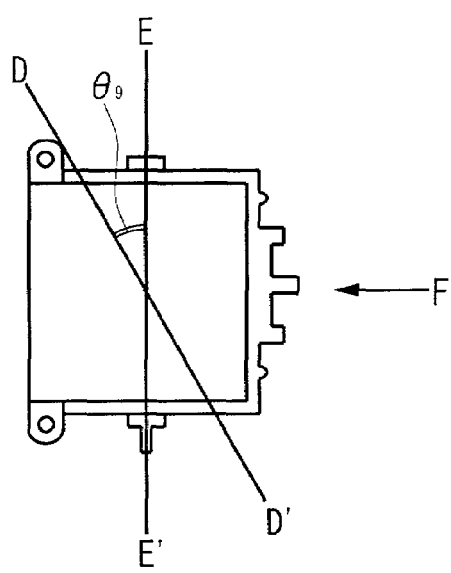
FIGS. 17A and 17B show a structure of an LCD part of the input unit in the second embodiment of the present invention.
Figure 17B:
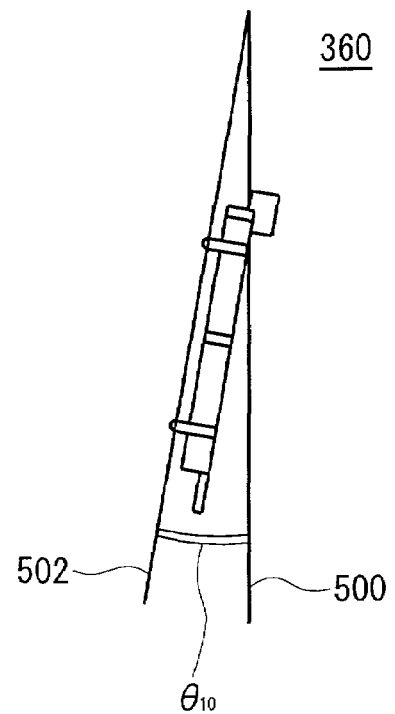

FIGS. 17A and 17B show the LCD part 360 of the input unit 300 in the present embodiment. FIG. 17A shows the upper face of the LCD part 360. The LCD part 360 displays information related to the functions assigned to the switches 354 in the vicinity of the buttons respectively corresponding to the switches 354. Moreover, the LCD part 360 displays information related to the operation mode of the digital camera 10a. FIG. 17B is a lateral view of the LCD part 360 seen from the direction indicated by the arrow F in FIG. 17A. The second face 502 including the display screen of the LCD part 360 is inclined with respect to the reference face 500. Although FIG. 17B shows the angle of inclination while being magnified in order to make it easy to understand the inclination, it is preferable that the inclination angle $\theta_{10}$ is larger than 0 degree but does not exceed 10 degrees. In most cases where the user uses the digital camera 10a, the user operates the digital camera 10a at a position that is lower than the user's eyes. In these cases, when the display screens of the LCD part 360 is arranged to be inclined in such a manner that the lower side of each display screen comes ahead of the upper side thereof, the angle between the user's eyes and the display screen is close to a right angle, thereby allowing the user to easily view the contents of the LCD part 360.

In the present embodiment, since the input unit 300 is arranged on the upper-right side of the center of the back face of the digital camera 10a, the user operates the input unit 300 by the thumb of the right hand. Therefore, in FIGS. 12 to 17B, the direction D-D' is inclined with respect to the direction E-E' in the counterclockwise direction. In a case where the input unit 300 is arranged on the upper-left side of the center of the back face of the digital camera 10a, the user operates the input unit 300 by the thumb of the left hand. Thus, it is preferable that the direction D-D' is inclined with respect to the direction E-E'.

Figure 18:
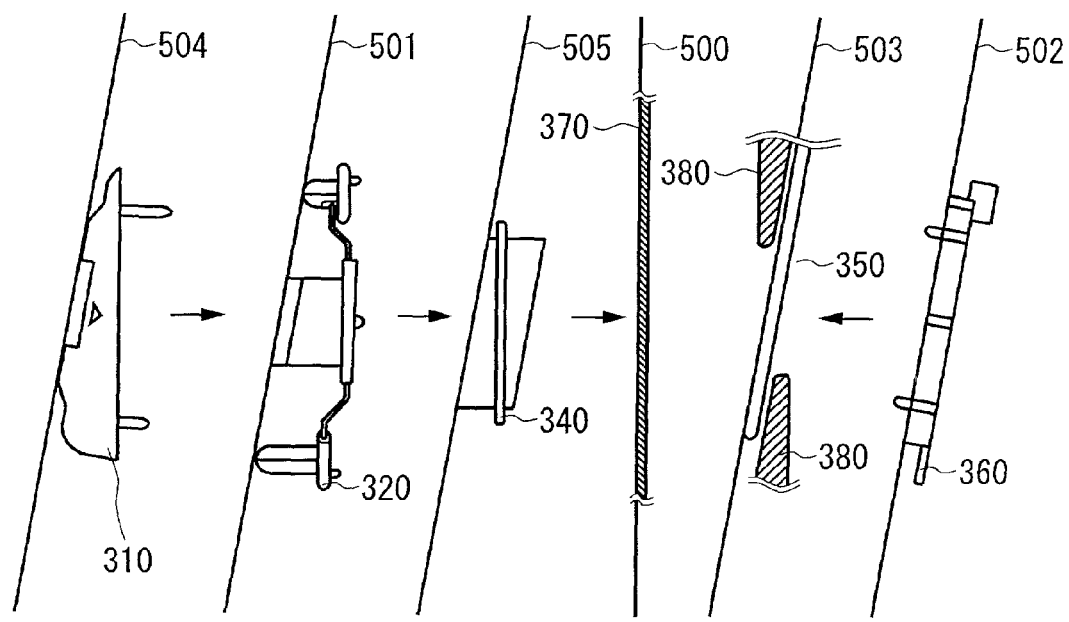
FIG. 18 illustrates how to arrange the input unit on a body of the digital camera in the second embodiment of the present invention.

FIG. 18 shows a state where the input unit 300 is provided on the body of the digital camera 10a. On the outer side of the camera body 370, the cover 310, the switch pressing unit 320 and the protection glass part 340 are arranged in that order in such a manner that the protection glass part 340 is the closest to the camera body 370. The cover 310 fixes the switch pressing unit 320 and the protection glass part 340 from the outer side of the camera body 370. On the inner side of the camera body 370, a resin body 380 formed by mold injection. To the resin body 380, the switch unit 350 and the LCD part 360 are fixed. The first, second, third, fourth and fifth faces 501, 502, 503, 504 and 505 are arranged to be inclined with respect to the reference face 500 in such a manner that they are substantially parallel to each other. Although all the faces 501 to 505 are arranged to be substantially parallel to each other in the present embodiment, the faces 501 to 505 may be inclined to have different inclination angles from each other. Moreover, the faces 501 to 505 may be inclined towards different directions.

In one arrangement of the embodiment, it may be applicable to have at least one switch of the switch unit arranged in surroundings of the display part is inclined with respect to the a body face of the capturing apparatus. In this case, the display face may be inclined with respect to or in parallel with the body face of the capturing apparatus.

In the present embodiment, the circular display screen is realized by using the LCD part 360 having the square display screen. Therefore, in order to arrange the switch unit 350 under the LCD part 360, it is necessary to arrange the switch 352 outer than the square display screen of the LCD part 360. In this case, however, it is necessary to the switch 352 outer than the buttons of the switch pressing unit 320. This is not preferable from a viewpoint of the size reduction. In order to solve this problem, the switch unit 350 is arranged above the LCD part 360 in the present embodiment. That is, the switch unit 350 is arranged between the switch pressing unit 320 and the LCD part 360. In this case, the switch 352 can be arranged to become inner, thereby reducing the size of the digital camera 10a and improving the operability.

Figure 19A:
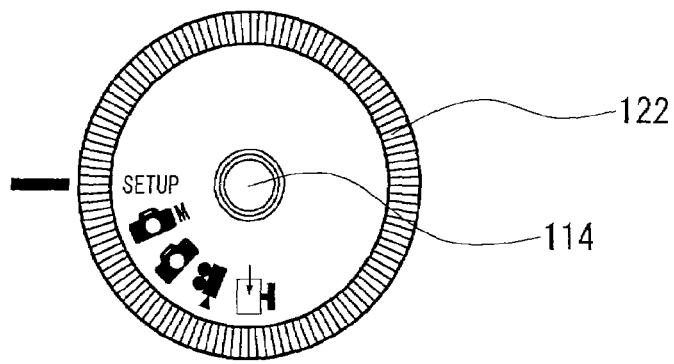
FIGS. 19A, 19B and 19C show exemplary screens of the LCD part and the LCD monitor in the function setting mode in the second embodiment of the present invention.
Figure 19B:
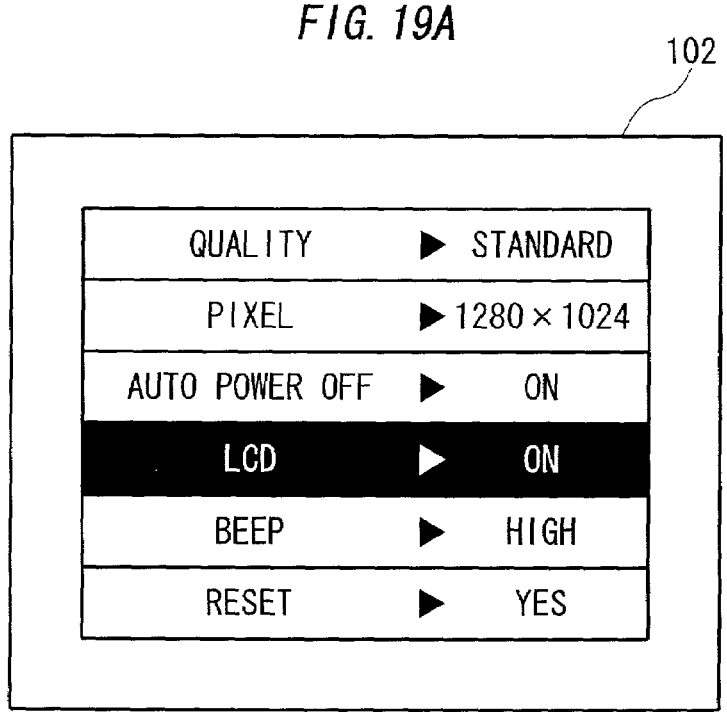
Figure 19C:
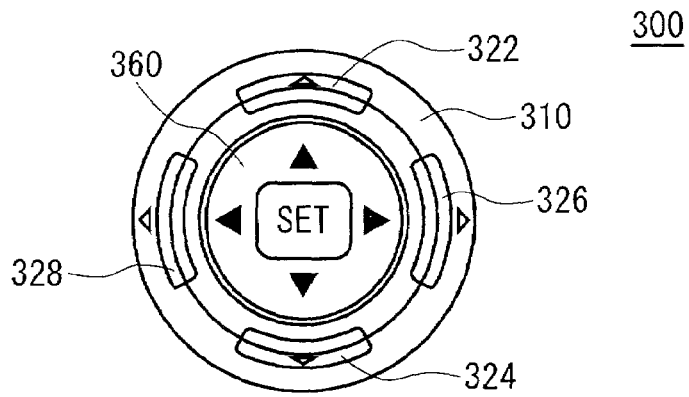

FIGS. 19A, 19B and 19C show exemplary screens displayed on the LCD monitor 102 and the LCD part 360 when the digital camera 10a of the present embodiment is in the function setting mode. FIG. 19A shows a state where the mode switch 122 is set to the function setting mode. FIG. 19B shows the exemplary screen of the LCD monitor 102. The LCD monitor 102 displays a function setting menu. The function currently selected is displayed while being reversed in color. A triangle located on the right side of the name of each function indicates that the setting of the corresponding function can be changed by pressing down the right and left buttons 326, 328. FIG. 19C shows the exemplary screen of the LCD part 360. The LCD part 360 displays a symbol indicating that the digital camera 10a is now in the function setting mode approximately at the center of the screen and also displays symbols indicating that the buttons have function of arrow keys in the vicinity of the respective buttons. For example, the function of moving the currently selected position upwardly in the function setting menu is assigned to the upper button 322, while the function of changing the current setting of the selected menu is assigned to the right button 326.

Figure 20A:
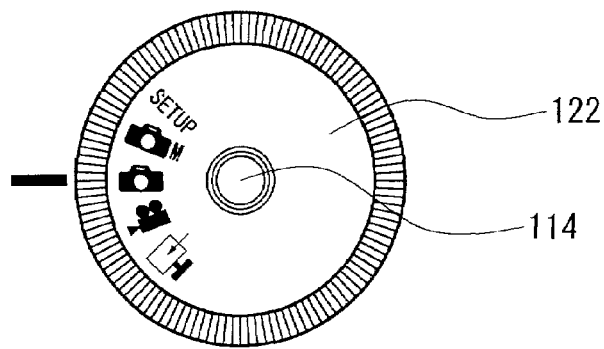
FIGS. 20A, 20B and 20C show exemplary screens of the LCD part and the LCD monitor in the still-image capture mode in the second embodiment of the present invention.
Figure 20B:
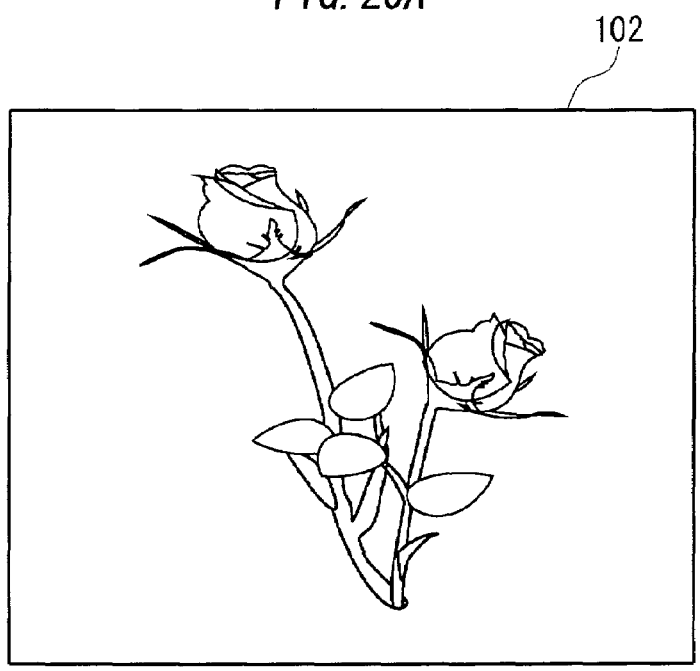
Figure 20C:
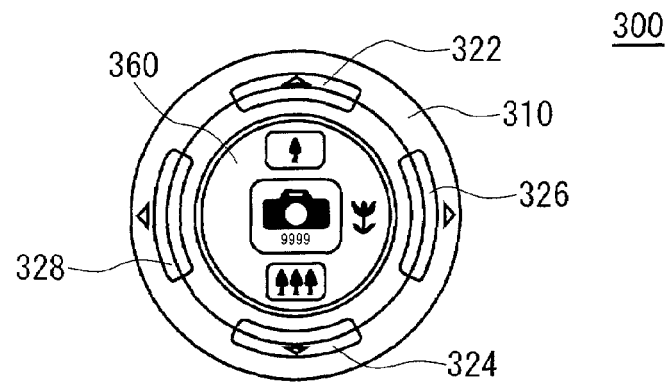

FIGS. 20A, 20B and 20C show the exemplary screens of the LCD monitor 102 and the LCD part 360 when the digital camera 10a of the present embodiment is in a still-image capture mode. FIG. 20A shows a state where the mode switch is set to the still-image capture mode. FIG. 20B shows the exemplary screen displayed on the LCD monitor 102. The LCD monitor 102 displays an image shot by the image-capturing unit 20. FIG. 20C shows the exemplary screen displayed on the LCD part 360. The LCD part 360 displays a symbol indicating that the digital camera 10a is now in the still-image capturing mode approximately at the center of the screen, and also displays symbols indicating the functions assigned to the buttons in the vicinity of the respective buttons. For example, a zooming (magnifying) function is assigned to the upper button 322, and a close-up capturing function is assigned to the right button 326. As a background color of the LCD part 360, orange is selected for indicating that the digital camera 10*a* is in the capturing mode in the present embodiment. In the case where the magnifying function and a reducing function are respectively assigned to the upper and lower buttons 322, 324 as described above, the relative positions of the buttons with respect to the LCD part 360 correspond to the functions of the buttons. Thus, the user can perform a correct operation even if the user does not know the functions assigned to the respective buttons or the meaning of the symbols.

Figure 21A:
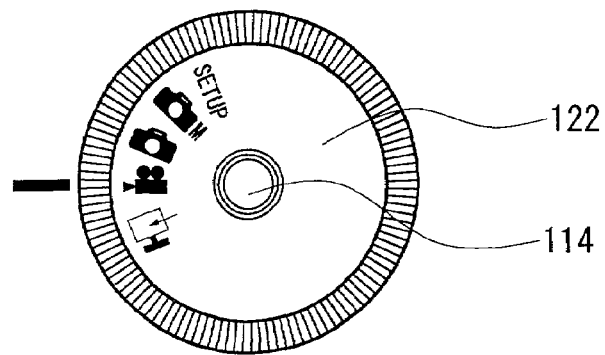
FIGS. 21A, 21B and 21C show exemplary screens of the LCD part and the LCD monitor in the movie playback mode in the second embodiment of the present invention.
Figure 21B:
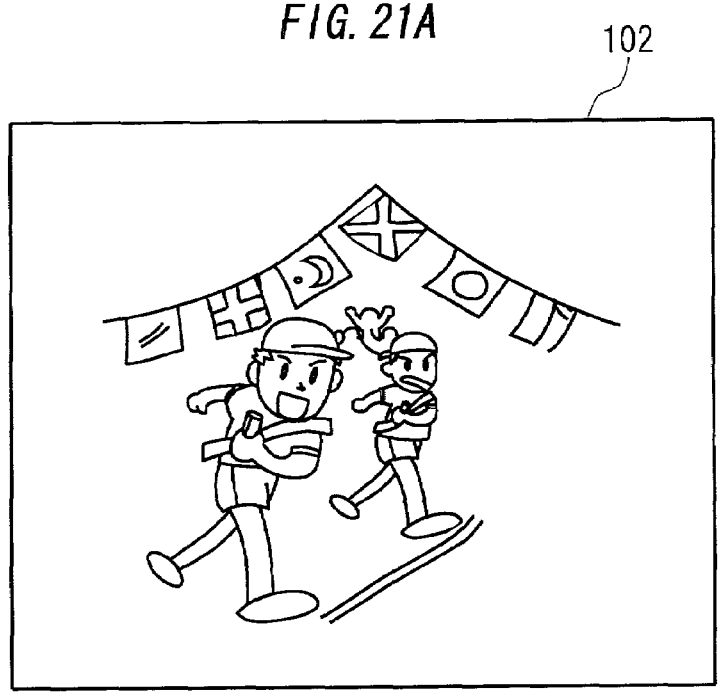
Figure 21C:
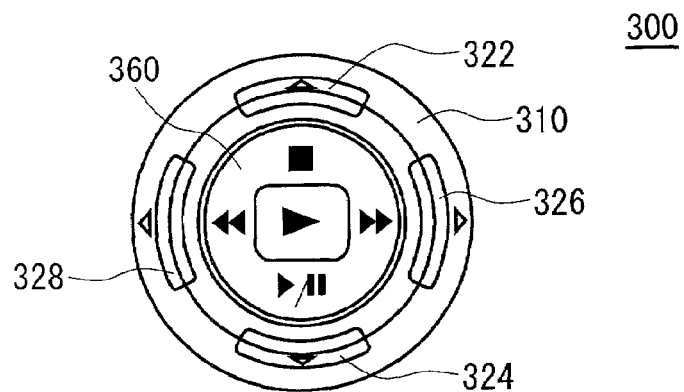

FIGS. 21A, 21B and 21C show exemplary screens displayed on the LCD monitor 102 and the LCD part 360, respectively, when the digital camera 10*a* of the present embodiment is in a movie-playback mode. FIG. 21A shows a state where the mode switch 122 is set to the movie-playback mode. FIG. 21B shows the exemplary screen displayed on the LCD monitor 102. The LCD monitor 102 displays the movie being played. FIG. 21C shows the exemplary screen displayed on the LCD part 360. The LCD part 360 displays a symbol indicating that the digital camera 10*a* is now playing the movie approximately at the center of the screen, and also displays symbols indicating the functions assigned to the buttons in the vicinity of the respective buttons. For example, a function of stopping the playback of the movie is assigned to the upper button 322, while a function of fast-forwarding the movie is assigned to the right button 324. As the background color of the LCD part 360, green is selected for indicating that the digital camera 10*a* is in a playback mode. By the arrangement described above, the user can understand how to operate the digital camera 10 by intuition, so as to easily operate the digital camera 10 quickly.

As described in Embodiment 1, the background color of the LCD part 360 is determined mainly by the main CPU 62 or the like, in accordance with the operation state of the digital camera 10*a*. The background color of the LCD part 360 may be realized by a backlight color. The backlight of the LCD part 360 may be turned on only in a predetermined period after the operation mode is changed, and thereafter be turned off. In this case, the power consumption can be reduced. As the backlight of the LCD part 360, red and green LEDs may be used, for example. In this case, three colors, i.e., red, green and orange can be realized. Orange is realized by turning both the red and green LEDs on simultaneously. For example, the background color may be orange when the digital camera 10*a* is in the capturing mode; green when the digital camera 10*a* is in the playback mode; and red when the digital camera 10*a* displays a warning to the user. In this case, the user can find the operation state of the digital camera 10*a* by intuition. In a case where the LCD part 360 is implemented by a color LCD, the background color may be realized by displaying areas other than information such as the symbols in the same color.

The background color of the LCD part 360 may be changed depending on recording folders into which information is recorded. For example, green may be selected as the background color when a folder for a private use is selected, or orange may be selected when a folder for jobs is selected. In this case, the user can find the usage of the recording folder by the background color when the user selects the recording folder, thereby preventing a wrong operation.

Figure 22A:
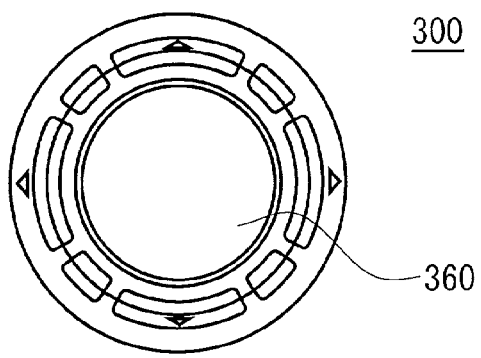
FIGS. 22A, 22B, 22C and 22D show other examples of the input unit in the second embodiment of the present invention.
Figure 22B:
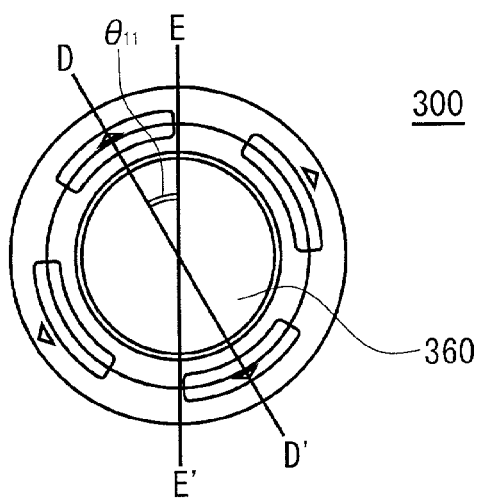
Figure 22C:
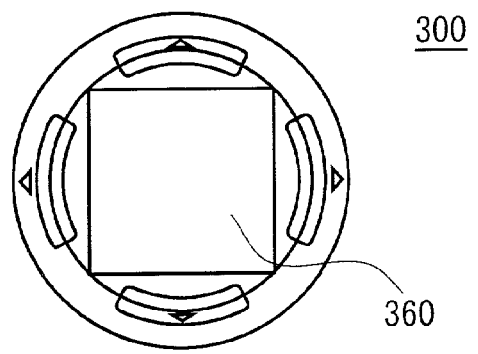
Figure 22D:
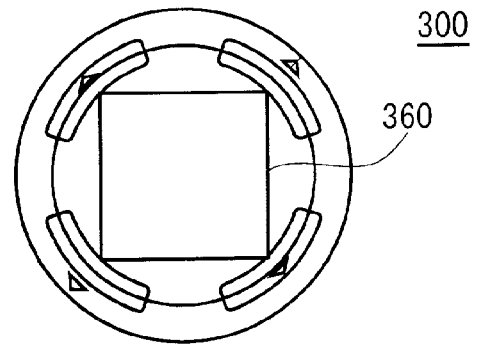

FIGS. 22A, 22B, 22C and 22D show other examples of the first input unit 300. FIG. 22A shows an example in which eight buttons are arranged. It is preferable that the buttons are arranged to form pairs in such a manner that the buttons of each pair are opposed to each other with the center of the ring sandwiched therebetween. FIG. 22B shows an example in which the buttons are arranged to be inclined. Line D-D' connecting the buttons arranged in the upper and lower areas with respect to the center of the ring is inclined with respect to the vertical direction E-E' of the digital camera 10*a* on the plane of the reference face. In this example, the direction connecting the tip and the middle part of the thumb of the user is substantially coincident with the direction connecting the upper and lower buttons. Therefore, it is easy to press the buttons. It is preferable that the inclination angle $\theta_{11}$ is larger than 0 degree and equal to or less than 45 degrees. It is not preferable that the inclination angle $\theta_{11}$ exceeds 45 degrees because the vertical direction and the horizontal direction are wrongly detected. FIG. 22C shows an example in which the LCD part 360 has a square shape. FIG. 22D shows an example in which the buttons are arranged at positions corresponding to apices of the square LCD part 360.

Figures 23A, 23B:
FIG. 23A is a plan view of a cancel button of the second input unit.
FIG. 23B is a cross-sectional view of the cancel button taken along Line Y-Y' in FIG. 23A.

FIGS. 23A and 23B show the cancel button 402 of the second input unit 400. FIG. 23A shows the upper face of the cancel button 402. The cancel button 402 of the present embodiment has a shape of substantially parallelogram. FIG. 23B is a cross-sectional view of the cancel button 402 taken along Line Y-Y' in FIG. 23A. The surface of the cancel button 402 has a convex shape.

Figures 24A, 24B:
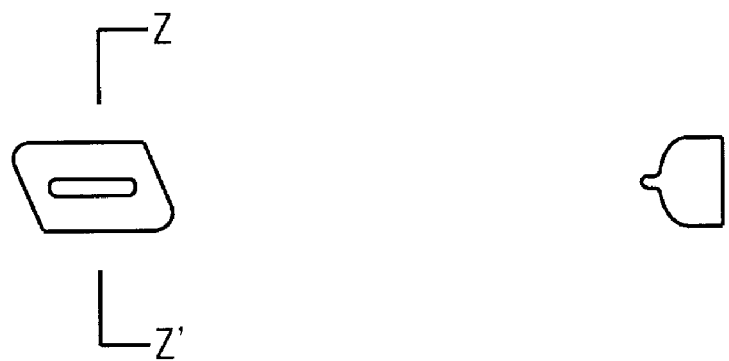
FIG. 24A is a plan view of an execution button of the second input unit.
FIG. 24B is a cross-sectional view of the execution button taken along Line Z-Z' in FIG. 24A.

FIGS. 24A and 24B show the execution button 404 of the second input unit 400. FIG. 24A shows the upper face of the execution button 404. The execution button 404 of the present embodiment has a shape of substantially parallelogram. FIG. 24B is a cross-sectional view of the execution button 404 taken along Line Z-Z' in FIG. 24A. The surface of the cancel button 404 has a convex shape having a protrusion in the vicinity of the center thereof. As described above, the cancel button 402 and the execution button 404 have the similar shapes in the present embodiment. However, since only the execution button 404 has the protrusion, the cancel button 402 and the execution button 404 can be discriminated from each other by the presence of the protrusion.

Figures 25A, 25B:
FIG. 25A is a plan view of a shift button of the second input unit.
FIG. 25B is a cross-sectional view of the shift taken along Line W-W' in FIG. 25A.

FIGS. 25A and 25B show the shift button 406 of the second input unit 400. FIG. 25A shows the upper face of the shift button 406. The shift button 406 of the present embodiment has a circular shape. FIG. 25B is a cross-sectional view of the shift button 406 taken along Line W-W' in FIG. 25A. The surface of the shift button 406 has a convex shape.

Figures 26A, 26B:
FIG. 26A is a plan view of a display button of the second input unit.
FIG. 26B is a cross-sectional view of the display button taken along Line X-X' in FIG. 26A.

FIGS. 26A and 26B show the display button 408 of the second input unit 400. FIG. 26A shows the upper face of the display button 408. The display button 408 of the present embodiment has a circular shape. FIG. 26B is a cross-sectional view of the display button 408 taken along Line X-X' in FIG. 26A. The surface of the shift button 406 has a concave shape. As described above, the shift button 406 and the display button 408 have the similar shapes in the present embodiment. However, since the shift button 406 is convex while the display button 408 is concave, the shift button 406 and the display button 408 can be discriminated from each other by touching them. Alternatively, the shift button 406 and the display button 408 may have a concave shape and a convex shape, respectively. Moreover, the shift button 406 is used more frequently than the display button 408, in general. Thus, when the degree of the convex of the shift button 406 is made larger, the operability can be improved.

The areas of the cancel and execution buttons 404 are larger than those of the shift and display buttons 406 and 408. In general, the cancel and execution buttons 402 and 404 are used more frequently than the shift and display buttons 406 and 408. Therefore, when the areas of the cancel and execution buttons 402 and 404 are made larger, it becomes easier for the user to press the buttons, thereby improving the operability.

In the present embodiment, the buttons of the second input unit 400 has the shapes different from each other. Therefore, the user can discriminate each button from other buttons only by touching the buttons without seeing the buttons. The buttons have the shapes of the parallelogram and the circle in the present embodiment. However, the shapes of the buttons are not limited thereto. The shapes of the buttons may have any desired shapes.

Embodiment 3

Figure 27:
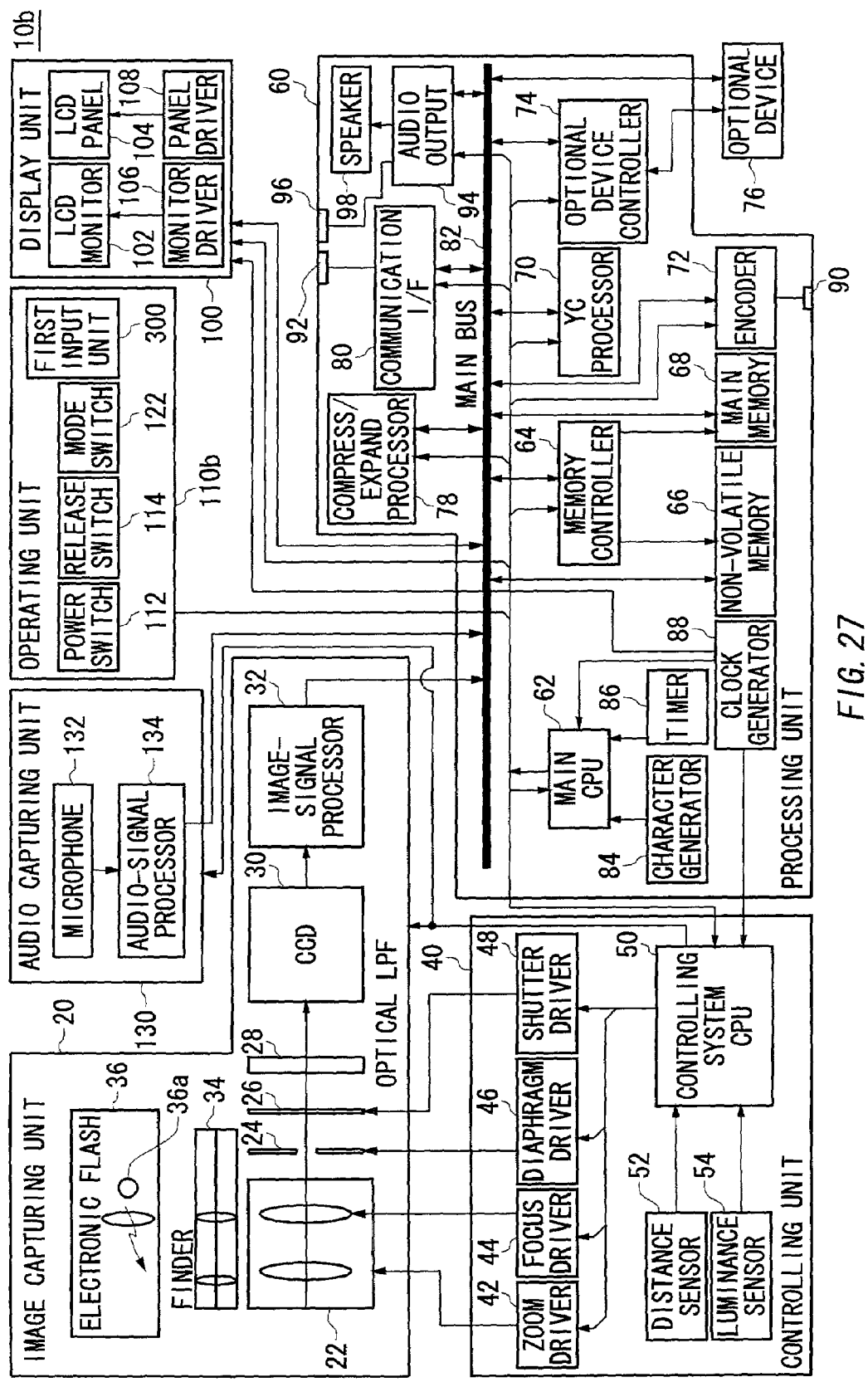
FIG. 27 shows an entire structure of a digital camera according to the third embodiment of the present invention.

FIG. 27 shows an entire structure of a digital camera 10b as an example of a capturing apparatus according to the third embodiment of the present invention. The digital camera 10b of the present embodiment can record/reproduce a video in addition to a still image. The digital camera 10b mainly includes the image capturing unit 20, the controlling unit 40, the processing unit 60, the display unit 100 and an operating unit 110b and the audio capturing unit 130 like the digital camera 10b described in Embodiment 2. The components in FIG. 27 that have the same functions or operate in the same manner as those in Embodiments 1 and 2 are shown with the same reference numerals and therefore the detailed description is omitted.

In the present embodiment, the operating unit 110b has a structure that is slightly different from those described in Embodiments 1 and 2. Thus, the operating unit 110b is briefly described.

The operating unit 110b of the present embodiment includes mechanisms and electric members required for the user to set or instruct the operation and the mode of the digital camera 10b to the digital camera 10b, as in Embodiments 1 and 2. The release switch 114 has a two-step structure allowing half-pressing and complete-pressing of it. For example, in the still-image capturing mode, when the release switch 114 is half-pressed, AF and AE are locked. Then, the release switch 114 is completely pressed, a shot image is taken into the digital camera 10b and is recorded in the main memory 68 and/or the optional device 76 after necessary signal processing and data compression are performed. On the other hand, in the video recording mode, AF and AE are locked when the release switch 114 is half-pressed. Then, when the release switch 114 is completely pressed, the video recording is started. The video recording may continue during a period in which the release switch 114 is pressed and stop when the release switch 114 is released. Alternatively, the video recording may continue even after the release switch 114 is released once but stop when the release switch 114 is pressed again. The mode switch 122 is a rotary dial switch used for setting the operation mode of the digital camera 10b. The first input unit 300 includes a cross key and a liquid crystal display (LCD) part arranged to be wedged in the crossing of the cross key. The input unit 300 also has a function of a zooming switch. The zooming magnification can be set by pressing either of the upper and lower portions of the cross key. The power switch 112 can turn on/off the digital camera 10b. The operations or functions that can be set by the operating unit 110b include "file format", "special effect", "print", "determine/store", and "change display", for example.

The digital camera 10b of the present embodiment having the above structure operates in a similar manner to that of the digital camera 10a of Embodiment 2 and thus the description of the basic operations of the digital camera 10b is omitted.

The digital camera 10b of the present embodiment has the appearance shown in FIGS. 11A and 11B like the digital camera 10a of Embodiment 2. On the upper face of the digital camera 10b, the release switch 114 and the mode switch 122 are arranged on the right side when the subject is seen from a direction indicated by an arrow, as shown in FIG. 11A. In this arrangement, when the user holds the digital camera 10b, the index finger of the right hand can be placed on the release switch 114 and the mode switch 122. Thus, this arrangement has an excellent operability. Moreover, as shown in FIG. 11B, on the back face of the digital camera 10b, the first input unit 300 is arranged on the upper-right side of the center while the second input unit 400 is arranged on the upper-left side of the center. In other words, the first input unit 300 is arranged so as to be covered by the index finger of the right hand while the second input unit 400 is arranged at a position to be covered by the thumb of the left hand, when the user holds the digital camera 10b. Therefore, this arrangement has an excellent operability. In the present embodiment, the first input unit 300 and the second input unit 400 are arranged upper than the center since the length in the vertical direction of the digital camera 10b is longer than that in the horizontal direction thereof. However, the input units 300 and 400 may be arranged lower than the center.

The first input unit 300 includes the liquid crystal display (LCD) part 360 arranged as an example of the first display unit, a switch unit 320 including a plurality of switches 322, 324, 326 and 328 arranged to form pairs in such a manner that the switches of each pair are opposed to each other with the LCD part 360 sandwiched therebetween, a protection glass part 340 arranged to cover the LCD part 360, and a cover 310 for fixing the switch unit 320 to the camera body. The switch unit 320 includes the switches 322 and 324 arranged at upper and lower positions with respect to the LCD part 360 and switches 326 and 328 arranged at right and left positions with respect to the LCD part 360. These switches serve as the cross key. Various functions are freely assigned to the switches 322, 324, 326 and 328 of the switch unit 320 depending on the operation modes of the digital camera 10b. For example, when the digital camera 10b is in the still-image capture mode, the functions of the zooming switch are assigned to the upper and lower switches 322 and 324, respectively. When the digital camera 10b is in the movie playback mode, functions of "playback", "stop", "fast-forward", "rewind" and the like are assigned to the switches 322, 324, 326 and 328, respectively. The LCD part 360 displays information relevant to the functions of the switches in the vicinity of the associated switches. In addition, approximately at the center of the LCD part 360, information related to the operation state of the digital camera 10b is displayed. The contents displayed by the LCD part 360 are determined by the main CPU 62 or the like and are transmitted to the LCD part 360 via a driver (not shown).

As described above, the combination of the switch unit 320 serving as the cross key having high operability and the LCD part 360 having high freedom of display can provide the following advantageous effects. First, since various functions are assigned to the switches freely, the number of the operation switches can be reduced. Moreover, since functions necessary for the current operation mode can be assigned to the switches, it is not necessary for the user to look for the operation switch. Thus, the operation of the digital camera 10b can be simplified. In addition, since the LCD part 360 displays the information indicating the functions of the switches in the vicinity of the corresponding switches, the user can operate the digital camera 10b while confirming the functions currently assigned to the switches even if the functions assigned to the switches are changed. Also, the functions assigned to the operation switches are displayed by the LCD part 360, it is not necessary to print the functions of the operation switches on an exterior member of the digital camera 10b, thus reducing the cost. Moreover, since the LCD part 360 is arranged to be surrounded by the switches, the information can be displayed in the vicinity of the respective switches. Thus, the user can understand how to operate the digital camera by intuition, thereby operating the digital camera without moving the eyes. Furthermore, the arrangement of the switches and the LCD part 360 described above can realize a smaller and simpler structure as compared to the case of arranging the switches and the LCD part 360 separately. Furthermore, when the LCD part 360 further displays the operation mode of the digital camera 10b, the user can operate the digital camera 10a while confirming the current operation mode without checking the current position of the mode switch 122.

On the back face of the digital camera 10b, the LCD monitor 102 that is an example of the second display unit is provided. In this arrangement, since the LCD monitor 102 and the first input unit 300 are arranged on the same face of the camera body, the user can operate the digital camera 10b while confirming both the contents displayed on the LCD monitor 102 and those displayed on the LCD part 360. For example, the LCD monitor 102 may display a menu indicating the functions. In this case, the user can set a desired function by operating the first input unit 300 while confirming the contents of the LCD monitor 102. Moreover, the LCD monitor 102 and the LCD part 360 may be respectively arranged on two faces of the body of the digital camera 10b that are adjacent to each other. For example, the LCD monitor 102 and the LCD part 360 may be arranged on the back face and the upper face of the digital camera 10b, respectively. Also in this case, the user can confirm both the contents displayed on the LCD monitor 102 and the contents displayed on the LCD part 360.

The second input unit 400 includes the power switch 112, the second buttons 410 arranged in the surroundings of the power switch 112 and the record/playback state setting switch 420. The second buttons 410 include a cancel button 402 to which a cancel function is assigned, an execution button 404 having an execution function, a shift button 406 for changing the functions assigned to the buttons of the input unit 300 and a display button 408 for turning on/off the display of the LCD monitor 102. The cancel button 402 has a function of canceling the setting, a function of going back the previous menu or the like in the function setting mode, for example. The execution button 404 has a function of executing the setting, a function of making the menu be displayed or the like in the function setting mode. The shift button 406 has a function of changing the functions assigned to other buttons. Thus, this shift button 406 allows a single button to have a plurality of functions. The display button 408 has a function of turning on/off the display the LCD monitor 102. The record/playback state setting switch 420 is used for setting either one of the recording state and the playback state. Therefore, in the present embodiment, the operation mode of the digital camera 10b is set by the mode switch 122 and the record/playback state setting switch 420. The cancel button 402 and the execution button 404 are arranged in the vicinity of the first input unit 300 to constitute a pair, while the display button 408 is arranged in the vicinity of the LCD monitor 102. Therefore, it is easy for the user to understand how to operate the digital camera 10b by intuition, preventing the wrong operation when the user operates the digital camera 10b. Moreover, the respective buttons of the second input unit 400 have shapes different from each other. Thus, the user can discriminate one button from other buttons only by touching the button, without confirming the positions of the buttons. Also, the respective buttons can be discriminated even in a dark place.

Figure 28A:
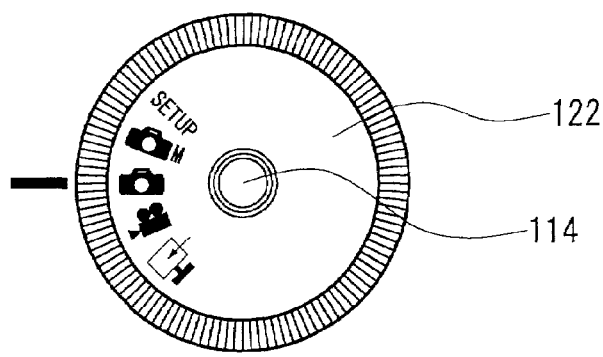
FIGS. 28A, 28B and 28C show exemplary screens of the LCD part and the LCD monitor in the still-image capture mode in the third embodiment of the present invention.
Figure 28B:
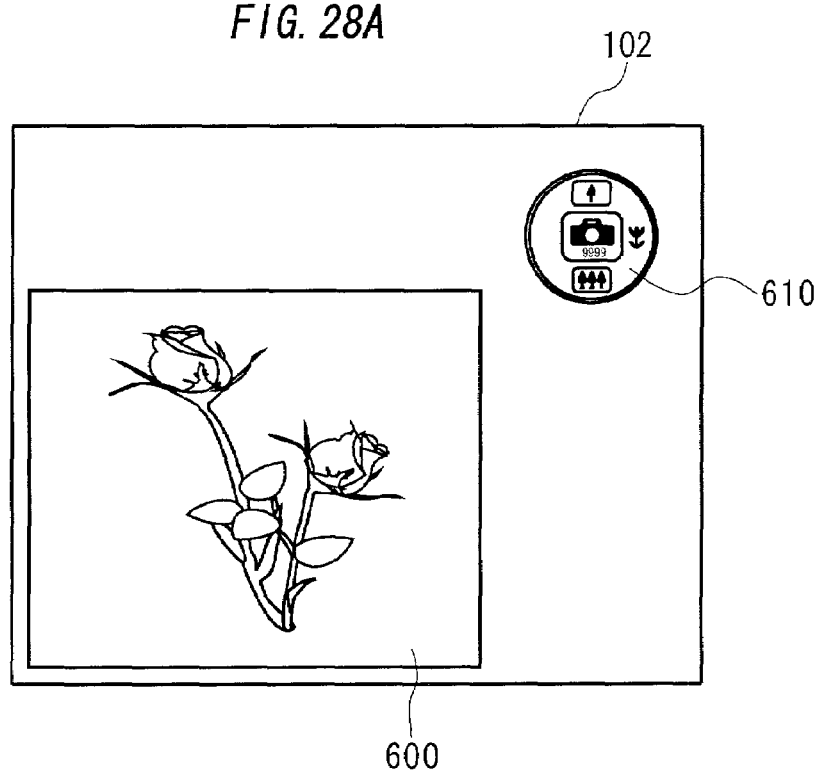
Figure 28C:
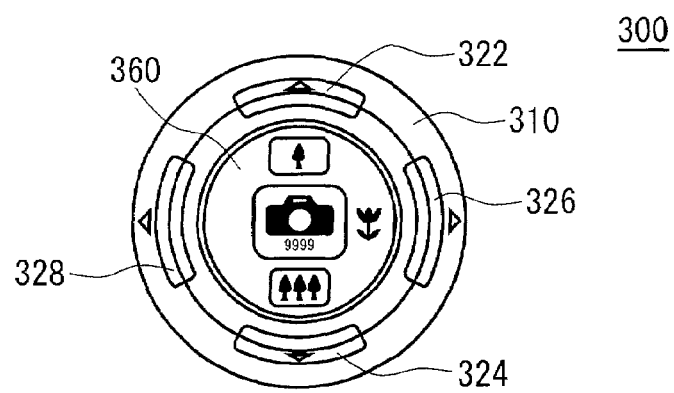

FIGS. 28A, 28B and 28C show exemplary screens displayed on the LCD monitor 102 and the LCD part 360 when the digital camera 10b of the present embodiment is in the still-image capture mode. FIG. 28A shows a state where the mode switch 122 is set to the still-image capture. FIG. 28B shows the exemplary screen of the 30 LCD monitor 102. The screen of the LCD monitor 102 is divided into a main screen 600 for displaying the image captured by the image-capturing unit 20 and a sub-screen 610 for displaying the first displayed information displayed by the LCD part 360. In other words, the second displayed information on the LCD monitor 102 includes the first displayed information displayed on the LCD part 360. FIG. 28C shows the exemplary screen of the LCD part 360. The LCD part 360 displays a symbol indicating that the digital camera 10b is now in the still-image capture mode approximately at the center and also displays symbols indicating the functions assigned to the switches in the vicinity of the respective switches. For example, a zooming (magnifying) function is assigned to the upper switch 322, and a close-up capturing function is assigned to the right switch 326. As the background color of the LCD part 360, orange is selected for indicating that the digital camera 10b is in the capturing mode in the present embodiment. In the case where the magnifying function and the size-reduction function are respectively assigned to the upper and lower switches 322 and 324 as described above, the relative positions of the switches with respect to the LCD part 360 correspond to the functions of the switches. Thus, the user can perform a correct operation even if the user does not know the functions assigned to the respective switches or the meaning of the symbols.

As described above, the first displayed information including the information that indicates the functions assigned to the switches of the input unit 300 is displayed not only on the LCD part 360 but also on the sub-screen 610 of the LCD monitor 102. Therefore, the user can operate the input unit 300 while viewing the LCD monitor 102 even when the user cannot confirm the contents of the LCD part 360 by eyes.

Figure 29A:
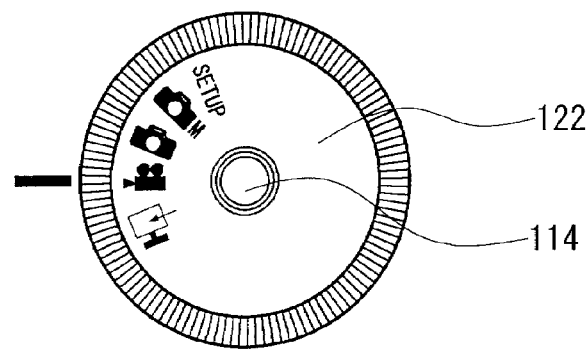
FIGS. 29A, 29B and 29C show exemplary screens of the LCD part and the LCD monitor in the movie playback mode in the third embodiment of the present invention.
Figure 29B:
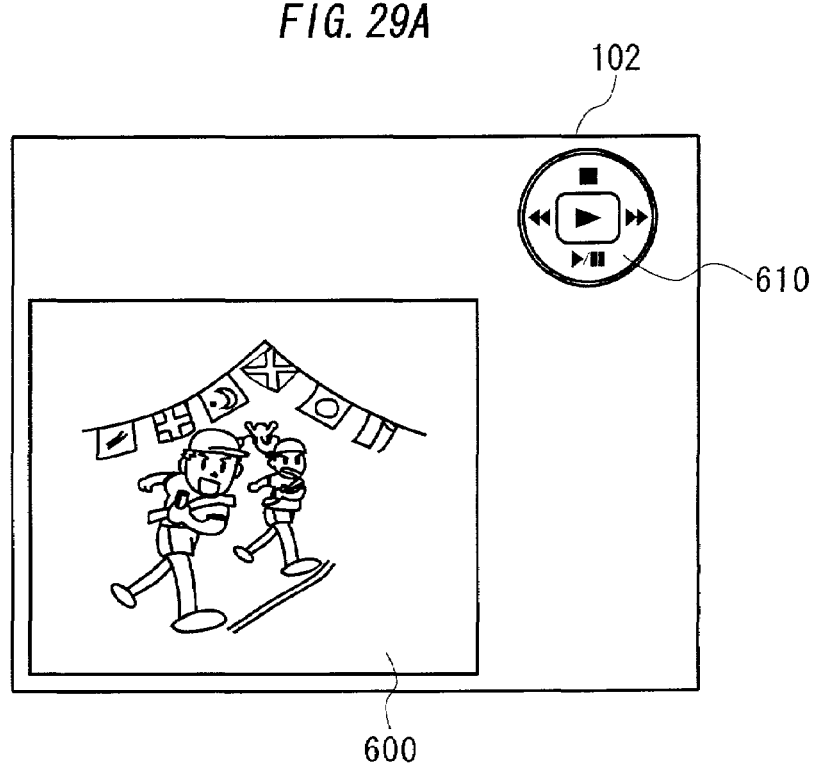
Figure 29C:
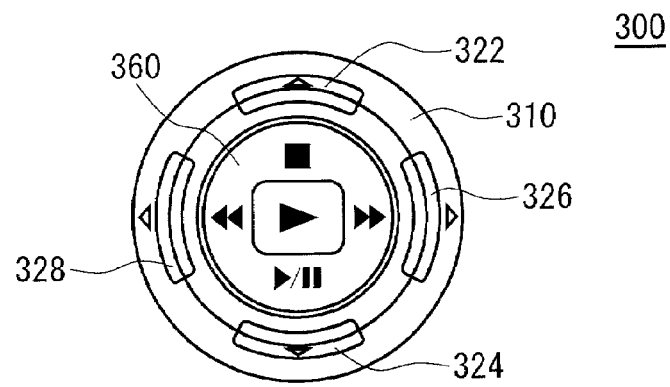

FIGS. 29A, 29B and 29C show exemplary screens displayed on the LCD monitor 102 and the LCD part 360, respectively, when the digital camera 10b of the present embodiment is in the movie-playback mode. FIG. 29A shows a state where the mode switch 122 is set to the movie-playback mode. FIG. 29B shows the exemplary screen displayed on the LCD monitor 102. The screen of the LCD monitor 102 is divided into the main screen 600 for displaying the movie being played and the sub-screen 610 for displaying the first displayed information displayed on the LCD part 360. That is, the second displayed information displayed on the LCD part 360 includes the first displayed information displayed on the LCD part 360.

FIG. 29C shows the exemplary screen displayed on the LCD part 360. The LCD part 360 displays a symbol indicating that the digital camera 10b is now playing the movie approximately at the center, and also displays symbols indicating the functions currently assigned to the switches in the vicinity of the switches. For example, the function of stopping the playback of the movie is assigned to the upper switch 322, while the function of fast-forwarding the movie is assigned to the right switch 324. As the background color of the LCD part 360, green is selected for indicating that the digital camera 10b is in the playback mode. By the arrangement described above, the user can understand how to operate the digital camera 10b by intuition, so as to easily operate the digital camera 10b quickly.

Figure 30A:
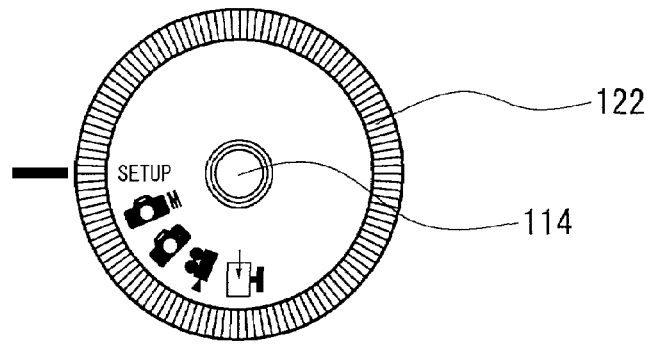
FIGS. 30A, 30B and 30C show exemplary screens of the LCD part and the LCD monitor in the function setting mode in the third embodiment of the present invention.
Figure 30B:
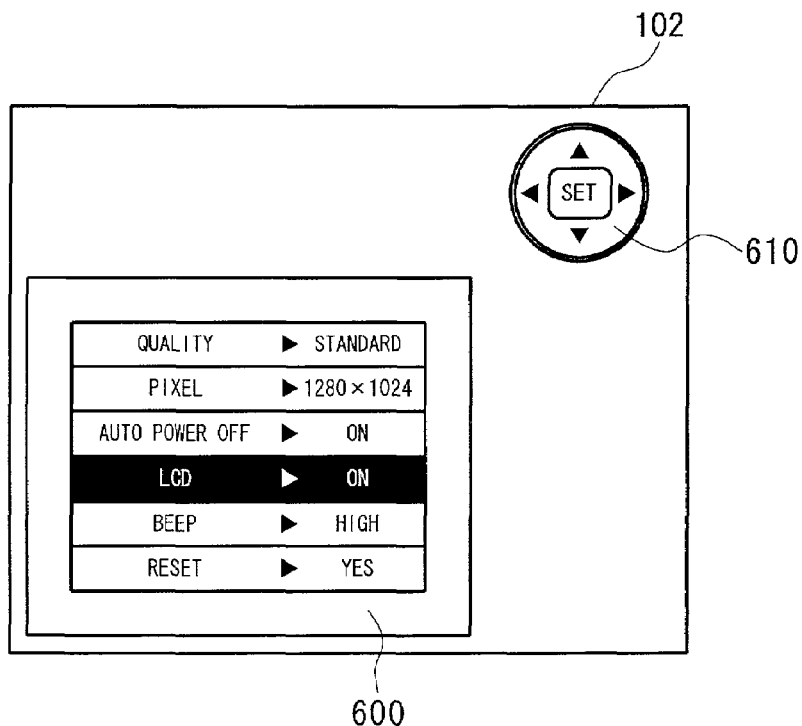
Figure 30C:
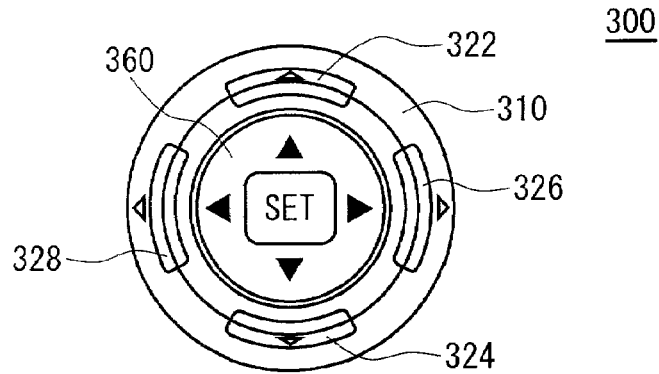

FIGS. 30A, 30B and 30C show exemplary screens displayed on the LCD monitor 102 and the LCD part 360 when the digital camera 10b of the present embodiment is in the function setting mode. FIG. 30A shows a state where the mode switch 122 is set to the function setting mode. FIG. 30B shows the exemplary screen of the LCD monitor 102. The screen of the LCD monitor 102 is divided into the main screen 600 for displaying the function setting menu and the sub-screen 610 for displaying the first displayed information displayed on the LCD part 360. In other words, the second displayed information on the LCD monitor 102 includes the first displayed information displayed on the LCD part 360. The function currently selected is displayed while being reversed in color. A triangle located on the right side of the name of each function indicates that the setting of the corresponding function can be changed by pressing down-the right and left switches 326 and 328.

FIG. 30C shows the exemplary screen of the LCD part 360. The LCD part 360 displays a symbol indicating that the digital camera 10a is now in the function setting mode approximately at the center and also displays symbols indicating that the switches have function of arrow keys in the vicinity of the respective switches. For example, the function of moving the currently selected position upwardly in the function setting menu is assigned to the upper switch 322, while the function of changing the current setting of the selected menu is assigned to the right switch 326.

In the examples shown in FIGS. 28A to 30C, the first displayed information displayed on the LCD part 360 is always displayed on the sub-screen of the LCD monitor 102. However, the screen layout is not limited thereto. A switch for changing the screen layout may be provided. For example, a screen layout in which the entire screen of the LCD monitor 102 is used as the main screen 600 and another screen layout in which both the main screen 600 and the sub-screen 610 exist on the LCD monitor 102 may be switched to each other. The screen layout shown in FIGS. 28A to 30C is an example of the screen layout and therefore a different screen layout from that shown in FIGS. 28A to 30C can be employed. The residual area of the screen of the LCD monitor 102 may display other additional information. In other words, other information may be added to the second displayed information. For example, clock information, GPS information, comment information associated with the captured image, memo information or the like may be displayed. IN the examples shown in FIGS. 28A to 30C, all the first displayed information displayed on the LCD part 360 is displayed on the sub-screen 610 of the LCD monitor 102. However, only a part of the first displayed information may be displayed on the sub-screen 610. For example, only the symbols indicating the functions of the switches that are required for operating the switches may be displayed on the sub-screen 610.

As described above, the digital camera 10b of the present embodiment includes a means that incorporates at least a part of the first displayed information displayed on the LCD part 360 into the second displayed information to be displayed by the LCD monitor 102. Such a function can be realized, for example, by a co-operation of the main CPU 62 and a program stored in or loaded into the main memory 68 or the non-volatile memory 66. In a case where the main memory 68 has an internal memory therein, the necessary program may be stored in the internal memory while various functions are realized as firmware.

As described in Embodiments 1 and 2, the background color of the LCD part 360 is determined mainly by the main CPU 62 or the like, in accordance with the operation state of the digital camera 10b. The background color of the LCD part 360 may be realized by the backlight color. The backlight of the LCD part 360 may be turned on only in a predetermined period after the operation mode is changed, and thereafter be turned off. In this case, the power consumption can be reduced. As the backlight of the LCD part 360, red and green LEDs may be used, for example. In this case, three colors, i.e., red, green and orange can be realized. Orange is realized by turning both the red and green LEDs on simultaneously. For example, the background color may be orange when the digital camera 10b is in the capturing mode; green when the digital camera 10b is in the playback mode; and red when the digital camera 10b displays a warning to the user. In this case, the user can find the operation state of the digital camera 10b by intuition. In a case where the LCD part 360 is implemented by a color LCD, the background color may be realized by displaying areas other than information such as the symbols in the same color.

The background color of the LCD part 360 may be changed depending on recording folders into which information is recorded. For example, green may be selected as the background color when a folder for a private use is selected, or orange may be selected when a folder for jobs is selected. In this case, the user can find the usage of the recording folder by the background color when the user selects the recording folder, thereby preventing a wrong operation.

Figure 31A:
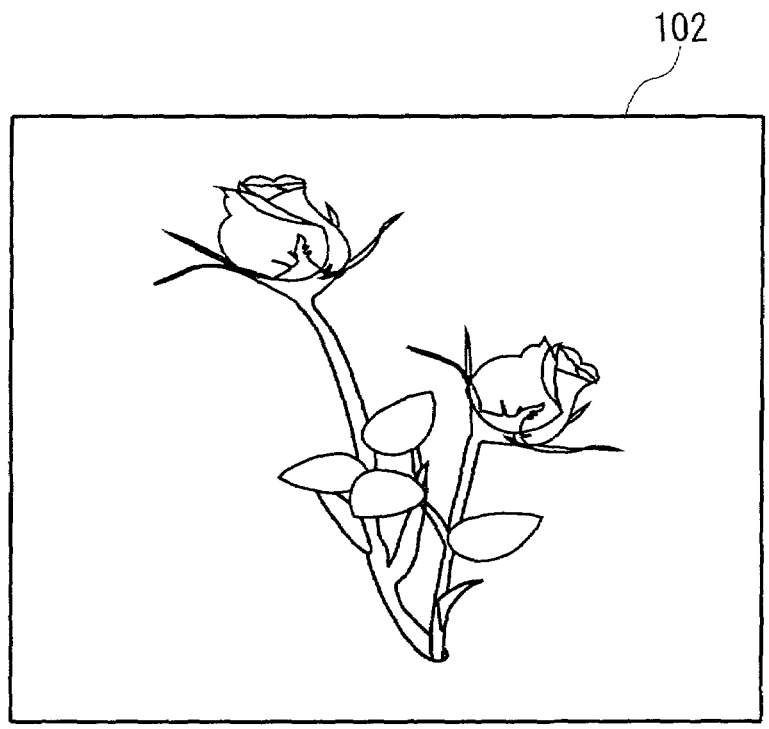
FIGS. 31A and 31B show other exemplary screens of the LCD part and the LCD monitor in the third embodiment of the present invention.
Figure 31B:
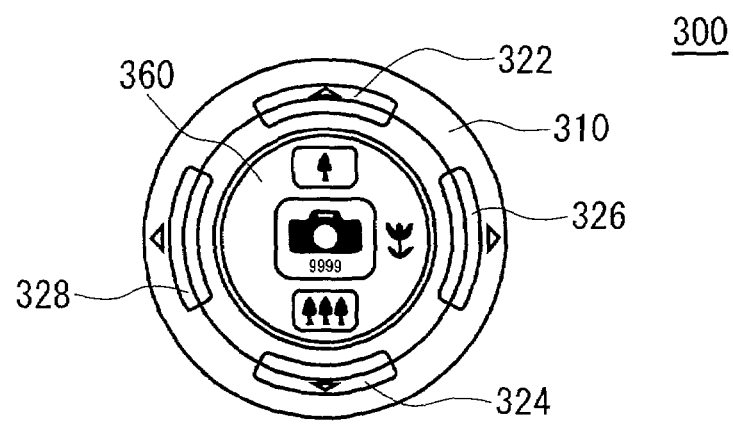

FIGS. 31A and 31B show another example of the LCD monitor 102 and the LCD part 360. FIG. 30A shows the exemplary screen displayed on the LCD monitor 102 in the still-image capture mode. FIG. 30B shows the exemplary screen of the LCD part 360. The LCD part 360 displays a symbol indicating that the digital camera 10b is in the still-image capture mode approximately at the center, and also displays symbols indicating the functions currently assigned to the switches in the vicinity of the switches. For example, the zooming (magnifying) function is assigned to the upper switch 322 and the close-up capturing function is assigned to the right switch 326.

Figure 32A:
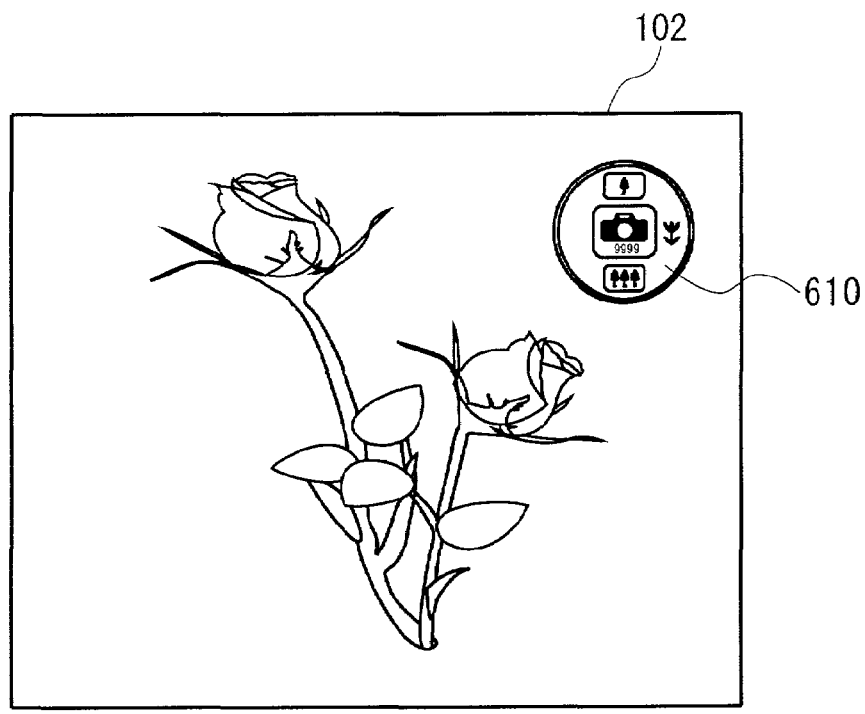
FIGS. 32A and 32B show other exemplary screens of the LCD part and the LCD monitor in the third embodiment of the present invention.
Figure 32B:
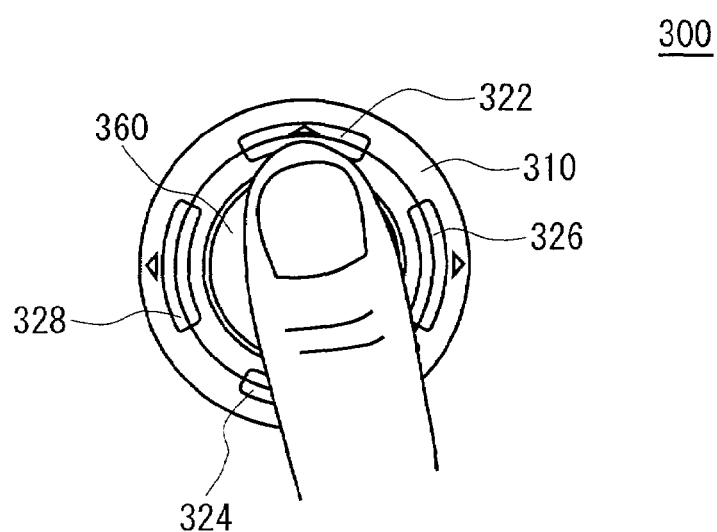

FIGS. 32A and 32B show the screens of the LCD monitor 102 and the LCD part 360 when the user operates the input unit 300. FIG. 32A shows a state where the first displayed information displayed on the LCD part 360, that cannot be seen because the LCD part 360 is covered with the finger when the user places the LCD part 360 in order to operate the input 300, is temporarily displayed on the sub-screen 610 of the LCD monitor 102. FIG. 32B shows the LCD part 360 and the finger of the user placed on the LCD part 360.

In the example shown in FIGS. 31A to 32B, the LCD monitor 102 displays the first displayed information when the LCD part 360 is hidden but does not display the first displayed information when the LCD part 360 appears.

In the present embodiment, a pressure-sensitive sensor may be provided with the cover part 340 shown in FIG. 11B as a sensor part for detecting that the LCD part 360 is hidden by the finger of the user placed on the LCD part 360. Moreover, another sensor sensitive to a change of the temperature, light, infrared ray or the like may be provided. The sensor part may be provided with the LCD part 360 or the switches 322, 324, 326 and 328. In addition, the switches themselves may serve as the sensor part. More specifically, the first displayed information may be displayed on the LCD monitor 102 when any switch turns on by being operated by the user. In a case where the input unit 300 is arranged on the upper-right side of the center in the back face of the digital camera 10b, the LCD part 360 is hidden by the finger of the user when the user operates the switches 322 and 328 respectively arranged on the upper and left sides of the LCD part 360. Therefore, the first displayed information may be displayed on the LCD part 360 when the switches 322 and 328 are operated. In another case where the input unit 300 is arranged on the upper-left side of the center in the back face of the digital camera 10b, the first displayed information may be displayed on the LCD monitor 102 when the user operates the switches 322 and 326 respectively arranged on the upper and right sides of the LCD part 360.

Figure 33A:
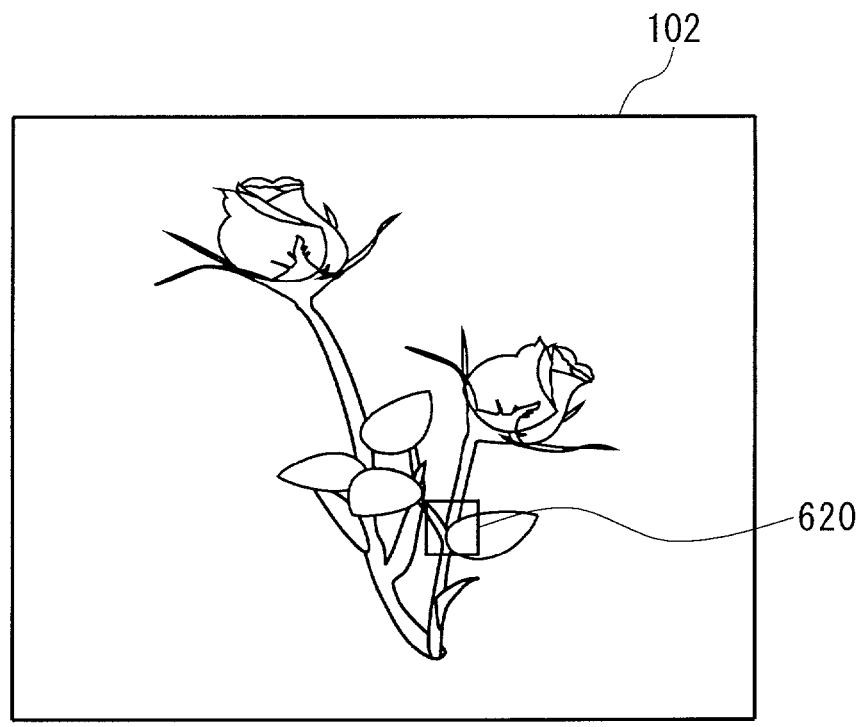
FIGS. 33A and 33B show other exemplary screens of the LCD part and the LCD monitor in the third embodiment of the present invention.
Figure 33B:
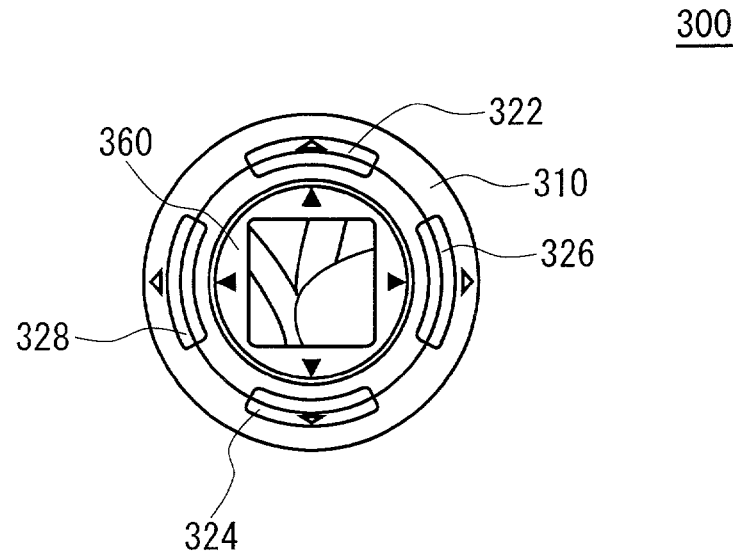

FIGS. 33A and 33B show an example in which information obtained by magnifying a specified part of the second displayed information displayed on the LCD monitor 102 is displayed on the screen of the LCD part 360. FIG. 33A shows the screen of the LCD monitor 102 displaying the recorded image that has been reproduced. In the image information displayed on the LCD monitor 102, the specified part 620 is selected. FIG. 33B shows the screen of the LCD part 360 that displays the specified part 620 magnified. In the vicinity of the switches, the symbols indicating that the functions of moving the specified part 620 are assigned to the switches, respectively, are displayed. The respective switches have the functions of moving the specified part 620 upwardly, downwardly, toward the right direction or toward left direction. As described above, the cooperation of the input unit 300 and the LCD monitor 102 can allow the LCD part 360 of the input unit 300 to display a magnified image of a desired specified part 620 of the image information displayed on the LCD monitor 102.

Figure 34A:
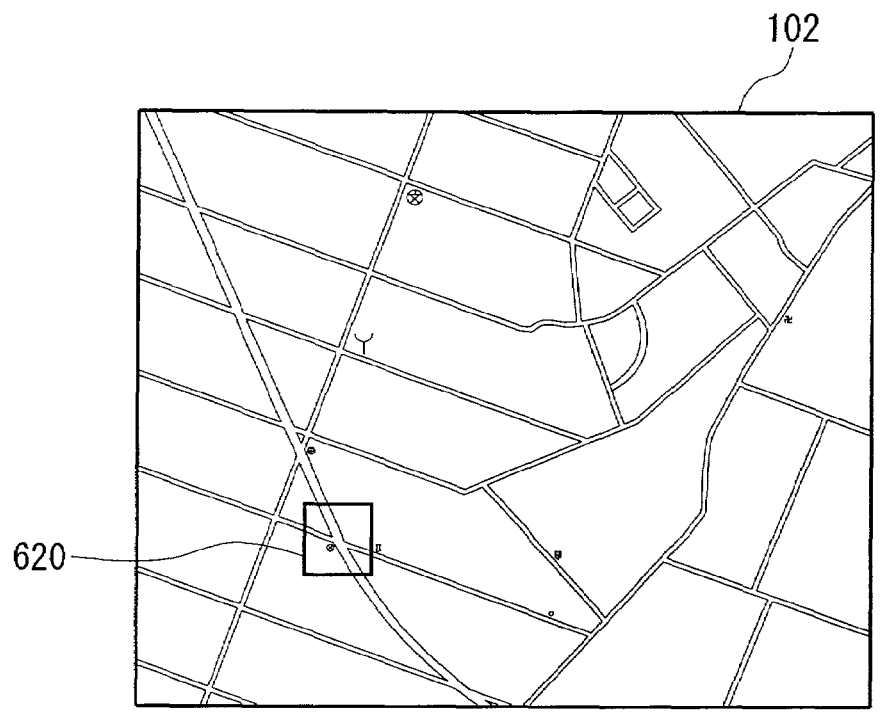
FIGS. 34A and 34B show other exemplary screens of the LCD part and the LCD monitor in the third embodiment of the present invention.
Figure 34B:
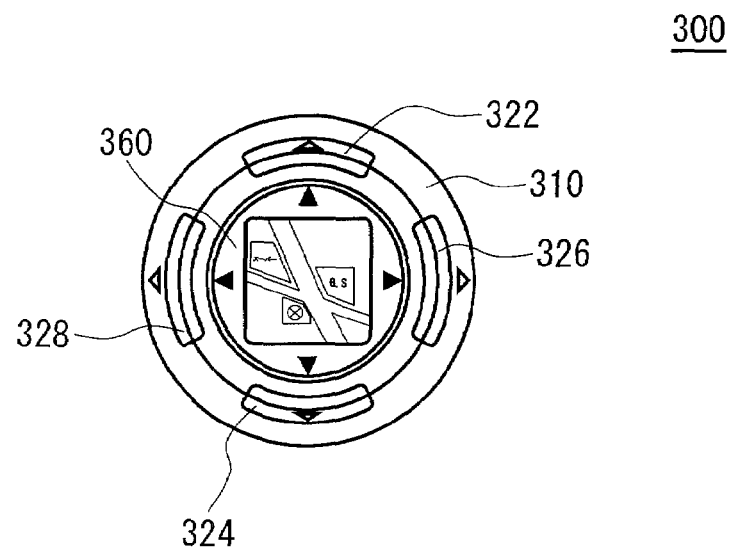

FIGS. 34A and 34B show an example in which detailed information of a specified part of map information displayed on the LCD monitor 102 is displayed on the LCD part 360. FIG. 34A shows the screen of the LCD monitor 102 that displays the map information. In the map information, the specified part 620 is selected. FIG. 34B shows the screen of the LCD part 360 that displays a detailed map of the specified part 620. In the vicinity of the switches, the symbols indicating that the functions of moving the specified part 620 are assigned to the respective switches are displayed. The respective switches have the functions of moving the specified part 620 upwardly, downwardly, toward the right direction or toward the left direction assigned thereto by the main CPU 62 or the like. As described above, the cooperation of the input unit 300 and the LCD monitor 102 enables the LCD part 360 to display the detailed map of the specified part 360 of the map information displayed on the LCD monitor 102.

Figure 35A:
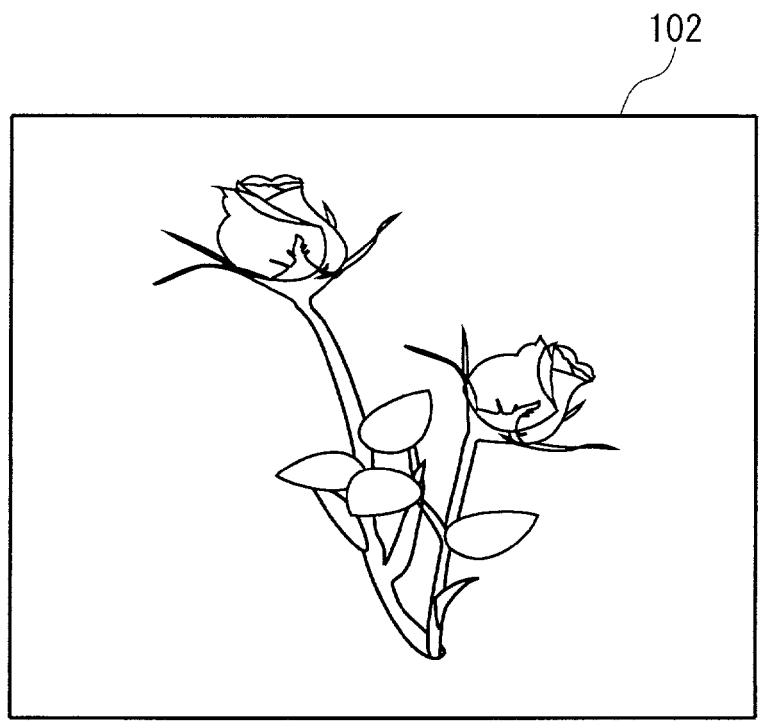
FIGS. 35A and 35B show other exemplary screens of the LCD part and the LCD monitor in the third embodiment of the present invention.
Figure 35B:
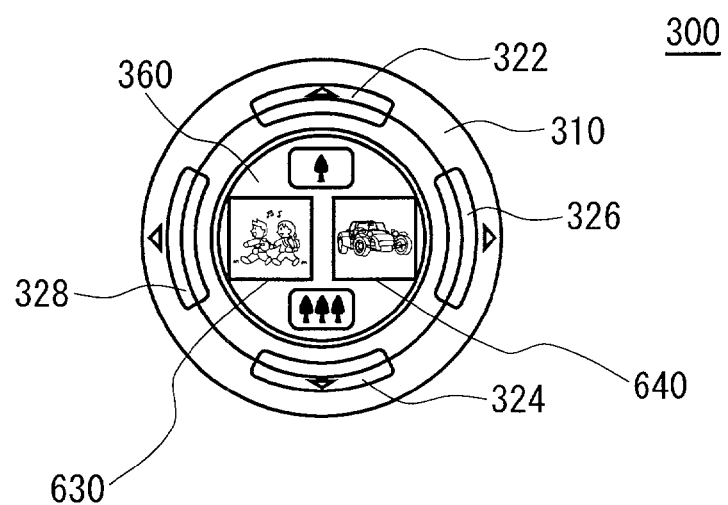

FIGS. 35A and 35B show an example in which the image information recorded in the recording unit is displayed on the LCD monitor 102 after being reproduced. FIG. 35A shows the screen of the LCD monitor 102 that displays the image information recorded in the recording unit. The recording unit may be the main memory 68 or the optional device 76 shown in FIG. 27, for example. FIG. 35B shows the screen of the LCD part 360 that displays two thumbnail images 630 and 640 of the images recorded in the recording unit. The thumbnail image 630 corresponds to the image captured just before the currently reproduced image while the thumbnail image 640 corresponds to the next image. The functions for displaying the images corresponding to the thumbnail images displayed in the vicinity of the switches 326 and 328 on the LCD monitor 102 are assigned to the switches 326 and 328 by the main CPU 62 or the like, respectively. As described above, the cooperation of the input unit 300 and the LCD monitor 102 enables the LCD monitor 102 to display a desired one of the images stored in the recording unit.

In the example shown in FIG. 35B, the magnifying function and the size-reducing function are assigned to the upper and lower switches 322 and 324, respectively. Instead of this, the thumbnail images may be further displayed in the vicinity of the upper and lower switches 322 and 324. In this case, the associated functions for displaying the images corresponding to the thumbnail images displayed in the vicinity of the switches 322 and 324 on the LCD monitor 102 are assigned to the switches 322 and 324, respectively. Moreover, the functions of moving the storage folder in the recording unit may be assigned to the upper and lower switches 322 and 324.

Figure 36A:
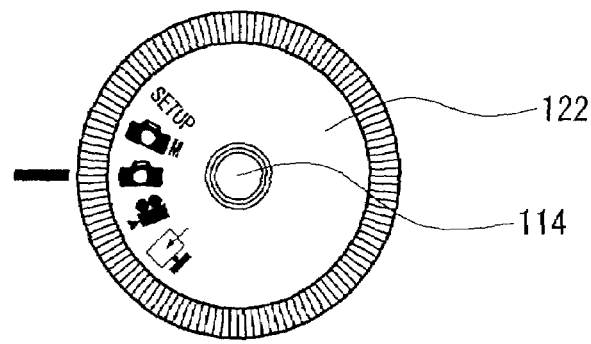
FIGS. 36A, 36B and 36C show other exemplary screens of the LCD part and the LCD monitor in the third embodiment of the present invention.
Figure 36B:
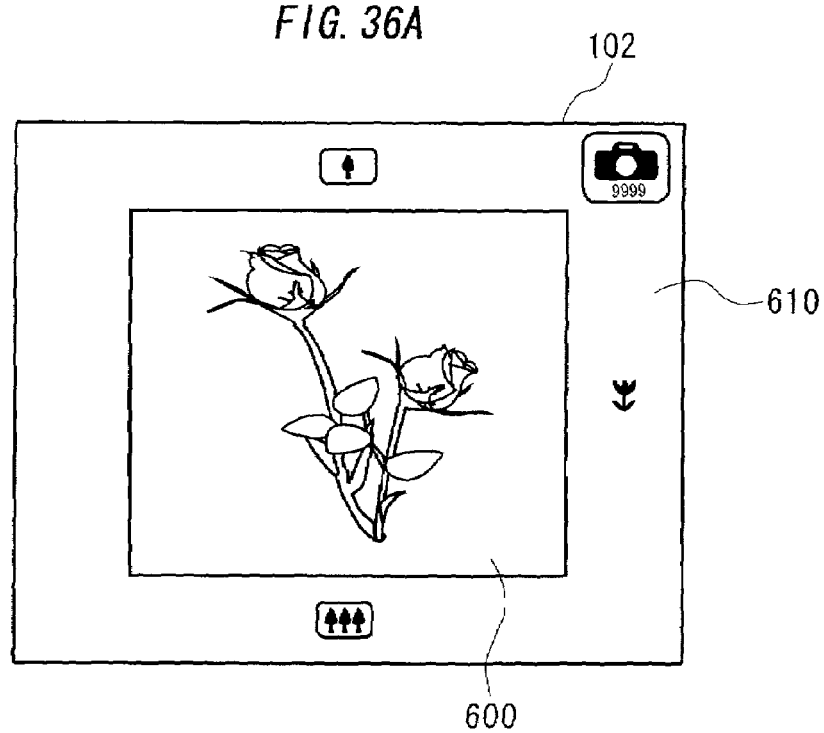
Figure 36C:
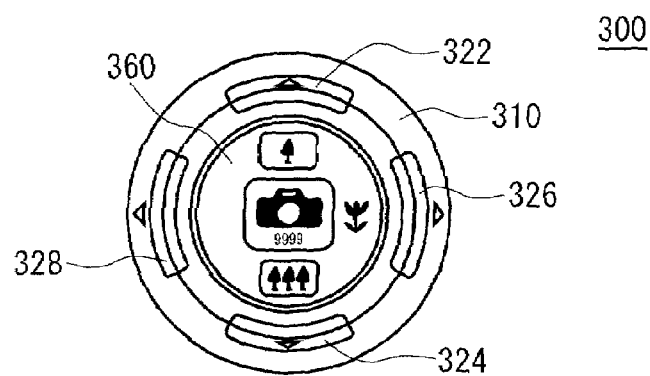

FIGS. 36A, 36B and 36C show a modified example of the screens of the LCD monitor 102 and the LCD part 360 shown in FIGS. 28A, 28B and 28C. FIG. 36A shows the mode switch 122 that is set to the still-image capture mode. FIG. 36B shows the screen of the LCD monitor 102. The screen of the LCD monitor 102 is divided into the main screen 600 for displaying the image shot by the image-capturing unit 20 and the sub-screen 610 for displaying the first displayed information displayed on the LCD part 360. In other words, the second displayed information, that is to be displayed on the LCD monitor 102, includes the first displayed information displayed on the LCD monitor 360. The main screen 600 is arranged approximately at the center of the LCD monitor 102. At the upper, lower, right and left positions of the main screen 600, the symbols indicating the functions assigned to the respective switches of the input unit 300 are displayed. Since the positional relationship between the symbol and the main screen 600 is coincident with that between the associated switch and the main screen 600, the user can understand the correspondence easily.

FIG. 36C shows the screen of the LCD part 360. The LCD part 360 displays the symbol indicating that the digital camera 10b is in the still-image capture mode substantially at the center of the screen and the symbols indicating the functions assigned to the switches in the vicinity of the switches, respectively. For example, the zooming (magnifying) function is assigned to the switch 322 while the close-up-capture setting function is assigned to the switch 326.

Figure 37A:
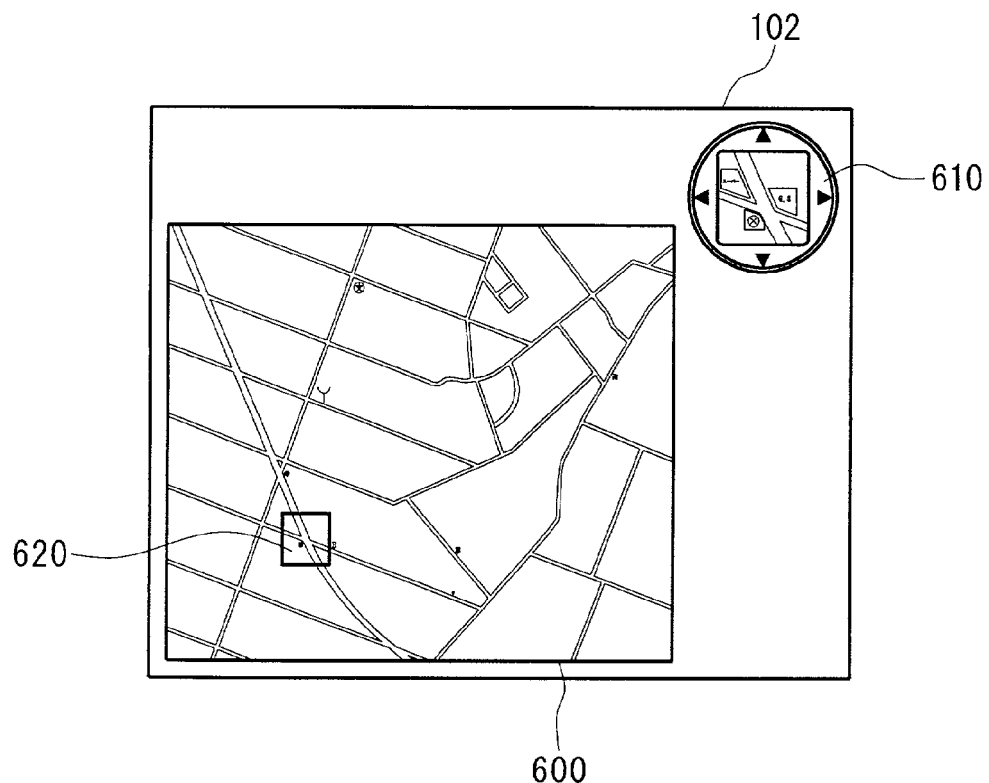
FIGS. 37A and 37B show other exemplary screens of the LCD part and the LCD monitor in the third embodiment of the present invention.
Figure 37B:
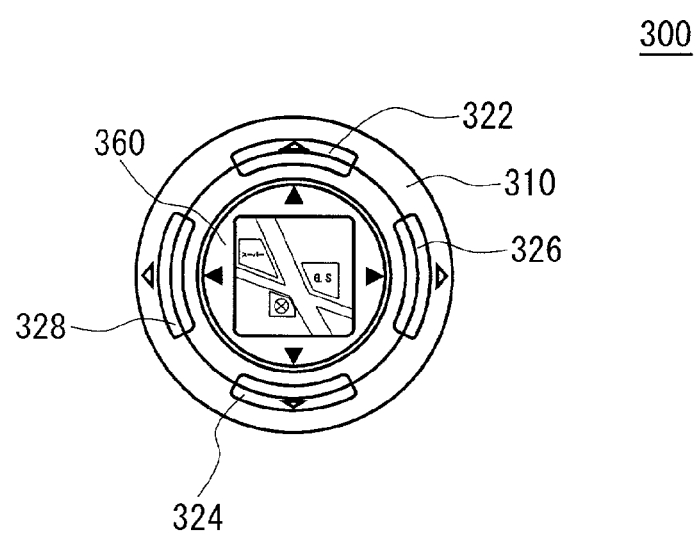

FIGS. 37A and 37B show a modified example of the screens of the LCD monitor 102 and the LCD part 360 shown in FIGS. 34A and 34B. FIG. 37A shows the screen of the LCD monitor 102 that displays the map information. In the map information on the screen of the LCD monitor 102, the specified part 620 is selected. The screen of the LCD monitor 102 is divided into the main screen 600 for displaying the map information and the sub-screen 610 for displaying the first displayed information displayed on the LCD part 360. In other words, the second displayed information, that is to be displayed on the LCD monitor 102, includes the first displayed information displayed on the LCD monitor 360.

FIG. 37B shows the screen of the LCD part 360 that displays the detailed map of the specified part 620. The LCD part 360 displays the symbols indicating that the functions for moving the specified part 620 are assigned to the switches by the main CPU 62 or the like, in the vicinity of the respective switches. As described above, the cooperation of the input unit 300 and the LCD monitor 102 makes it possible to display the detailed map of a desired specified part 620 in the map information displayed on the LCD part 360, on the sub-screen 610 of the LCD monitor 102 and the LCD part 360.

Figure 38A:
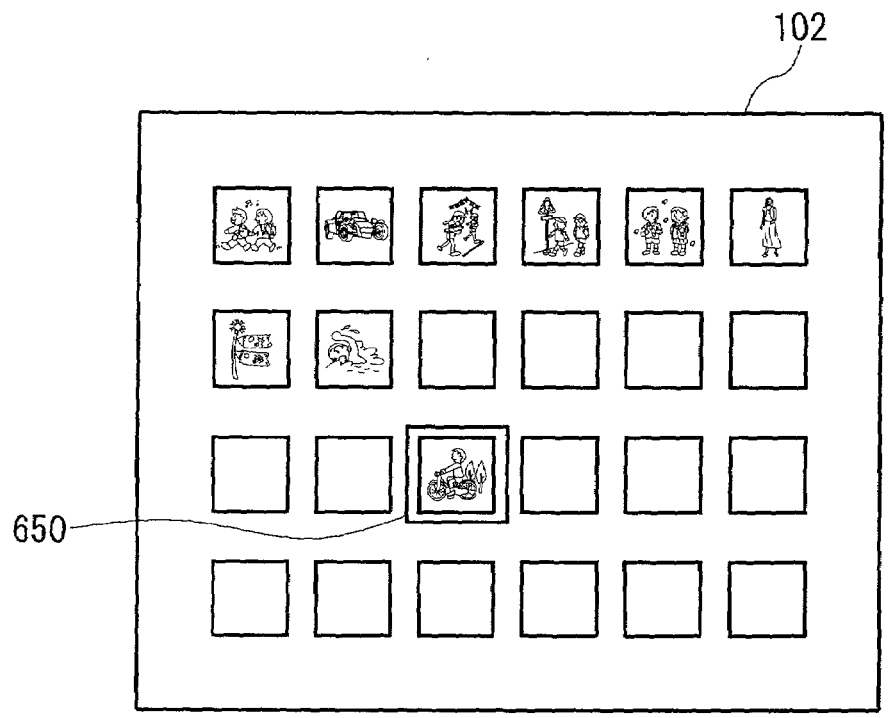
FIGS. 38A and 38B show other exemplary screens of the LCD part and the LCD monitor in the third embodiment of the present invention.
Figure 38B:
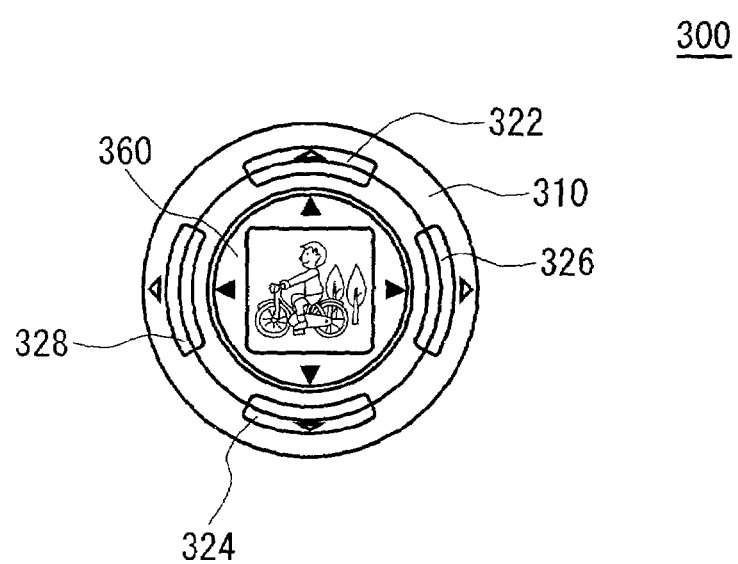

FIGS. 38A and 38B show an example in which the image information recorded in the recording unit is reproduced and is displayed on the LCD monitor 102. FIG. 38A shows the screen of the LCD monitor 102 displaying the thumbnail images of the images recorded in the recording unit in form of a table. The recording unit may be the main memory 68 or the optional device 76 shown in FIG. 27. FIG. 38B shows the screen of the LCD part 360 that displays the image corresponding to the currently selected one of the thumbnail images displayed on the LCD monitor 102. To the switches 326 and 238, the functions of moving the currently selected thumbnail image 650 upwardly, downwardly, toward the right direction or toward the left direction in the table. As described above, the cooperation of the input unit 300 and the LCD monitor 102 enables the LCD part 360 to display a desired one of the images stored in the recording unit.

As described above, the first displayed information including the information indicating the functions assigned to the switches of the input unit 300 are displayed not only on the input unit 300 but also on the sub-screen 610 of the LCD monitor 102 in the present embodiment. Therefore, even if the user cannot watch the displayed contents of the LCD unit 360 because of the finger of the user when the user operates the input unit 300, the user can operate the input unit 300 while viewing the LCD monitor 102.

According to the digital camera 10b of the present embodiment, the LDC part 360 as an example of the first display unit that is combined with the cross key and the LCD monitor 102 as an example of the second display unit complementarily display the information, thereby improving the operability.

As described above, according to the present invention, an input unit having excellent operability and an information recording apparatus and a digital camera that can use such an input unit.

Although the present invention has been described by way of exemplary embodiments, it should be understood that many changes and substitutions may be made by those skilled in the art.

In one modification, another mechanical switch such as a slidable switch or a rotary switch, or an optical switch utilizing the light blocking effect may be employed as the switch, although the switch described in Embodiment 3 is a push-type switch that works by being pressed.

In another modification of Embodiment 3, a plane that is in contact with the upper faces of the switches 322, 324, 326 and 328 of the input unit 300 may be inclined with respect to the face of the camera body. In this case, the upper face of the switch 322 may be positioned lower than that of the switch 324, thereby allowing the user to operate the input unit 300 by the thumb more easily. Moreover, in this case, the direction of the maximum inclination of the plane that is in contact with the upper faces of the switches 322, 324, 326 and 328 may be at an angle with respect to a direction connecting the switches 322 and 324.

In still another modification of Embodiment 3, the screen of the LCD part 360 of the input unit 300 may be arranged to be at an angle with respect to the face of the body of the digital camera 10b. In most cases where the user uses the digital camera 10b, the user operates the digital camera 10b at a level that is lower than the user's eyes. In these cases, when the display screens of the LCD monitor 102 and the LCD part 360 are arranged to be inclined in such a manner that the lower side of each display screen comes ahead of the upper side thereof, the angle between the user's eyes and the display screen is close to a right angle, thereby allowing the user to easily view the contents of the LCD part 360.

In still another modification of Embodiment 3, the number of the switches is not limited to four. Alternatively, eight switches may be arranged to form pairs. In this case, it is preferable that the switches of each pair are opposed to each other with the center of the ring of the switches sandwiched therebetween.

In still another modification of Embodiment 3, the switches may be arranged to be inclined. For example, the direction connecting the switches arranged at the upper and lower positions with respect to the LCD part 360 may be inclined with respect to the vertical direction of the digital camera 10b within the face of the camera body. In this case, since the direction connecting the tip and mid part of the thumb of the user is substantially coincident to the direction connecting the upper and lower switches, it is easy to press the switches. It is preferable that the inclination angle is larger than 0 degree and equal to or less than 45 degrees. The inclination angle exceeding 45 degrees is not preferable because there is a possibility that the vertical direction and the horizontal direction are not discriminated from each other when the inclination angle exceeds 45 degrees.

In still another modification, the LCD part 360 may have another shape, such as a square.

In still another modification, the LCD part 360 itself may serve as the switches. In this case, the arrangement may be employed in which a switch provided under the LCD part 360 works by being pressed by the LCD part 360.

In Embodiments 1 to 3, the digital camera is described as an example of the capturing apparatus. However, the same effects described in Embodiments 1 to 3 can be obtained when the present invention is applied to another capturing apparatus, such as a camera using a photographic film or a video camera.

As described above, according to the present invention, an input unit having excellent operability and an information recording apparatus and a digital camera that can use such an input unit.

Although the present invention has been described by way of exemplary embodiments, it should be understood that many changes and substitutions may be made by those skilled in the art without departing from the spirit and the scope of the present invention which is defined only by the appended claims.

What is claimed is:

1. An input unit disposed on an apparatus having a plurality of operation modes selectable by a user, for inputting the user's instruction to the apparatus, comprising:
   a display part for presenting a plurality of functions corresponding to the operation mode selected by the user, the plurality of functions being different in accordance with the operation mode selected by the user;
   an instruction input unit arranged in surroundings of said display part, for selecting a function among the plurality of functions when the user presses and displaces a first face thereof including a display screen of said display part;

a switch pressing unit provided in the vicinity of an outer periphery of a rear face of said first face, said switch pressing unit being capable of being displaced in accordance with the displacement of the instruction input unit; and a switch part arranged to work by being pressed by said switch pressing unit, said switch part comprising a plurality of switches, wherein each switch corresponds to at least one function of the plurality of functions;

said display part displays information related to the operation mode of the apparatus and plural pieces of information indicating the functions of the switches on an area provided in the vicinity of each switch, and the information related to the operation mode and the plural pieces of information indicating the functions of the switches are changed in response to the operation mode selected by the user.

2. An input unit as claimed in claim 1, wherein said instruction input unit presses said switch part via said switch pressing unit by being displaced around a position in the vicinity of a center of gravity thereof as a displacement center in a direction perpendicular to a face on which said switch part is provided.

3. The input unit as claimed in claim 2, wherein said first face is configured to pivot around said displacement center when said instruction input unit is pressed.

4. An input unit as claimed in claim 1, wherein said plurality of switches of said switch part are arranged to form at least one pair, said switches of each of said at least one pair being opposed to each other with a displacement center sandwiched therebetween.

5. An input unit as claimed in claim 1, wherein said plurality of switches of said switch part are arranged substantially at an upper position, a lower position, a right position and a left position with respect to a displacement center.

6. An input unit as claimed in claim 1, wherein said display part is arranged to display one of a plurality of background colors that is determined in accordance with an operation state of an apparatus used together with said input unit.

7. An input unit as claimed in claim 1, wherein said first face is inclined with respect to a reference face on which said switch pressing unit is in contact with a body of said apparatus.

8. A digital camera, comprising:
an image capturing unit;
a controlling unit that controls the image capturing unit;
a processing circuit that processes signals from the image capturing unit;
a display unit; and
an operating unit that accepts user input and includes an input unit disposed on the digital camera having a plurality of operation modes selectable by a user, for inputting the user's instruction to the digital camera, said input unit comprising:
a display part for presenting a plurality of functions corresponding to the operation mode selected by the user, the plurality of functions being different in accordance with the operation mode selected by the user;
an instruction input unit arranged in surroundings of said display part, for selecting a function among the plurality of functions when the user presses and displaces a first face thereof including a display screen of said display part;

a switch pressing unit provided in the vicinity of an outer periphery of a rear face of said first face, said switch pressing unit being displaced in accordance with the displacement of the instruction input unit; and a switch part arranged to work by being pressed by said switch pressing unit, said switch part comprising a plurality of switches, wherein each switch corresponds to at least one function of the plurality of functions;

said display part displays information related to the operation mode of the digital camera and plural pieces of information indicating the functions of the switches on an area provided in the vicinity of each switch, and the information related to the operation mode and the plural pieces of information indicating the functions of the switches are changed in response to the operation mode selected by the user.

9. A capturing apparatus having a plurality of operation modes selectable by a user, comprising:
an image capturing unit that captures an image; and
an input unit disposed on the apparatus, said input unit inputting the user's instruction to the apparatus to make said image capturing unit capture the image,
said input unit comprising:
a display part for presenting a plurality of functions corresponding to the operation mode selected by the user, the plurality of functions being different in accordance with the operation mode selected by the user; and
a switch unit arranged in surroundings of said display art, for selecting a function among the plurality of functions, said switch unit comprising a plurality of buttons, wherein
each button corresponds to at least one function of the plurality of functions;
a height of a button of the plurality of buttons disposed on an upper side of said switch unit is lower than that of a button of the plurality of buttons disposed on a lower side of said switch unit,
said display part displays information related to the operation mode of the apparatus and plural pieces of information indicating the functions of the buttons on an area provided in the vicinity of each button, and
the information related to the operation mode and the plural pieces of information indicating the functions of the buttons are changed in response to the operation mode selected by the user.

10. A capturing apparatus as claimed in claim 9, further comprising a second input unit including a first button and a plurality of second buttons arranged in surroundings of said first button,
wherein shapes of said plurality of second buttons are different from each other.

11. A capturing apparatus as claimed in claim 10, further comprising a display unit operable to display said image,
wherein said first button includes a power switch operable to turn on/off a power of said capturing apparatus,
wherein said second buttons include:
a cancel button having a cancel function assigned thereto and being provided in the vicinity of said input unit;
an execution button having an execution function assigned thereto and being provided in the vicinity of said input unit;

a display button, provided in the vicinity of said display unit, operable to turn on/off a display by said display unit; and a shift button operable to change functions assigned to said buttons of said input unit, wherein said cancel button, said execution button, said display button and said shift button have shapes different from each other.

12. A capturing apparatus as claimed in claim 11, wherein areas of surfaces of said cancel button and said execution button are larger than areas of surfaces of said display button and said shift button.

13. A capturing apparatus as claimed in claim 11, wherein said shift button has one of a convex shape and a concave shape, while said display button has the other shape.

14. A capturing apparatus as claimed in claim 11, wherein said input unit, and said display unit or said second input unit are arranged on the same body face of said capturing apparatus.

15. A capturing apparatus as claimed in claim 9, wherein an input unit is arranged on an upper-right side of a center of a face of said capturing apparatus that faces a user when being used.

16. A capturing apparatus as claimed in claim 9, wherein an input unit is arranged on an upper-left side of a center of a face of said capturing apparatus that faces a user when being used.

17. A capturing apparatus as claimed in claim 9, wherein said display part is arranged to display one selected from a plurality of background color, and said selected one background color when said capturing apparatus is in a recording state is different from that when said capturing apparatus is in a playback state.

18. The capturing apparatus as claimed in claim 9, wherein said display screen is capable of inclining to a plurality of directions corresponding to said plurality of buttons, and at least one of said plurality of buttons functions according to the direction to which said display screen inclines.

19. A capturing apparatus having a plurality of operation modes selectable by a user, comprising:
an image capturing unit that captures an image; and
an input unit disposed on the apparatus, said input unit inputting the user's instruction to the apparatus to make said image capturing unit capture the image,
said input unit comprising:
a first display unit for presenting a plurality of functions corresponding to the operation mode selected by the user, the plurality of functions being different in accordance with the operation mode selected by the user; and
a switch unit arranged in surroundings of said first display unit, for selecting a function among the plurality of functions, said switch unit comprising a plurality of buttons, and
said capturing apparatus further comprising a second display unit disposed separately from the first display unit on a different place on the capturing apparatus, for presenting the same plurality of functions as those presented on the first display unit, wherein
each button corresponds to at least one function of the plurality of functions;
the first and second display units respectively display first and second display information related to the operation mode of the apparatus and plural pieces of information indicating the functions of the buttons on an area provided in the vicinity of each button, and the information related to the operation mode and the plural pieces of information indicating the functions of the buttons are changed in response to the operation mode selected by the user.

20. A capturing apparatus as claimed in claim 19, wherein said input unit is arranged on an upper-right side of a center of a face of said capturing apparatus that faces a user when said capturing apparatus is used, and said second display unit is arranged to display said first display information when one of said buttons arranged at an upper position or a left position with respect to said first display unit is operated.

21. A capturing apparatus as claimed in claim 19, further comprising a sensor part operable of sensing that at least a part of said first display unit is hidden, wherein said second display unit is arranged to display said first displayed information when said sensor part senses that said first display unit is hidden.

22. A capturing apparatus as claimed in claim 19, wherein said buttons are arranged approximately at an upper position, a lower position, a right position and a left position with respect to said first display unit.

23. A capturing apparatus as claimed in claim 19, wherein said input unit and said second display unit are arranged on the same plane of a body face of said capturing apparatus.

24. A capturing apparatus as claimed in claim 19, wherein said first displayed information further includes information obtained by magnifying a specified part of said second displayed information.

25. A capturing apparatus as claimed in claim 24, further comprising a means for assigning a function of moving said specified part to said switches.

26. A capturing apparatus as claimed in claim 19, wherein said second displayed information includes map information, and said first displayed information further includes detailed information of a specified part of said map information.

27. A capturing apparatus as claimed in claim 26, further comprising a means for assigning a function of moving said specified part in said map information to said switches.

28. A capturing apparatus as claimed in claim 19, further comprising a recording unit operable to store said image, wherein
said second displayed information includes one of said image stored in said recording unit and a thumbnail image of said image, and said first displayed information includes the other of said image and said thumbnail image.

29. A capturing apparatus as claimed in claim 28, further comprising a means for assigning a function of displaying said image corresponding to said thumbnail image to said switches.

30. The capturing apparatus as claimed in claim 19, further comprising:
a body on which the first display unit and the second display unit are arranged independently.

* * * * *